(12) United States Patent
Suriyaarachchi et al.

(10) Patent No.: US 11,780,182 B2
(45) Date of Patent: Oct. 10, 2023

(54) LAMINATION HEAD HAVING SELF-THREADING CAPABILITY

(71) Applicant: The Boeing Company, Chicago, IL (US)

(72) Inventors: Raviendra S. Suriyaarachchi, Kirkland, WA (US); Darrell D. Jones, Mill Creek, WA (US); James R. Kendall, Mt. Pleasant, SC (US); Paul D. Shaw, Charleston, SC (US); Sergio Urzainqui, Torres de Elorz (ES)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/456,268

(22) Filed: Nov. 23, 2021

(65) Prior Publication Data
US 2022/0176653 A1 Jun. 9, 2022

(30) Foreign Application Priority Data
Dec. 4, 2020 (EP) .................................. 20383066

(51) Int. Cl.
*B32B 41/00* (2006.01)
*B29C 70/38* (2006.01)
*B29C 70/54* (2006.01)

(52) U.S. Cl.
CPC ............ *B29C 70/388* (2013.01); *B29C 70/54* (2013.01)

(58) Field of Classification Search
CPC .................. B29C 70/388; B29C 70/54; B65H 2301/415095; B65H 2301/522;
(Continued)

(56) References Cited

U.S. PATENT DOCUMENTS

| 4,234,374 A | 11/1980 | Frank |
|---|---|---|
| 4,259,144 A | 3/1981 | Ballentine |

(Continued)

FOREIGN PATENT DOCUMENTS

| DE | 102013010428 | 12/2014 |
|---|---|---|
| EP | 2130666 | 12/2009 |
| EP | 3647029 | 6/2020 |

OTHER PUBLICATIONS

EPO, European Search Report, dated May 26, 2021, for U.S. Appl. No. 20/383,066.

*Primary Examiner* — Michael N Orlando
*Assistant Examiner* — Joshel Rivera

(57) ABSTRACT

A self-threading lamination head has a material supply drum, a backing layer collection drum, and a material threading system. The material supply drum supports a material roll of layup material backed by a backing layer. The material threading system includes at least one threading belt located on one side of the lamination head. The threading belt is supported by belt rollers driven by a belt drive motor. A belt-mounted layer engagement device is coupled to the threading belt for engaging a backing layer leading edge portion. The backing layer collection drum collects the backing layer as the lamination head applies the layup material onto a substrate. The belt drive motor drives the threading belt over the belt rollers and causes the belt-mounted layer engagement device to thread the backing layer through the lamination head, and position the backing layer leading edge portion proximate the backing layer collection drum.

20 Claims, 46 Drawing Sheets

(58) Field of Classification Search
CPC ........ B65H 2404/231; B65H 2701/172; B65H
47/00; B65H 2701/19; B32B 37/10;
B32B 38/00; B32B 39/00
USPC .................... 156/60, 64, 350, 351, 378, 379
See application file for complete search history.

(56) References Cited

U.S. PATENT DOCUMENTS

| | | |
|---|---|---|
| 4,285,752 A | 8/1981 | Higgins |
| 4,382,836 A | 5/1983 | Frank |
| 5,397,415 A | 3/1995 | Manabe |
| 5,979,531 A | 11/1999 | Barr |
| 7,137,182 B2 | 11/2006 | Nelson |
| 7,527,759 B2 | 5/2009 | Lee et al. |
| 7,655,168 B2 | 2/2010 | Jones et al. |
| 7,879,177 B2 | 2/2011 | McCowin et al. |
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 | 12/2012 | Nelson et al. |
| 8,465,613 B2 | 6/2013 | Rotter et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,399,338 B1 | 7/2016 | Metschan |
| 10,814,570 B2 | 10/2020 | Shaw |
| 10,926,492 B2 | 2/2021 | Shaw |
| 2004/0026025 A1 | 2/2004 | Sana |
| 2014/0150964 A1 | 6/2014 | Schaaf |
| 2015/0328876 A1 | 11/2015 | Nishimura |
| 2019/0224928 A1 | 7/2019 | Danninger |
| 2020/0139647 A1* | 5/2020 | Shaw .................... B29C 70/545 |

* cited by examiner

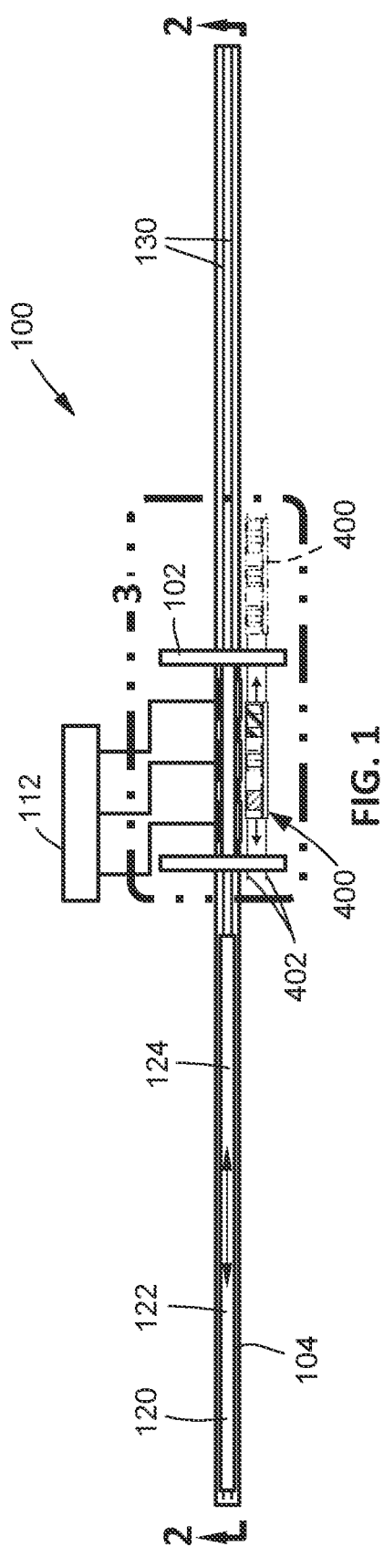
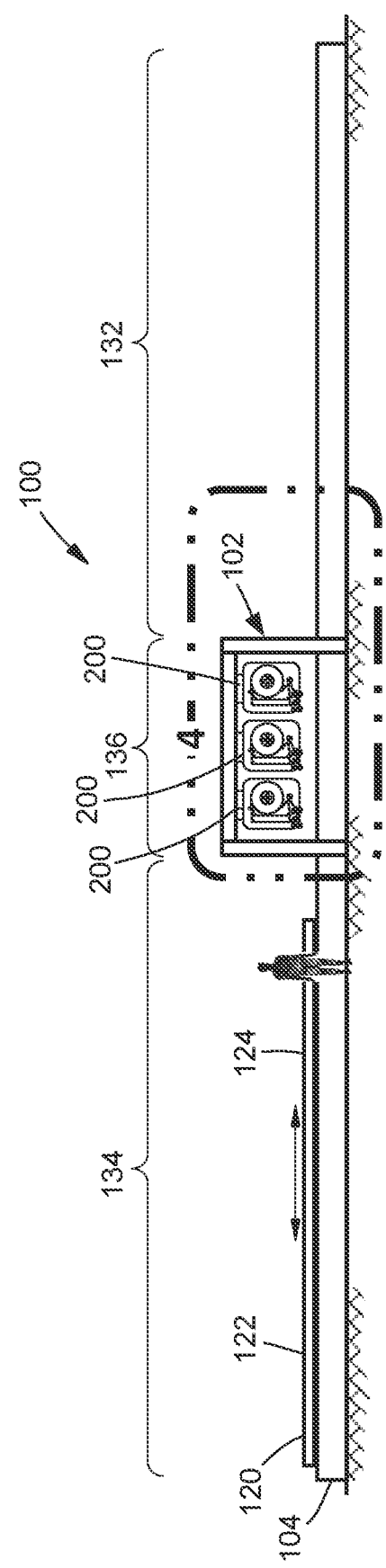

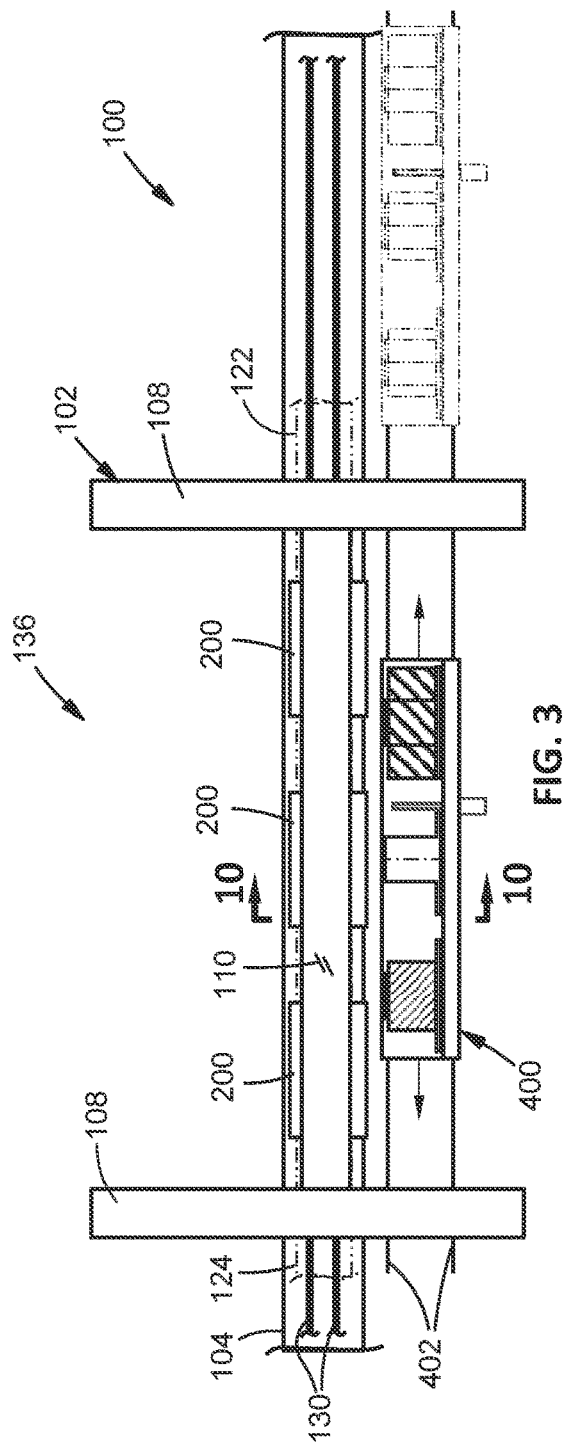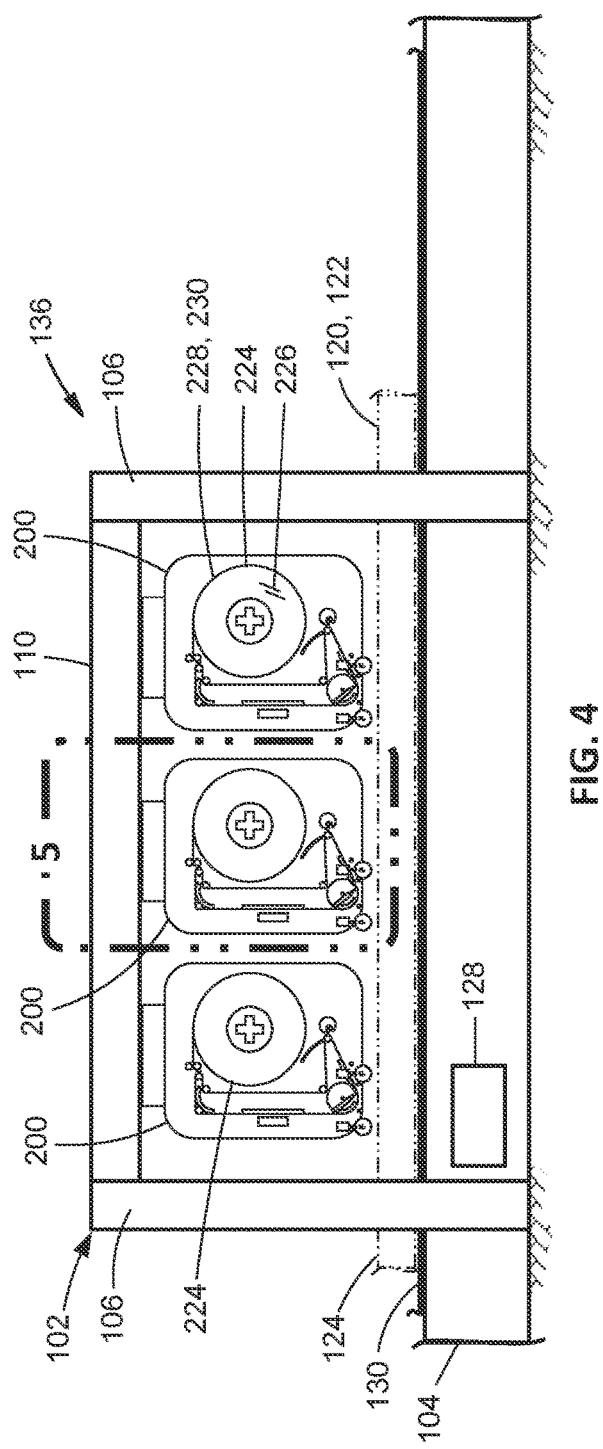

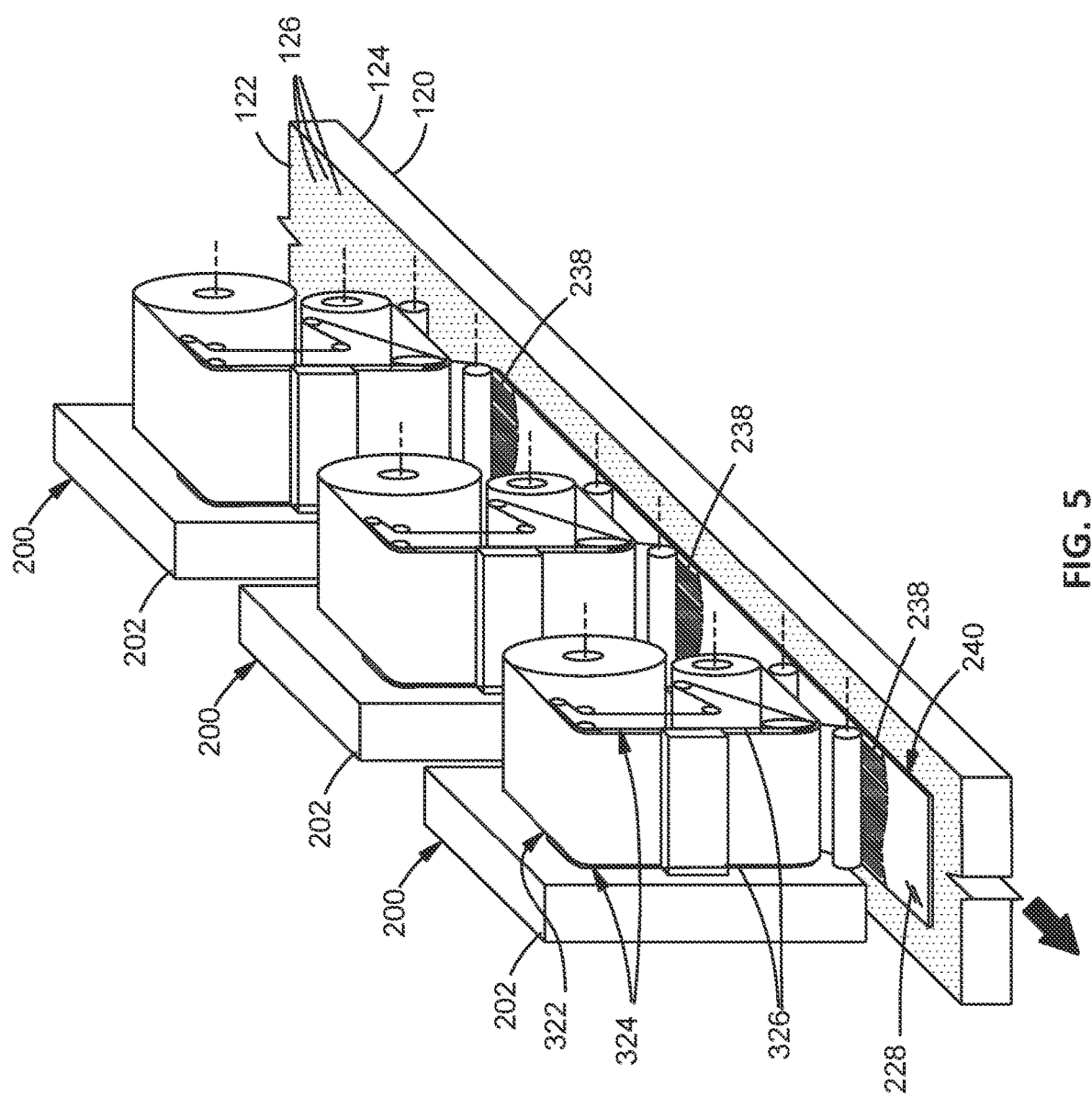

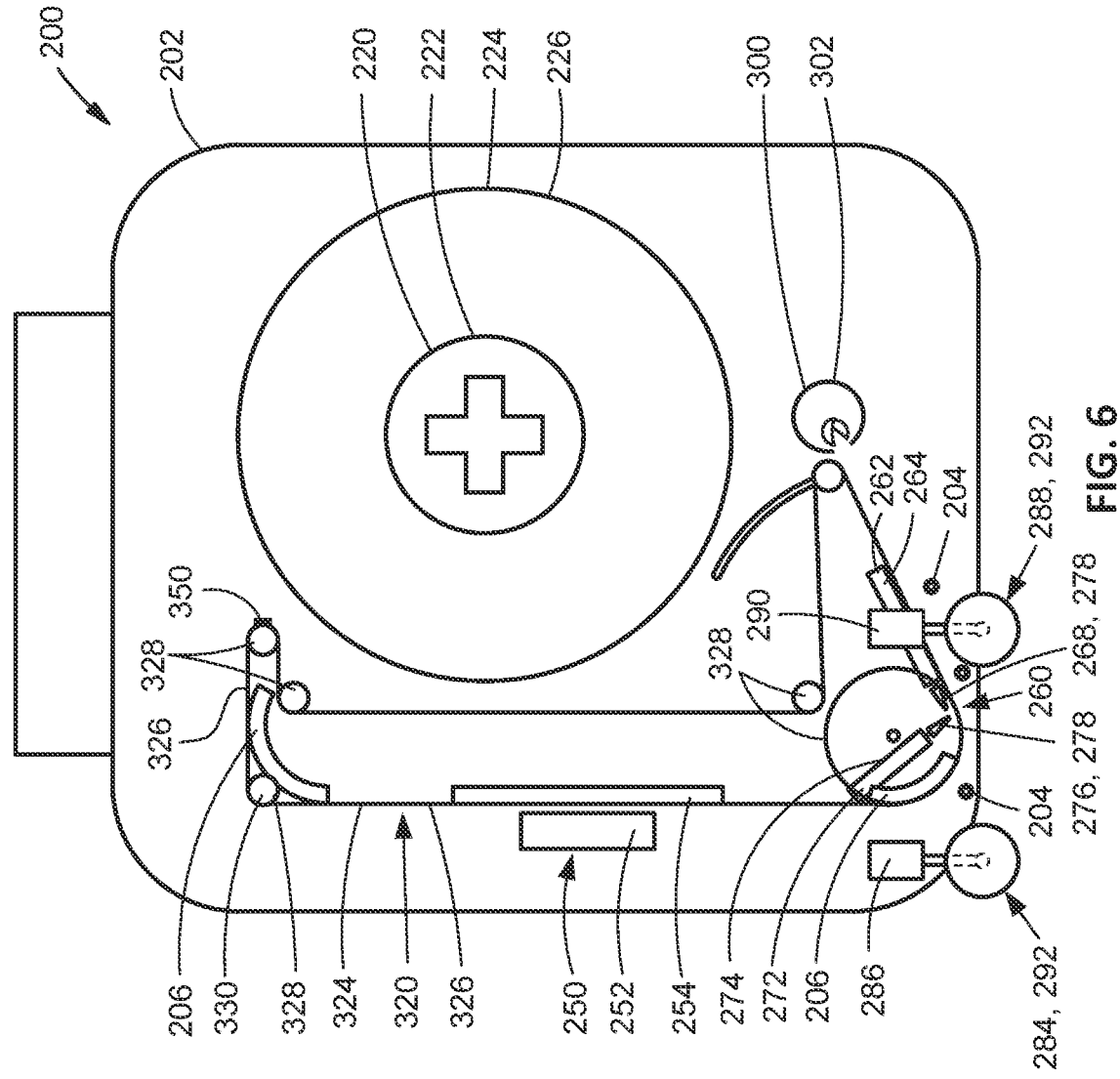

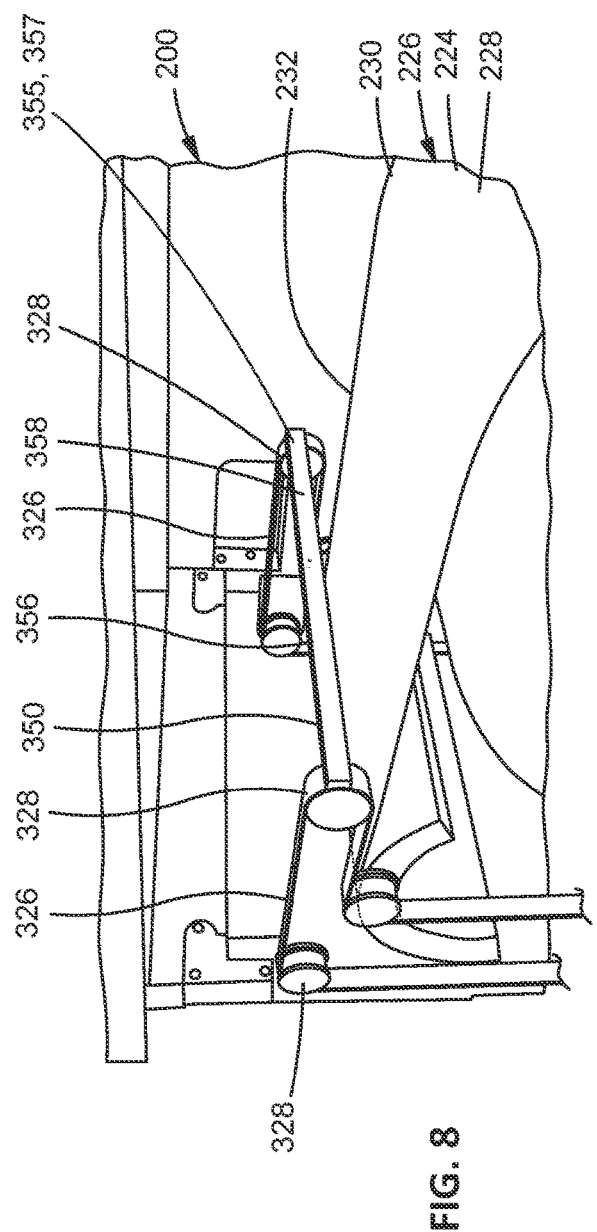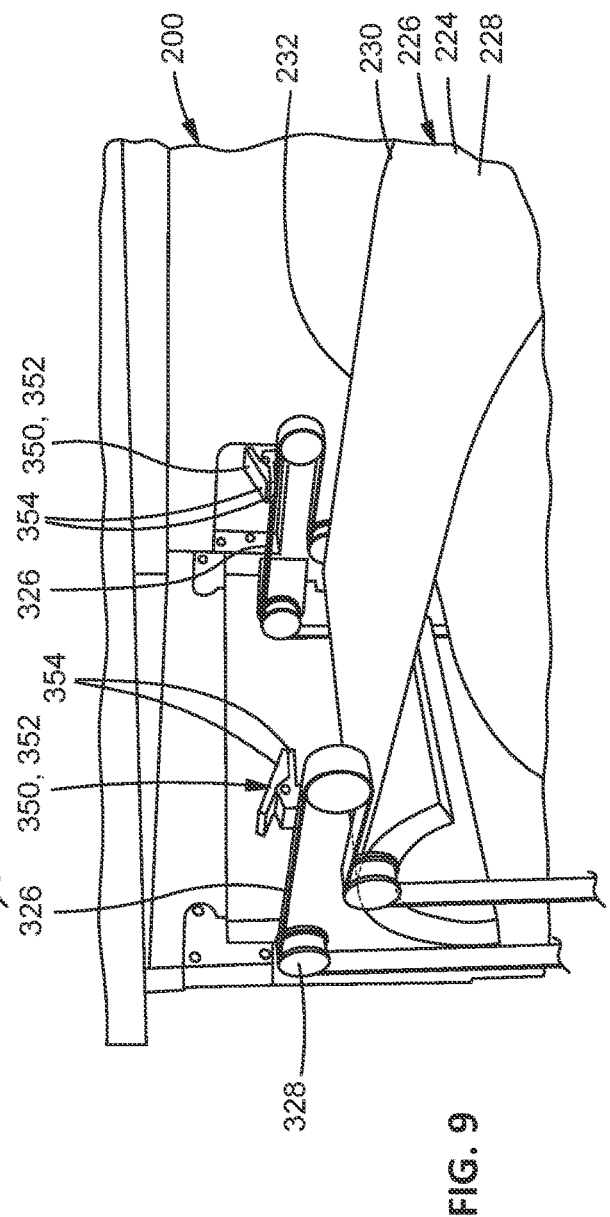

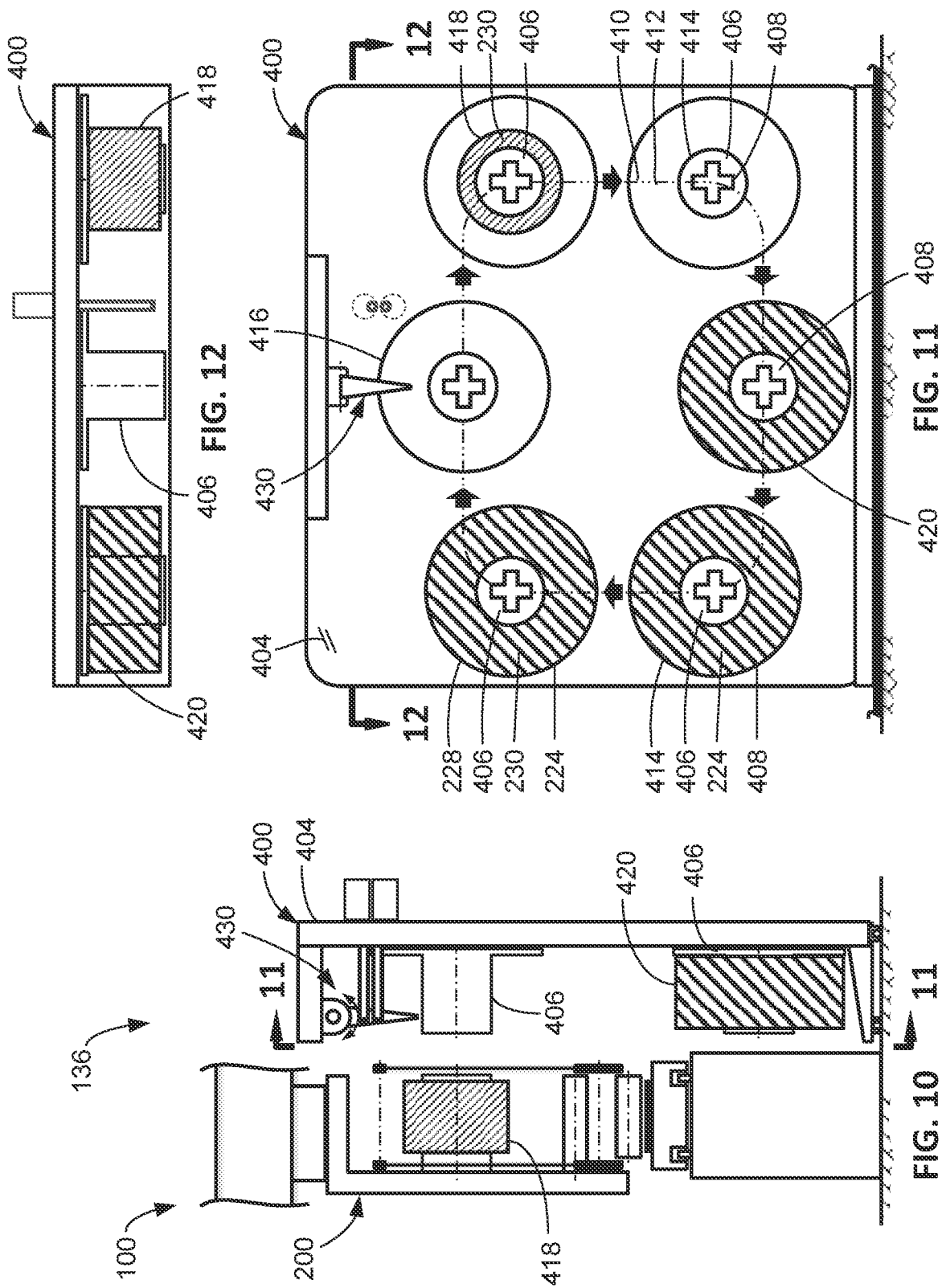

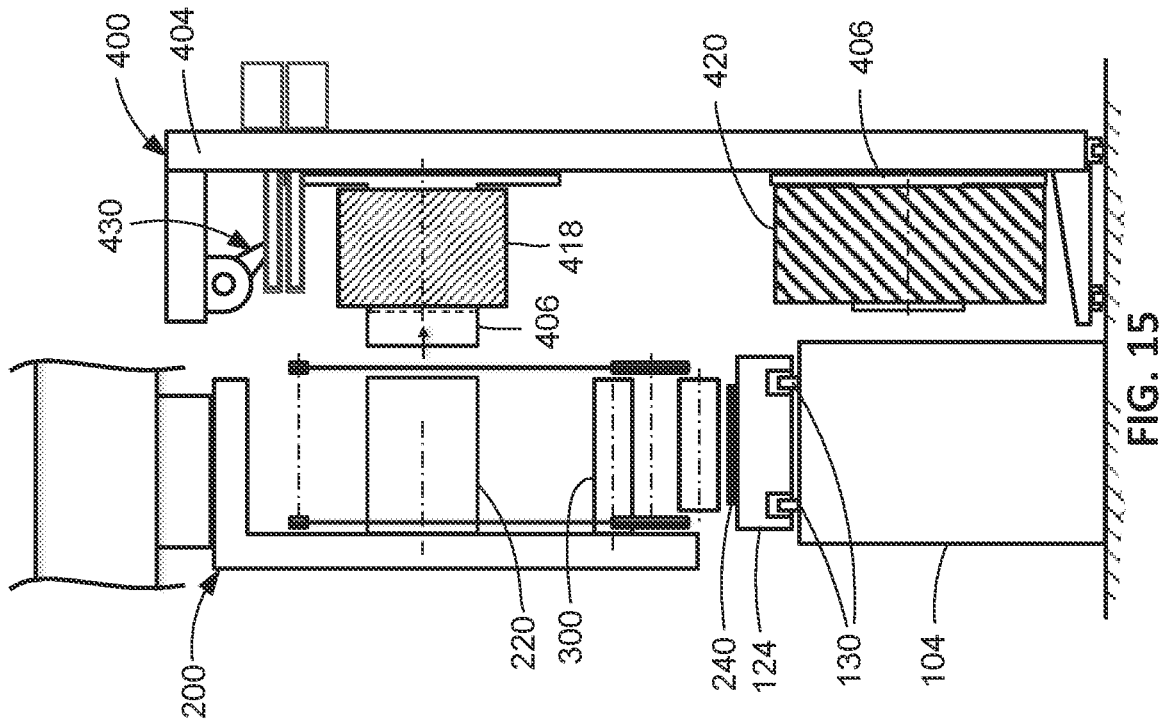

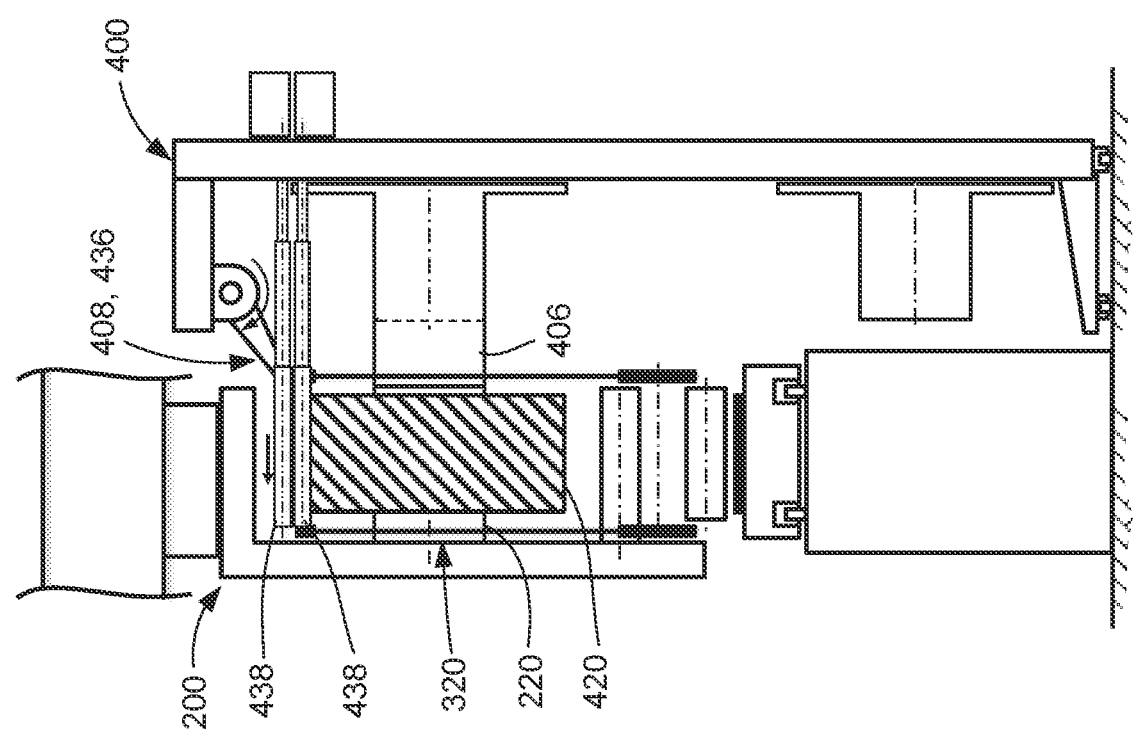

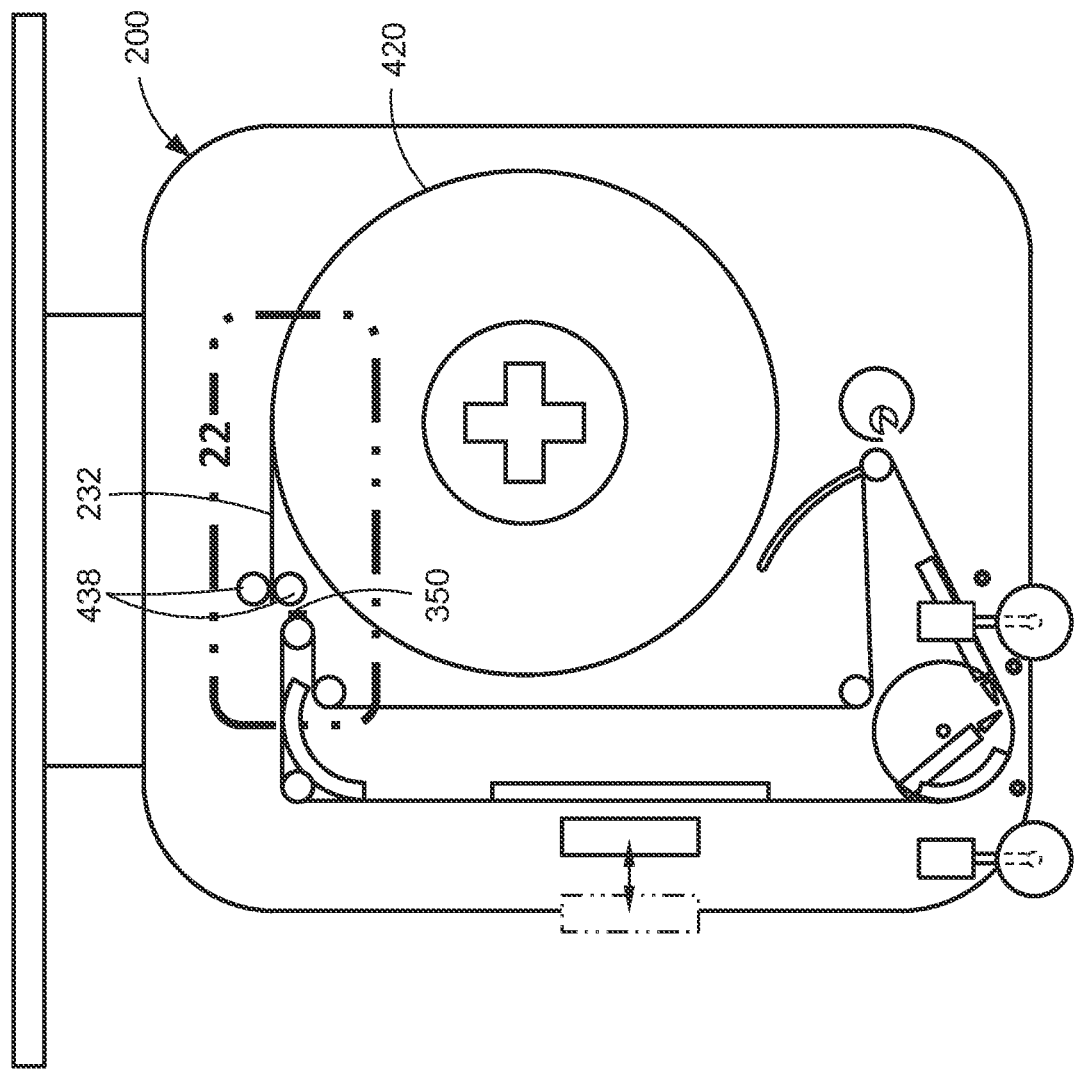

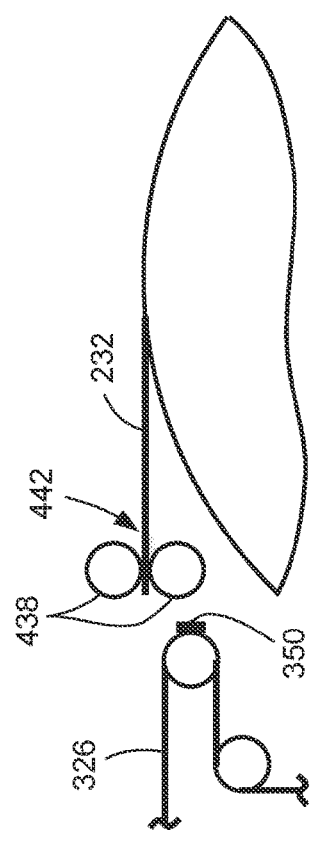
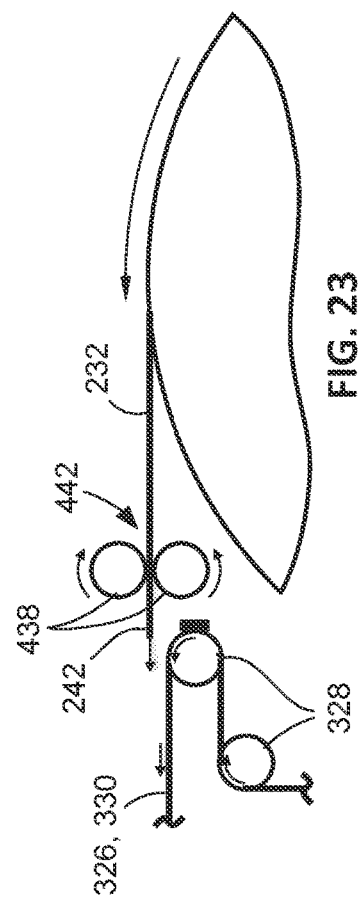
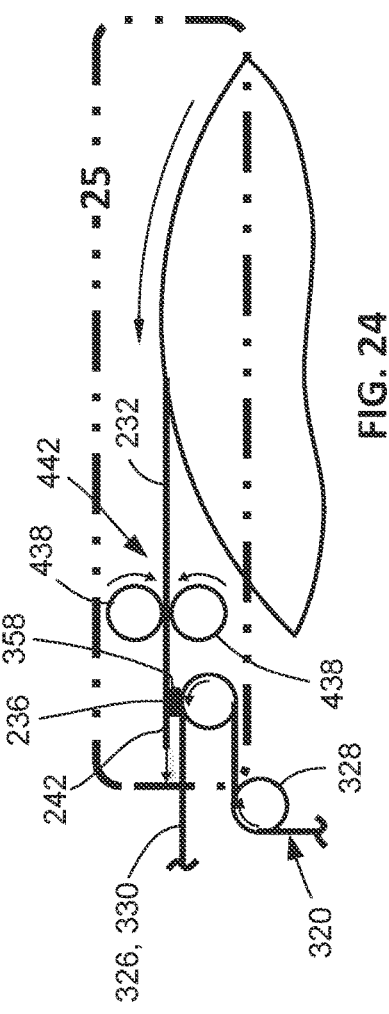

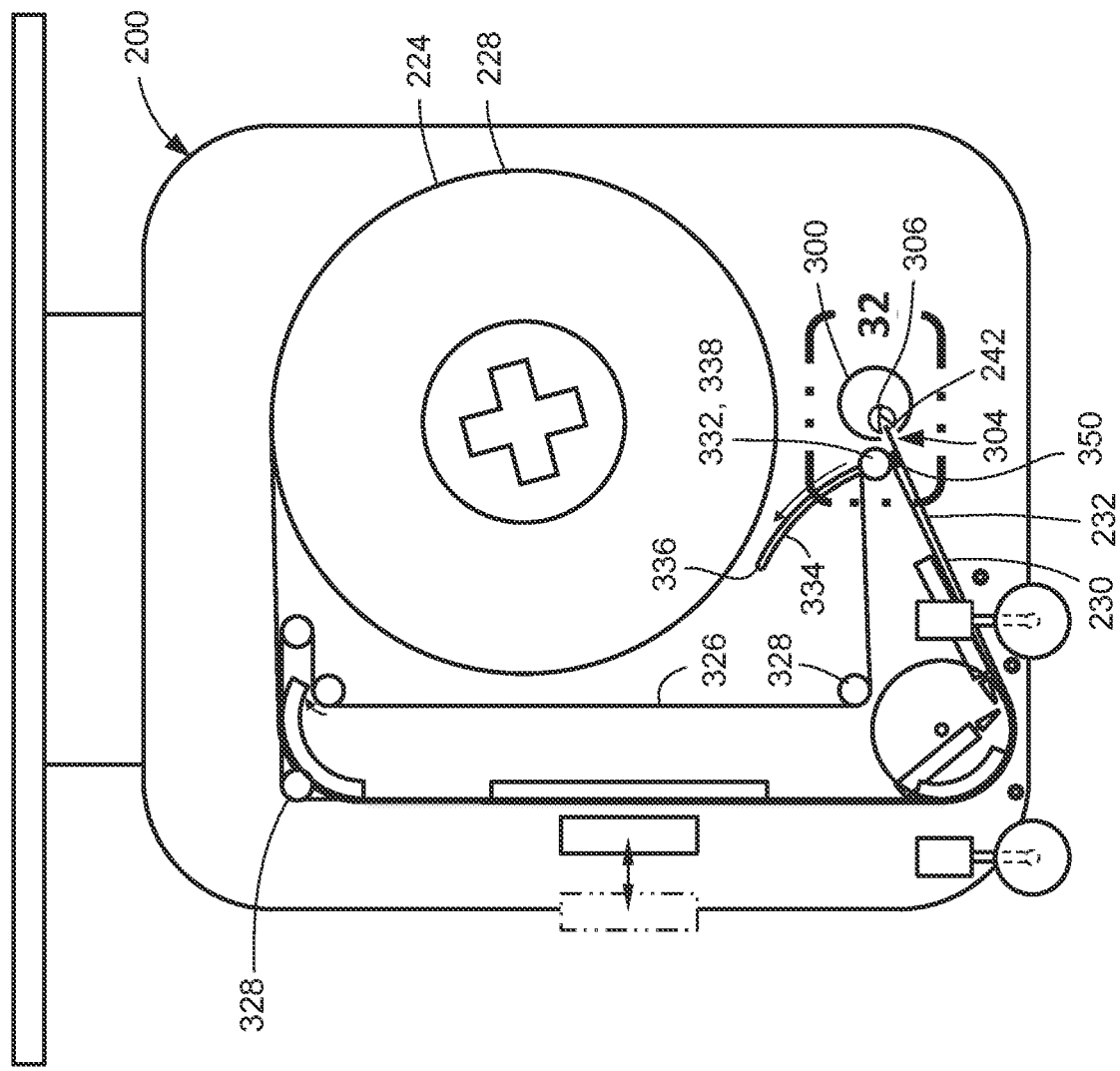

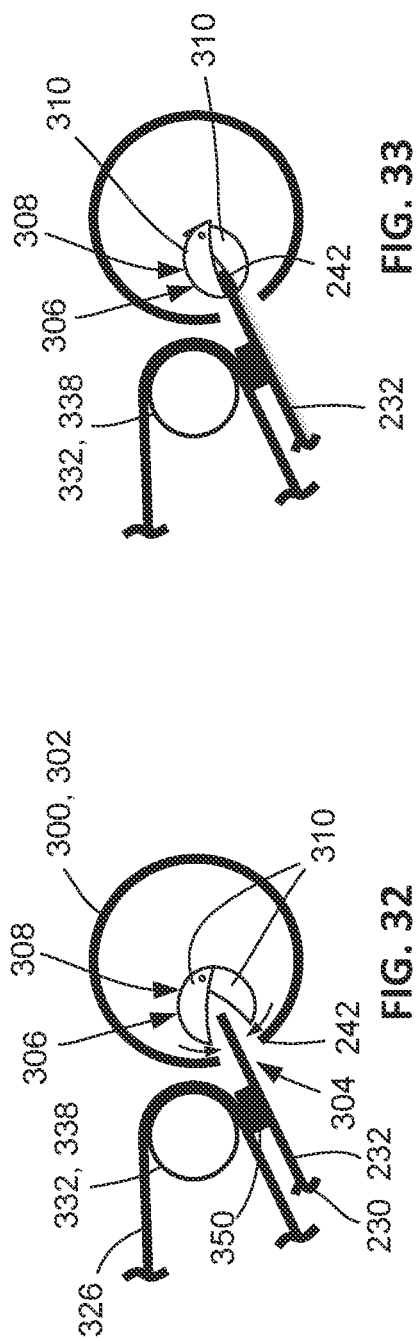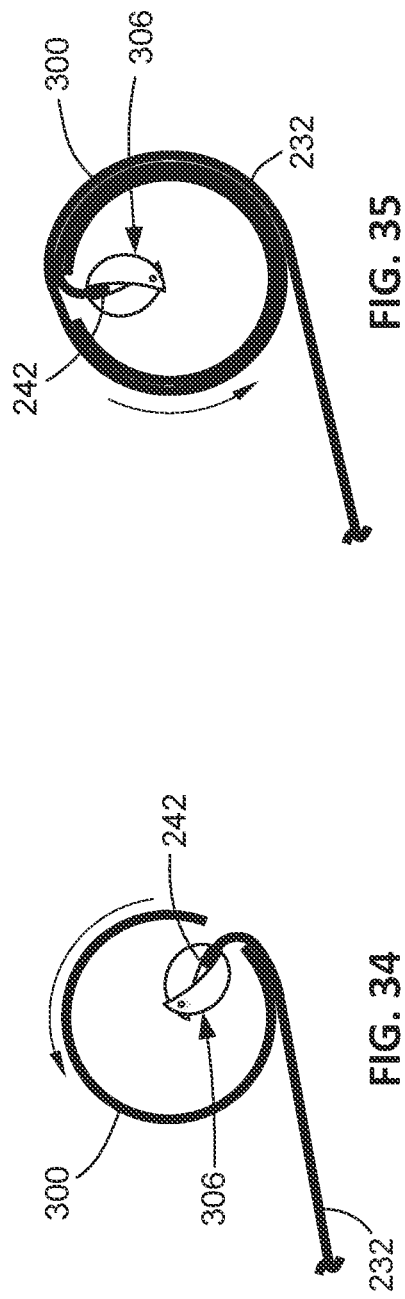

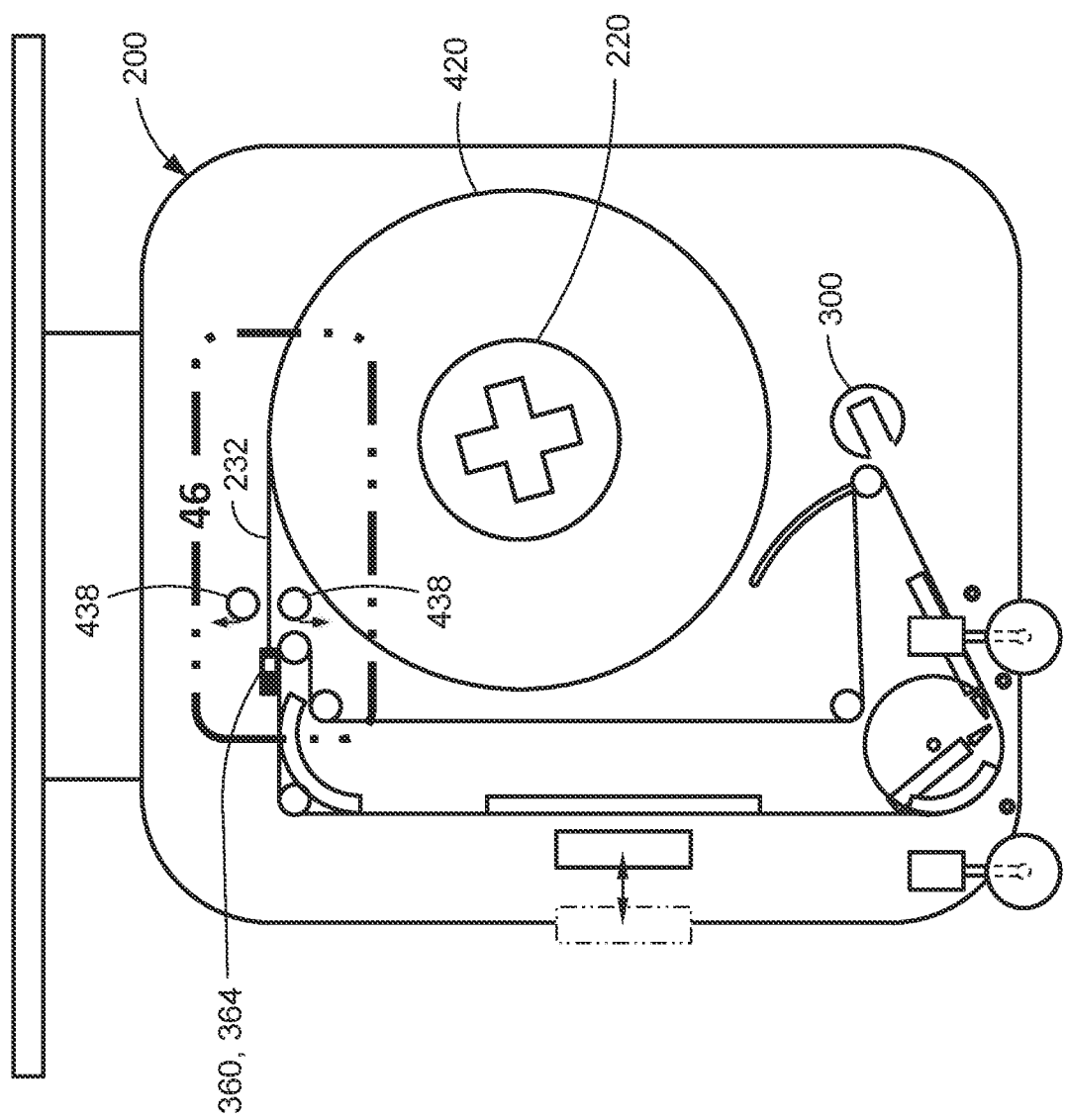

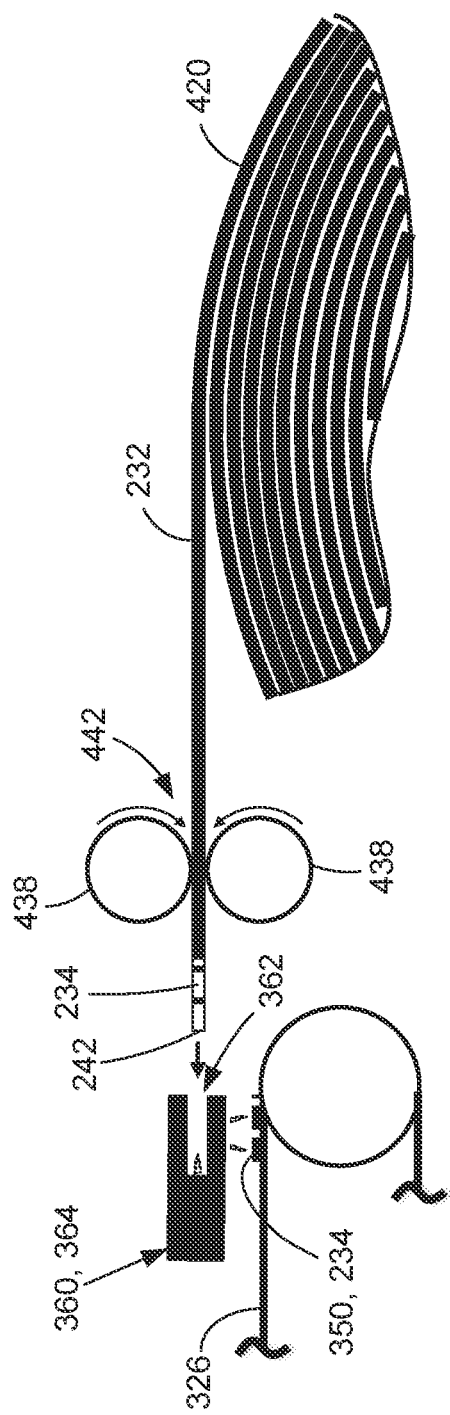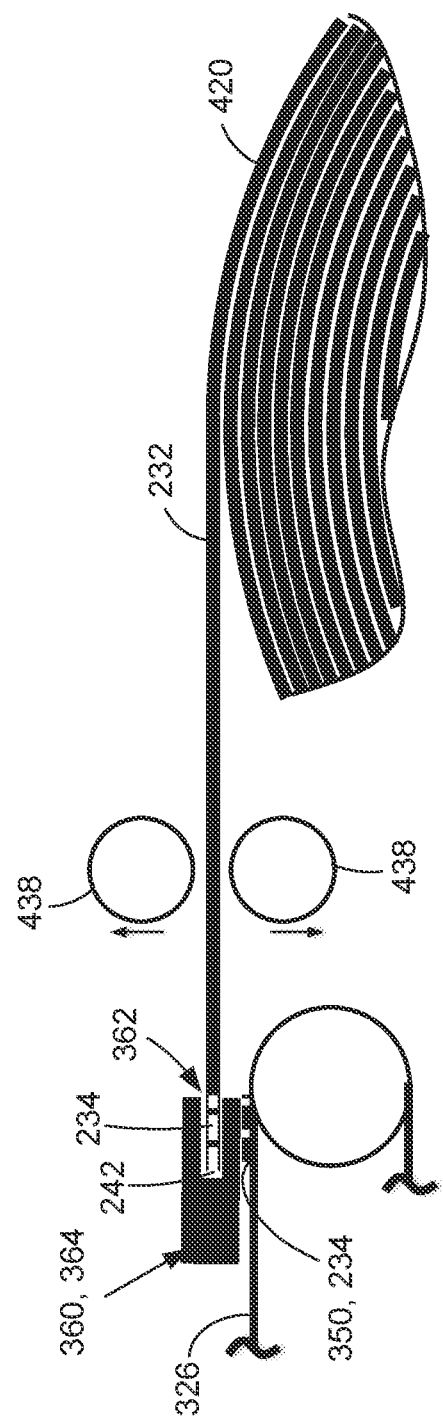

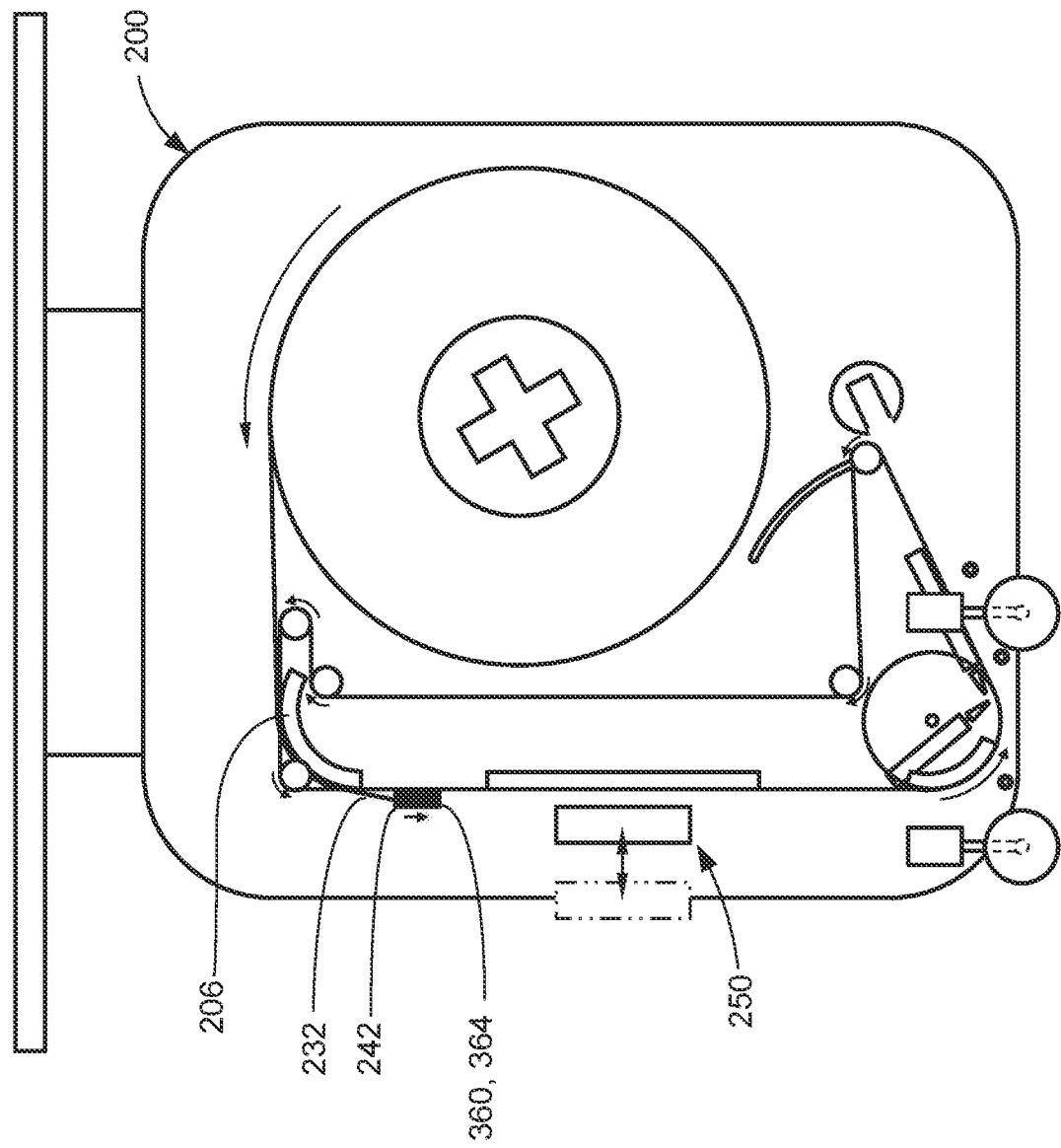

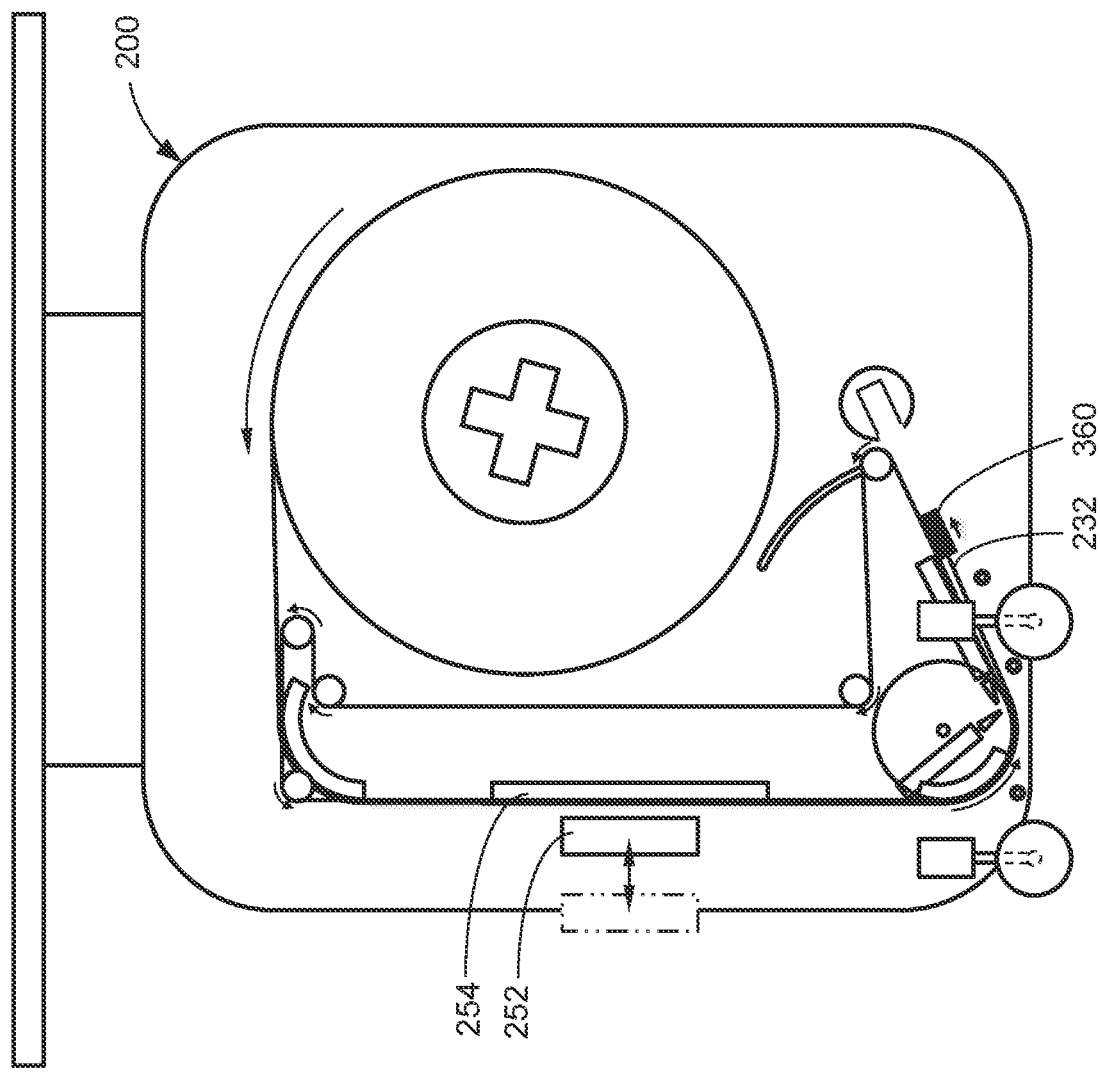

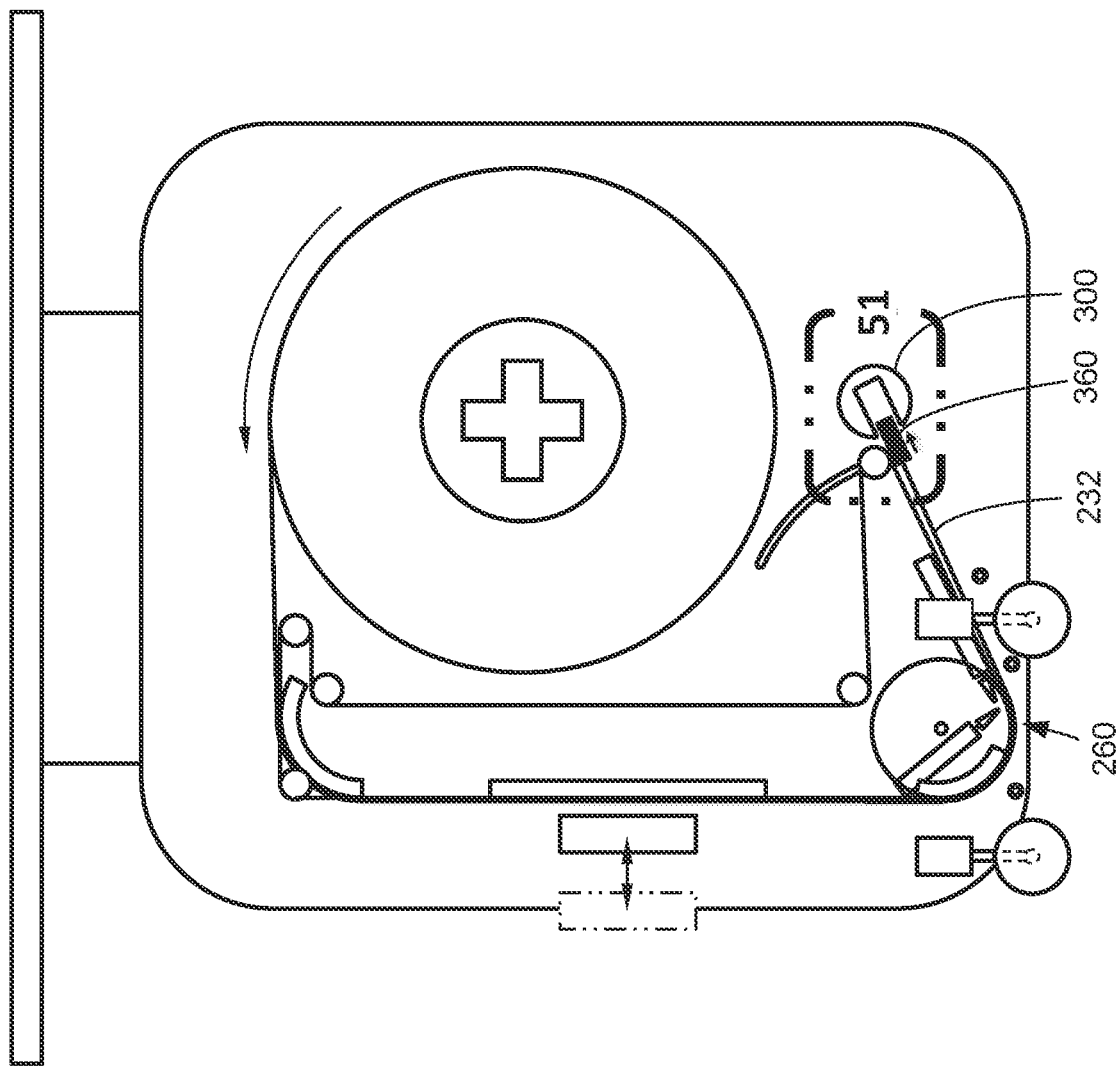

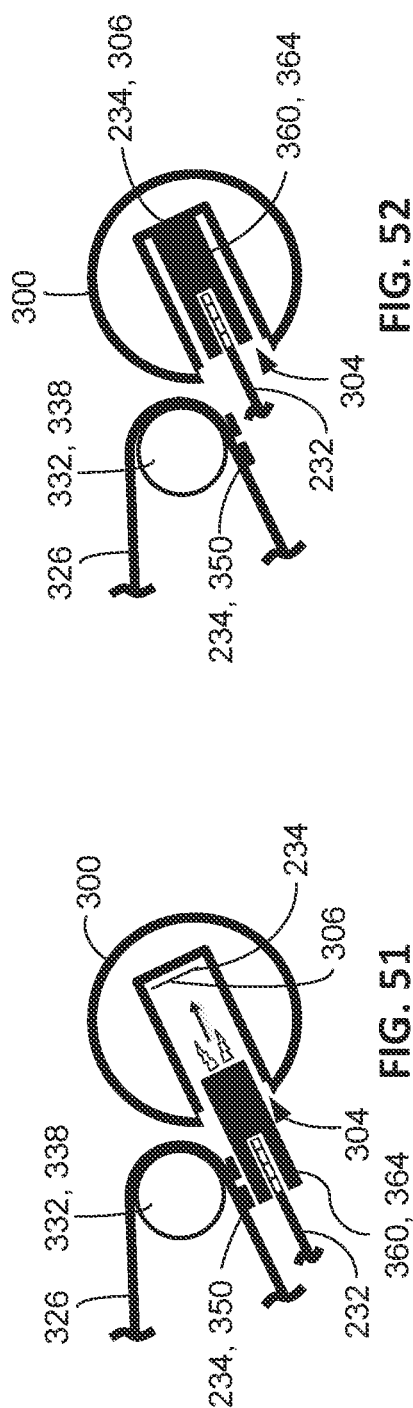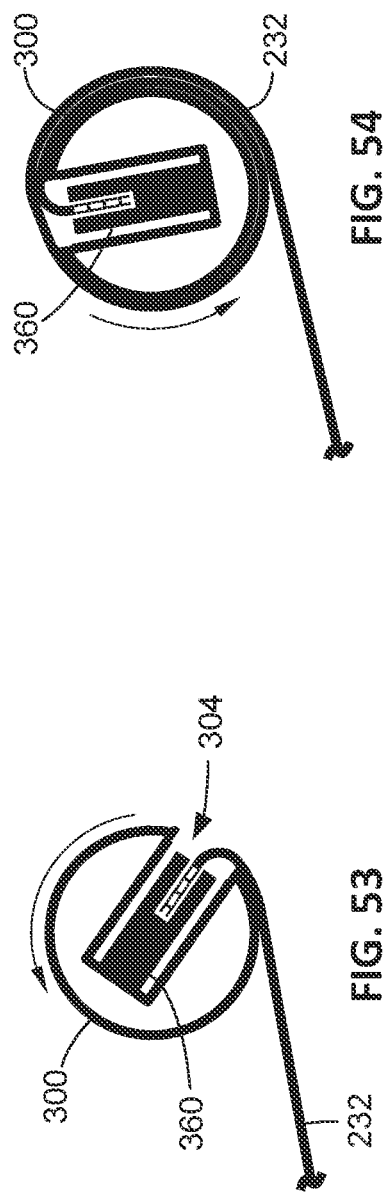

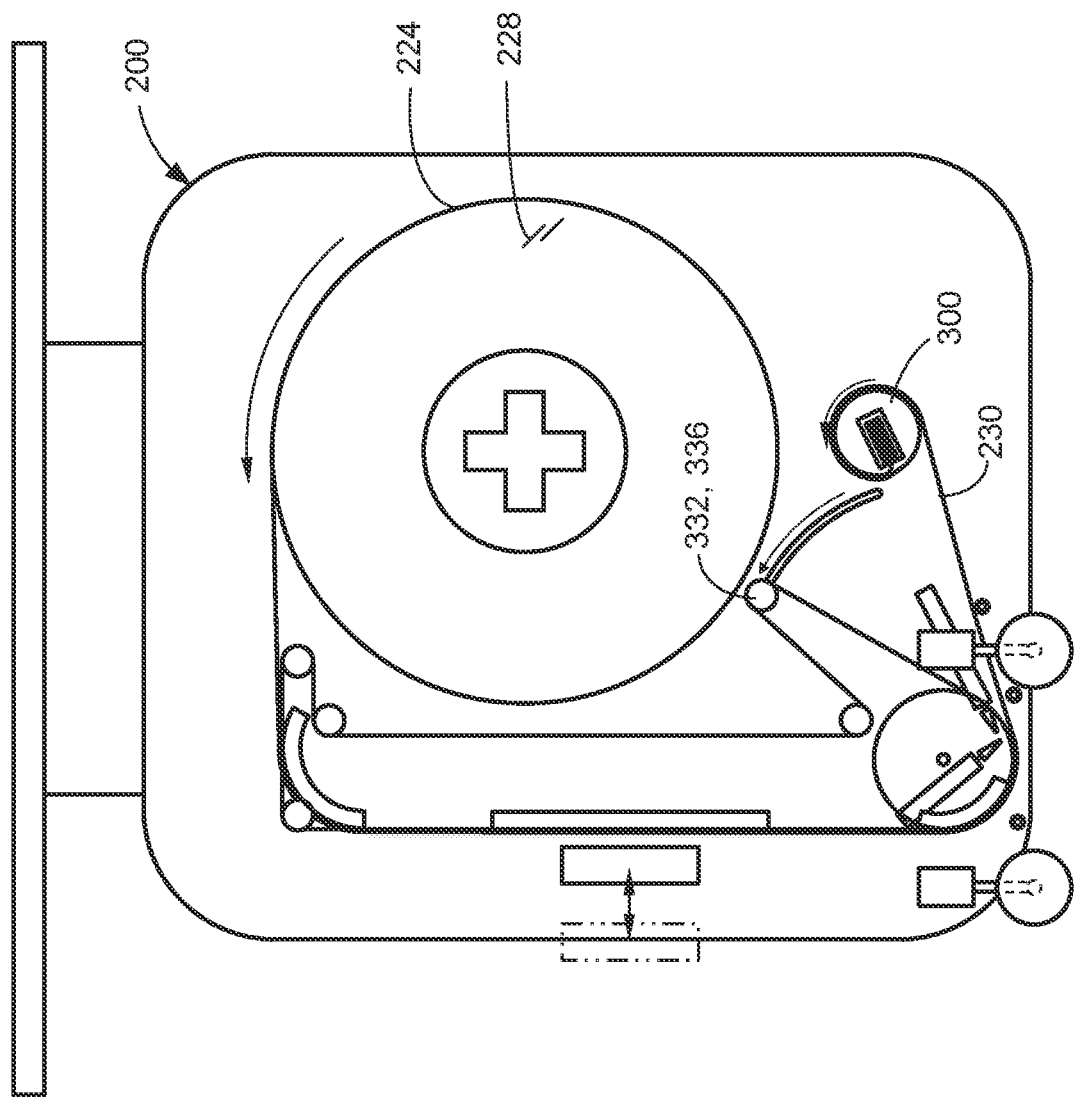

LAMINATION HEAD HAVING
SELF-THREADING CAPABILITY

FIELD

The present disclosure relates generally to manufacturing systems and, more particularly, to a lamination head for laying up composite laminates, and which has self-threading capability.

BACKGROUND

Composite materials are used in a wide variety of applications due to their favorable properties such as high specific strength, high specific stiffness, and high corrosion resistance. The manufacturing of a composite structure typically involves laying up multiple plies of layup material in a stacked formation on a lamination surface to form a composite laminate. The layup material is typically a fibrous material that is pre-impregnated with uncured resin (e.g., prepreg). For example, the layup material may be epoxy-impregnated carbon fiber prepreg.

Automated layup machines enable the layup of composite laminates at relatively high production rates due to the relatively high layup material deposition rates of automated layup machines. A tape lamination head is one type of automated layup machine in which a continuous strip of layup material such as prepreg tape is dispensed from the lamination head onto a lamination surface as the lamination head is moved relative to the lamination surface. For example, a lamination head may move over a stationary lamination surface. Alternatively the lamination head may be stationary, and the lamination surface may move underneath the lamination head. A lamination head may form each composite ply by successively laying up rows or courses of tape in side-by-side parallel relation to each other.

One drawback of conventional lamination heads is that layup material such as prepreg tape must be threaded through the lamination head prior to dispensing the tape. Prepreg tape is typically provided in roll form on a material supply drum which is then mounted on the lamination head. To prevent adhesion between the adjacent windings of prepreg tape on the material roll, the prepreg tape is backed by a backing layer. As the tape is dispensed from the material roll and applied to the lamination surface, the backing layer is removed and is wound onto a backing layer collection drum mounted on the lamination head. When the material roll is depleted of tape, it is necessary to changeout the depleted material roll and install a new material roll on the lamination head. After each material roll changeout, the tape from the new material roll must be threaded through the lamination head components and onto the backing layer collection drum.

In conventional lamination heads, the process of threading the tape is a time-consuming operation that can result in significant lamination head downtime. During the course of laying up a single composite laminate, it may be necessary to perform numerous material roll changeouts, each of which requires manually threading the tape, which adds to the lamination head downtime and increases production flow time.

As can be seen, there exists a need in the art for a lamination head that allows for rapid threading of layup material through the lamination head.

SUMMARY

The above-noted needs associated with manufacturing composite laminates are specifically addressed and alleviated by the present disclosure which provides a lamination head having self-threading capability. The lamination head includes a material supply drum configured to support a material roll of backed material. The backed material comprises layup material backed by a backing layer. The lamination head further includes a material threading system having at least one belt raceway located on one side of a material path through the lamination head. The belt raceway comprises a continuous-loop threading belt supported on a plurality of belt rollers driven a belt drive motor. The material threading system further includes at least one belt-mounted layer engagement device coupled to the threading belt, and configured to engage a backing layer leading edge portion. The lamination head further includes a backing layer collection drum configured to wind at least the backing layer onto the backing layer collection drum as the lamination head applies the layup material onto a substrate. The belt drive motor is configured to drive the threading belt over the belt rollers, and thereby cause the belt-mounted layer engagement device to draw at least the backing layer from the material supply roll, and thread at least the backing layer along the material path through the lamination head, and position the backing layer leading edge portion proximate the backing layer collection drum for engagement with the backing layer collection drum.

Also disclosed is a manufacturing system, comprising a series of lamination heads each having self-threading capability and each including a material supply drum, a material threading system, and a backing layer collection drum. The material supply drum is configured to support a material roll of backed material, as described above. The material threading system includes at least one belt raceway located on one side of a material path through the lamination head. The belt raceway comprising a continuous-loop threading belt supported on a plurality of belt rollers driven by a belt drive motor. The material threading system also includes at least one belt-mounted layer engagement device coupled to the threading belt, and configured to engage a backing layer leading edge portion. The lamination head further includes a backing layer collection drum configured to wind at least the backing layer onto the backing layer collection drum as the lamination head applies the layup material onto a substrate. The belt drive motor is configured to drive the threading belt over the belt rollers, and thereby cause the belt-mounted layer engagement device to draw at least the backing layer from the material supply roll and thread at least the backing layer along the material path through the lamination head and position the backing layer leading edge portion into close proximity to the backing layer collection drum. The manufacturing system further includes a reloading cartridge having an array of reloading spindles movable along a circulation path into one of a plurality of storage positions. The reloading spindles are configured to store a material roll, including a depleted material roll or a replacement material roll. The reloading cartridge is configured to position an empty reloading spindle for alignment with a material supply drum of one of the lamination heads, transfer the depleted material roll from the lamination head onto the empty reloading spindle, circulate the reloading spindles until a reloading spindle supporting a replacement material roll is aligned with the material supply drum, and transfer the replacement material roll from the reloading spindle to the material supply drum.

Also disclosed is a method of threading layup material through a lamination head. The method includes supporting, on a material supply drum, a material roll of backed material, as described above. The method also includes engaging a backing layer leading edge portion to a belt-mounted layer engagement device coupled to at least one continuous-loop threading belt located on one side of a material path through the lamination head. In addition, the method includes driving, using a belt drive motor, the threading belt over the belt rollers and thereby causing the belt-mounted layer engagement device to thread at least the backing layer along the material path through the lamination head, and position the backing layer leading edge portion proximate a backing layer collection drum.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a top view of an example of a manufacturing system for laying up a composite laminate, and which includes a series of lamination heads, each of which has self-threading capability;

FIG. 2 is a side view of the manufacturing system of FIG. 1;

FIG. 3 is a magnified view of the portion of the manufacturing system identified by reference numeral 3 of FIG. 1, and illustrating the lamination heads supported by a lamination head support structure, and further illustrating a reloading cartridge selectively positionable in front of each of the lamination heads for removing a depleted material roll from the lamination head and replacing it with a replacement material roll from the reloading cartridge;

FIG. 4 is a magnified view of the portion of the manufacturing system identified by reference numeral 4 of FIG. 2 and illustrating the lamination heads supported above a lamination mandrel that is movable relative to the lamination heads, which are stationary;

FIG. 5 is a perspective view of an example of a series of lamination heads applying layup material onto a substrate (e.g., a lamination mandrel) moving underneath the lamination heads;

FIG. 6 is a magnified view of the lamination head identified by reference numeral 6 of FIG. 4, and illustrating a material supply drum supporting a material roll of layup material backed by a backing layer, and further illustrating a backing layer separation assembly for separating the layup material from the backing layer;

FIG. 8 is a magnified view of the portion of the lamination head identified by reference numeral 8 of FIG. 7, and illustrating the belt-mounted layer engagement device as a pair of belt-mounted clips respectively mounted on the pair of threading belts and configured to clamp onto the backing layer leading edge portion;

FIG. 9 is a view of the top portion of a lamination head in which the belt-mounted layer engagement device is configured as either an electromagnetic crossmember or a fastener crossmember configured to engage the backing layer leading edge portion;

FIG. 10 is a side view of the lamination station taken along line 10-10 of FIG. 3, and illustrating the reloading cartridge positioned adjacent to a lamination head for a depleted material roll from a lamination head, place the depleted material roll on an empty reloading spindle on the reloading cartridge, and transfer a replacement material roll from the reloading cartridge onto the lamination head;

FIG. 11 is a front view of the reloading cartridge taken along line 11-11 of FIG. 10, and illustrating a plurality of reloading spindles, some which are empty, some which are supporting replacement material rolls, and some of which are supporting depleted material rolls removed from lamination heads;

FIG. 12 is a top-down view of the reloading cartridge taken along line 12-12 of FIG. 11, and the reloading spindles occupied by replacement material rolls and depleted material rolls;

FIG. 15 shows the telescoping reloading spindle retracting away from the material supply drum;

FIG. 20 is a side view of the reloading cartridge illustrating a free end of the alignment rollers telescoping into close proximity to the belt-mounted layer engagement device on the lamination head simultaneous with the transfer by the material transfer mechanism of the replacement material roll from the reloading spindle onto the material supply drum of the lamination head;

FIG. 21 is a front view of the lamination head after installation of the replacement material roll on the material supply drum, and further illustrating the backing layer leading edge portion captured between the leading edge alignment rollers;

FIG. 22 is a magnified view of the portion of the lamination head identified by reference numeral 22 of FIG. 21, and illustrating the backing layer leading edge portion captured between the leading edge alignment rollers at a location proximate the belt-mounted leading edge engagement device;

FIG. 23 shows the activation of the threading belts of the material threading system for moving the belt-mounted layer engagement device simultaneous with the counter rotation of the leading edge alignment rollers for extending the backing layer leading edge portion toward the belt-mounted layer engagement device;

FIG. 24 shows the backing layer leading edge portion engaged with the belt-mounted layer engagement device;

FIG. 31 shows the backing layer leading edge portion positioned proximate a drum-mounted layer engagement device included with the backing layer collection drum;

FIG. 32 is a magnified view of the portion of the lamination head identified by reference numeral 32 of FIG. 31, illustrating the belt-mounted layer engagement device positioning the backing layer leading edge portion for engagement by the drum-mounted layer engagement portion;

FIG. 33 shows the drum-mounted layer engagement device configured as a drum-mounted clamp mechanism having a pair of clamp jaws for clamping onto the forwardmost edge of the backing layer leading edge portion;

FIG. 34 shows the backing layer collection drum being rotated with the backing layer leading edge portion engaged with the drum-mounted layer engagement device;

FIG. 35 shows several wraps of the backing layer on the backing layer collection drum;

FIG. 45 shows the backing layer leading edge portion during engagement to the leading edge cup device;

FIG. 46 is a magnified view of the portion of the lamination head identified by reference numeral 46 of FIG. 45, and illustrating the backing layer leading edge portion captured between the counter loading pair of leading edge alignment rollers, and illustrating the leading edge coupling device prior being coupled to the belt-mounted layer engagement device;

FIG. 47 shows the leading edge alignment rollers moving away from each other to unclamp the backing layer leading edge portion, which is engaged to the leading edge cup device;

FIG. 48 is a side view of the lamination head showing the leading edge coupling device drawing the backing layer off of the material supply roll and threading the backing layer through the lamination head;

FIG. 49 shows the leading edge coupling device approaching the backing layer collection drum;

FIG. 50 shows the leading edge coupling device being drawn into the collection drum opening of the backing layer collection drum;

FIG. 51 is a magnified view of the portion of the lamination head identified by reference numeral 51 of FIG. 50, and illustrating the leading edge coupling device during engagement with the drum-mounted layer engagement device simultaneous with the release of the leading edge coupling device from the belt-mounted layer engagement device;

FIG. 52 shows the leading edge coupling device engaged with the drum-mounted layer engagement device;

FIG. 53 shows the backing layer collection drum being rotated with the leading edge cup device engaged with the drum-mounted layer engagement device;

FIG. 54 shows several wraps of the backing layer on the backing layer collection drum;

FIG. 55 is a side view of the lamination head showing the redirect roller after moving away from the backing layer collection drum to provide clearance for winding the backing layer onto the backing layer collection drum in preparation for the lamination head dispensing layup material onto the substrate;

DETAILED DESCRIPTION

Figure 7:
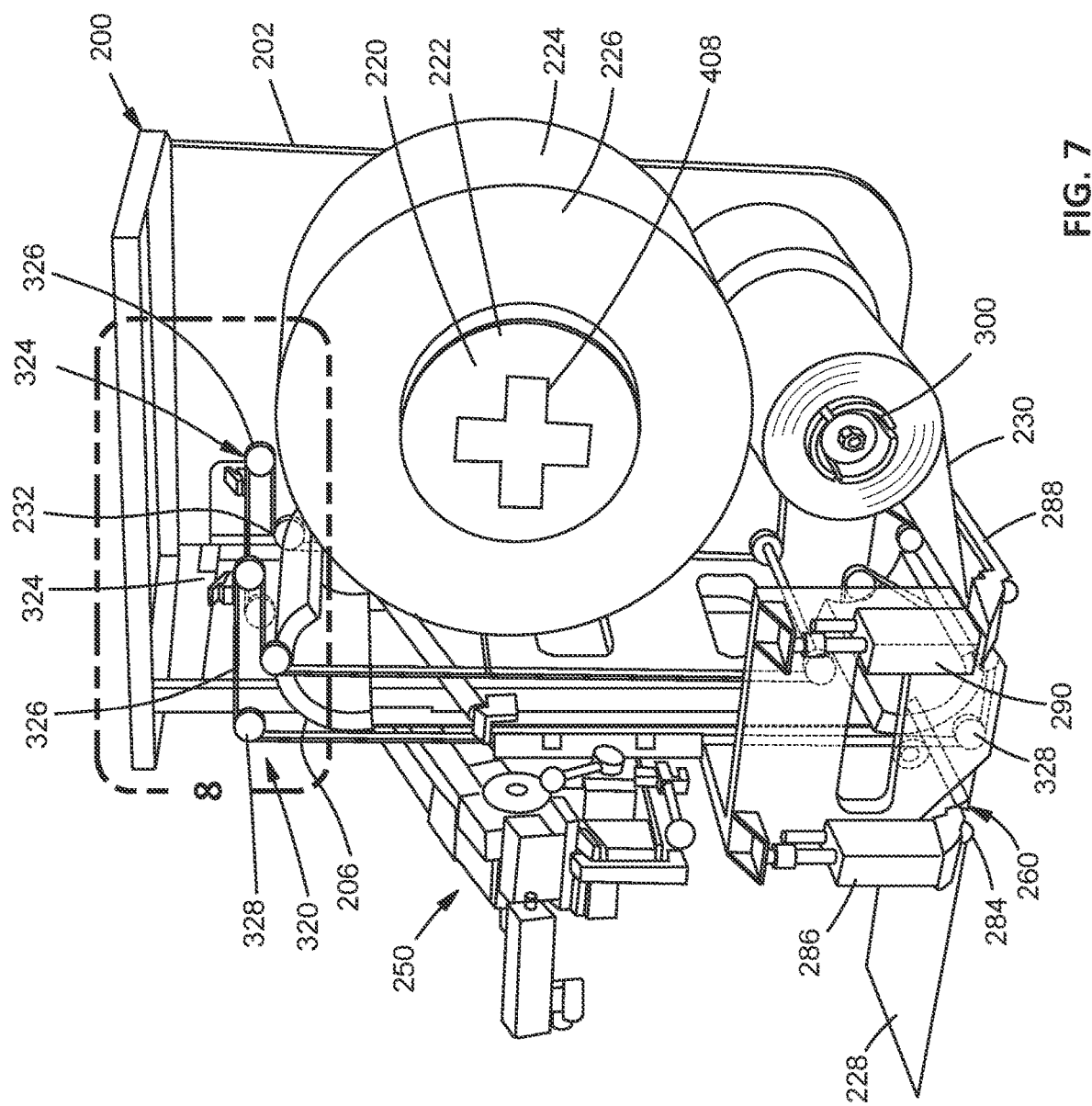
FIG. 7 is a perspective view of an example of a lamination head having self-threading capability, and including a material threading system having a pair of rethreading belts and at least one belt-mounted layer engagement device for autonomously threading at least the layup material through the lamination head.

Referring now to the drawings which illustrate preferred and various examples of the disclosure, shown in FIG. 1 is a top view of an example of a manufacturing system 100 having a lamination station 136 containing an end-to-end series of lamination heads 200 (e.g., fiber placement heads) for laying up an uncured composite laminate 240 (FIG. 5). FIG. 2 is a side view of the manufacturing system 100. As described in greater detail below, each lamination head 200 is configured to support a material roll 224 (FIG. 4) of backed material 226 (FIG. 4) made up of layup material 228 (FIG. 4) backed by a backing layer 230 (FIG. 4). Each lamination head 200 is configured to dispense the layup material 228 onto a lamination surface 120 or substrate 122 during movement of the lamination head 200 relative to the substrate 122. Advantageously, each lamination head 200 has self-threading capability for autonomously threading the layup material 228 through the lamination head 200 prior to the lamination head 200 dispensing the layup material 228 onto the substrate 122. The self-threading capability of the lamination heads 200 reduces lamination head 200 downtime otherwise associated with manual threading operations required for conventional lamination heads.

Figure 17:
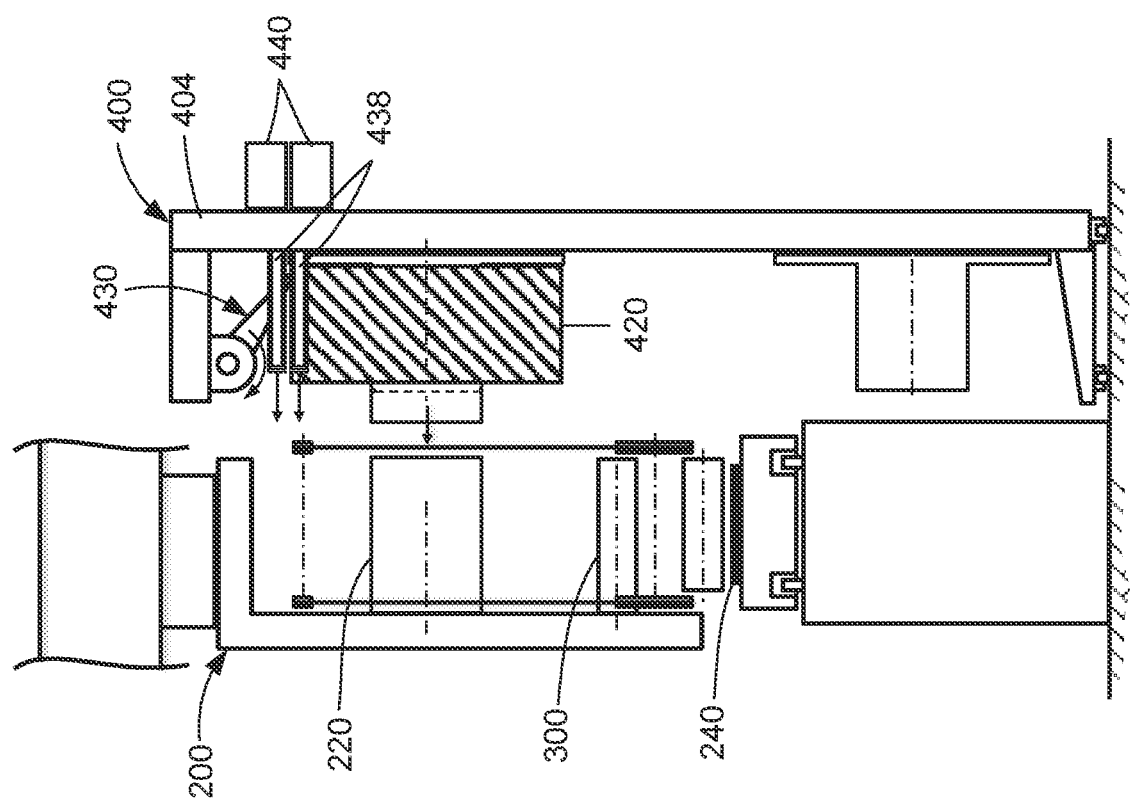
FIG. 17 is a side view of the reloading cartridge showing a pair of leading edge alignment rollers configured to telescope into close proximity to the belt-mounted layer engagement device on the lamination head.

FIGS. 3 and 4 are respectively top and side views of the lamination station 136 showing the series of lamination heads 200, and also showing a reloading cartridge 400 (FIG. 3) positioned in front of the lamination heads 200. As described below, the reloading cartridge 400 may be movable along the lamination station 136 for positioning the reloading cartridge 400 in alignment with any one of the lamination heads 200. The reloading cartridge 400 is configured for automated removal of a depleted material roll 418 (FIGS. 13-14) from a lamination head 200, and replacement of the depleted material roll 418 with a replacement material roll 420 (FIG. 17) from the reloading cartridge 400.

FIG. 5 is a perspective view of an example of a series of lamination heads 200 applying courses 238 of layup material 228 onto a substrate 122. In the present disclosure, a substrate 122 may be described as the surface of a lamination mandrel 124, or the substrate 122 may be a recently dispensed course 238 of layup material 228. The lamination surface may include a plurality of apertures 126 coupled to a vacuum pressure source 128 (FIG. 4) for vacuum engagement of the composite laminate 240 to the lamination surface 120. In some examples, a release film (not shown) may be applied (e.g., via the lamination head 200) onto the lamination surface (e.g., lamination mandrel 124). The release film may be perforated to allow the vacuum pressure at the apertures 126 to vacuum couple to the composite laminate 240 being laid up on top of the release film.

In the example manufacturing system 100 shown in the figures, each of the lamination heads 200 may have bi-directional layup capability for dispensing layup material 228 onto the substrate 122. For example, each lamination head 200 may be configured to dispense layup material 228 during movement relative to the substrate 122 (e.g., lamination mandrel 124) along a first direction of travel 208 (FIG. 37), and also dispense layup material 228 during movement relative to the substrate 122 along a second direction of travel 210 (FIG. 38) opposite the first direction of travel 208. However, the presently-disclosed self-threading capability may be implemented on a lamination head (not shown) configured to dispense layup material 228 along a single direction of travel, and is not limited to lamination heads 200 having bi-directional layup capability.

In FIGS. 1-4, the manufacturing system 100 may include a base member 104 supported on a surface such as a factory floor. As mentioned above, the lamination surface 120 (e.g., substrate 122) may be configured as a lamination mandrel 124. The lamination mandrel 124 may be movable or slidable along longitudinal rails 130 extending along the length of the base member 104. For example, the manufacturing system 100 may include a mandrel translation mechanism (not shown) such as a screw drive coupled to a drive motor for autonomously moving the lamination mandrel 124 under control of a controller 112 (FIG. 1). The mandrel translation mechanism may move the lamination mandrel 124 between a lamination surface home position 132 (FIG. 2) on one side of the lamination station 136, and a lamination surface aft position 134 (FIG. 2) on an opposite side of the lamination station 136.

In the example manufacturing system 100 of FIGS. 1-4, the lamination heads 200 may be supported by a lamination head support structure 102. The lamination head support structure 102 may include a longitudinal beam 110 to which the lamination heads 200 may be mounted. Opposing ends of the longitudinal beam 110 may be respectively coupled to a pair of crossbeams 108. The opposing ends of each crossbeam 108 may be supported by vertically-oriented posts 106 which may extend upwardly from a factory floor. However, the lamination head support structure 102 may be provided in any one of a variety of alternative configurations, and is not limited to the configuration shown in FIGS. 1-4.

As an alternative to a movable lamination mandrel 124, the lamination surface 120 may be configured as a continuous loop lamination belt (not shown) supported by a series of internal lamination belt rollers (not shown), and rotatably driven by a lamination belt drive motor (not shown). The lamination belt may include an outer surface onto which layup material 228 may be dispensed by the lamination heads 200. In a still further example of the manufacturing system 100, the lamination surface 120 may be stationary, and the lamination heads 200 may be movable over the lamination surface 120 for dispensing layup material 228 for laying up a composite laminate 240 (FIG. 5). For example, the lamination heads 200 may be supported by a gantry (not shown), a rail-mounted support structure (not shown), or a cantilevered support structure (not shown) for moving the lamination heads 200 along the first direction of travel 208 (FIG. 37) and along the second direction of travel 210 (FIG. 38) while dispensing layup material 228 onto the lamination surface 120. In another example, the manufacturing system 100 may include one or more robotic devices (not shown) for moving the lamination heads 200 over a lamination surface 120. In any one of the above-described examples, the manufacturing system 100 is not limited to a series of end-to-end lamination heads 200, but may include a single lamination head 200 having self-threading capability, and which may be moved relative to a lamination surface 120. In addition, one or more of the presently-disclosed lamination heads 200 may be supported in a manner that allows for dispensing layup material 228 along the first and second directions of travel 208, 210, and along additional directions of travel (not shown), such as along a direction 45 degrees to the first direction of travel 208, and/or along a direction 45 degrees to the second direction of travel 210. Furthermore, the lamination surface 120 is not limited to a generally planar elongated lamination surface 120, such as the presently-disclosed lamination mandrel 124, but may include lamination surfaces (not shown) having a non-planar contour. For example, the lamination surface 120 may be a movable layup tool such as a rotatable layup mandrel (not shown).

Referring to FIGS. 6-7, shown respectively are side and perspective views of examples of a lamination head 200 having self-threading capability. The lamination head 200 includes a material supply drum 220, a material threading system 320, and a backing layer collection drum 300, each of which may be supported by a mounting frame 202. In addition, the lamination head 200 may include a cutter assembly 250, a backing layer separation assembly 260, and first and second compaction devices 284, 288, and which may also be supported by the mounting frame 202. The mounting frame 202 may be configured as a plate structure, a truss structure, or any one of a variety of other configurations for coupling the lamination head 200 to a lamination head support structure 102 (FIGS. 3-4) in a mechanically stable manner.

The material supply drum 220 may be driven by a supply drum motor 222, and may support a material roll 224 of backed material 226, as mentioned above. The material threading system 320 is configured to thread at least the backing layer 230 through the lamination head 200, and position a backing layer leading edge portion 232 of the backing layer 230 for engagement with the backing layer collection drum 300. The cutter assembly 250 is configured to cut the layup material 228 as the lamination head 200 approaches a designated start location and a designated end location of a course 238 (FIG. 5) of layup material 228 being dispensed by the lamination head 200. The backing layer separation assembly 260 is configured to separate the layup material 228 from the backing layer 230, and guide the layup material 228 toward the substrate 122 (FIG. 5). The backing layer collection drum 300 is configured to take up or wind the backing layer 230 onto the backing layer collection drum 300 as the layup material 228 is separated from the backing layer 230 (via the backing layer separation assembly 260) and applied onto the substrate 122.

In FIGS. 6-7, the lamination head 200 is shown prior to threading of the backed material 226 through the lamination head 200. The backed material 226 comprises a continuous length or strip of layup material 228 backed by a continuous backing layer 230. In some examples, the layup material 228 may be a composite material, such as a continuous strip of fiber-reinforced polymer matrix material (e.g., prepreg tape). The matrix material may be a thermosetting resin or a thermoplastic resin. The reinforcing fibers may be glass fibers (e.g., fiberglass), carbon fibers, boron, aramid, metallic fibers, ceramic fibers, or other fiber materials. In one example, the composite material may be a carbon-fiber epoxy-resin prepreg tape. The composite material may be unidirectional tape or multidirectional tape (e.g., woven or fabric tape). The layup material 228 may have a width of up to 12 inches or more. In some examples of the lamination head 200, the material supply drum 220 may be configured to support two or more material rolls 224 in side-by-side relation to each other for dispensing onto the substrate 122 as parallel, side-by-side courses of layup material 228. For example, the lamination head 200 may be configured to support two or more material rolls of prepreg tape (e.g., each 0.5 to 3 inch wide or more) for dispensing in side-by-side relation to each other onto the substrate 122.

As an alternative to composite material, the layup material 228 may be a continuous strip of non-composite material backed by a backing layer 230. For example, the layup material 228 may be a metallic foil or a metallic mesh backed by a backing layer 230. In still other examples, the layup material 228 may be a processing material to assist in the processing (e.g., forming, consolidating, curing, handling, etc.) of the composite laminate 240. Examples of non-composite material include a release film, a tackifier film, a breather layer, a bleeder layer, peel ply, or any one of a variety of other types of non-composite layers, films, or adhesives that may be dispensed by the lamination head 200 prior to, during, or after the laying up of a composite laminate 240 (FIG. 5).

Referring still to FIGS. 6-7, the lamination head 200 may further include one or more guide rollers 204 and/or and one or more guide surfaces 206 mounted to the mounting frame 202. The guide rollers 204 and/or the guide surfaces 206 may define the material path 322 for the backed material 226 through the lamination head 200. The guide surfaces 206 may have a larger radius of curvature than the guide rollers 204. The larger radius of curvature of the guide surfaces 206 may facilitate the initial threading of the backed material 226 through the lamination head 200 via the material threading system 320. In example shown, the lamination head 200 includes two guide surfaces 206, each having an approximately quarter-circular shape. The guide rollers 204 and guide surfaces 206 may guide the backed material 226 through the cutter assembly 250 and through the backing layer separation assembly 260 of the lamination head 200. For example, the guide surfaces 206 respectively located above and below the cutter assembly 250 may facilitate the tensioning of the backed material 226 to enable precise control of the cutting of the layup material 228 without severing the backing layer 230.

As shown in FIG. 6, the cutter assembly 250 may include a cutter module 252 and a cutter platen 254. The cutter platen 254 may be fixedly mounted to the mounting frame 202. The cutter module 252 may have at least one cutter blade (not shown). To provide clearance for threading the backed material 226 (e.g., at least the backing layer 230) through the cutter assembly 250, the cutter module 252 may be configured to horizontally translate away from the cutter platen 254 to a module home position (not shown) in which the cutter module 252 and the cutter platen 254 are spaced apart from each other. In preparation for cutting the layup material 228, the cutter module 252 may horizontally translate back toward the cutter platen 254 to a module engagement position in which the backed material 226 is sandwiched between the cutter module 252 and the cutter platen 254. The depth of the cutter blade may be precisely controlled to cut only the layup material 228 without cutting the backing layer 230. The controller 112 (FIG. 1) may control the cutter assembly 250 in a manner to cut the layup material 228 immediately prior to the start of each course 238 (FIG. 5) of layup material 228 to be dispensed by the lamination head 200, and also cut the layup material 228 immediately prior to the lamination head 200 arriving at the predetermined end of each course 238.

Referring still to FIG. 6, the backing layer separation assembly 260 is configured to receive the backed material 226 after being threaded through the cutter assembly 250, as mentioned above. The backing layer separation assembly 260 includes a first separation device 262 and a second separation device 272. The first separation device 262 includes a first horn 268 which is movable via a first separation device actuator 264 (e.g., a linear actuator) between a separation device retracted position 278 and a separation device extended position 280 (FIG. 37) associated with the first separation device 262. The second separation device 272 includes a second horn 276 which is movable via a second separation device actuator 274 (e.g., a linear actuator) between the separation device retracted position 278 and the separation device extended position 280 (FIG. 38) associated with the second separation device 272. In FIG. 6, the first horn 268 and the second horn 276 are both shown in their respective separation device retracted positions 278 to provide clearance for the threading of the backed material 226 through the lamination head 200. However, when the lamination head 200 is dispensing layup material 228 along the first direction of travel 208 (FIG. 37), the first horn 268 may be in the extended position, and the second horn 276 may be in the retracted position. When the lamination head 200 is dispensing layup material 228 along a second direction of travel 210 (FIG. 38) opposite the first direction of travel 208, the second horn 276 may be in the extended position, and the first horn 268 may be in the retracted position, as described below.

Figure 37:
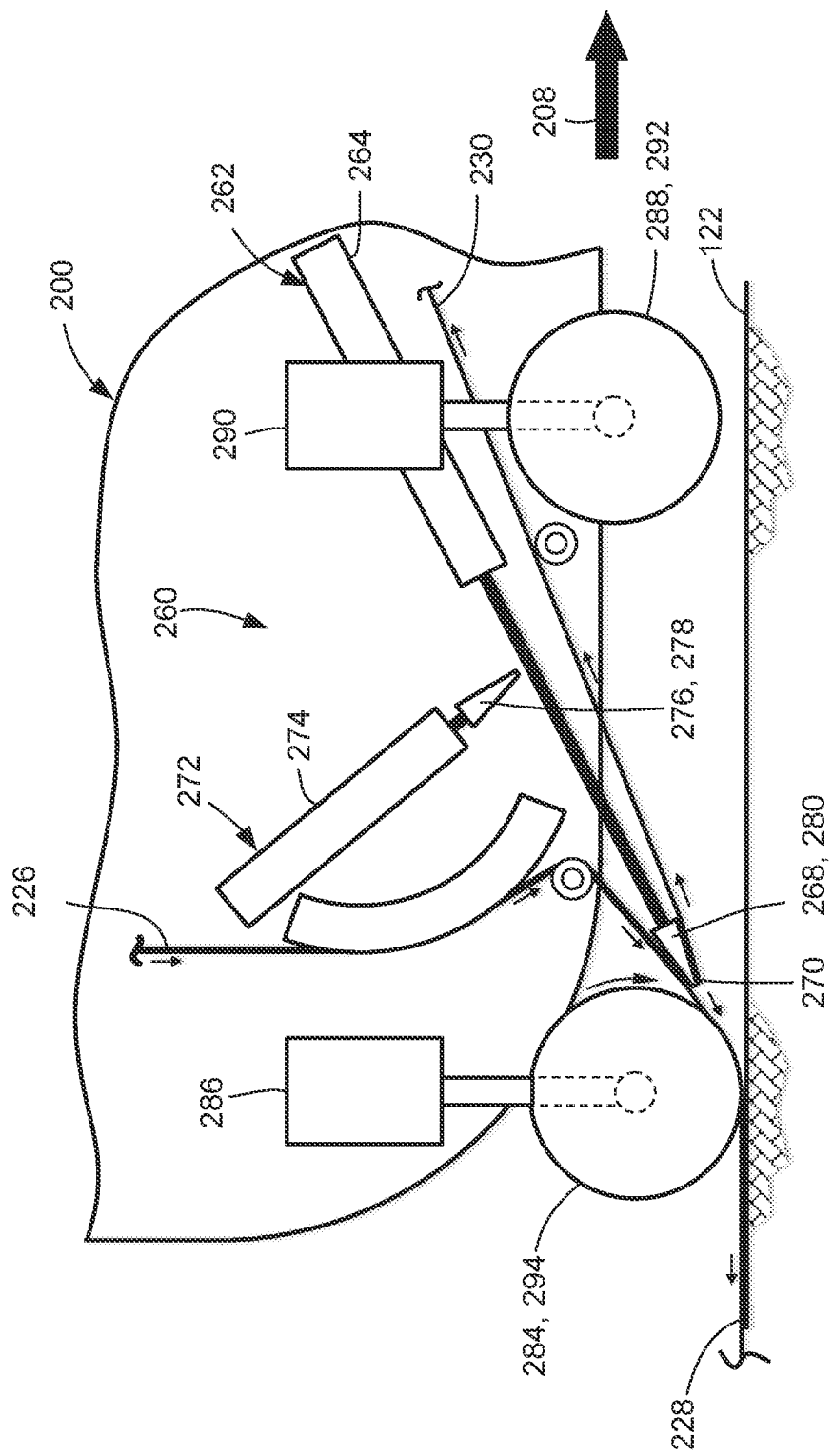
FIG. 37 is a magnified view of the portion of the lamination head identified by reference numeral 37 of FIG. 36, and illustrating the first separation device and a first compaction device, each in an extended position for separating the layup material from the backing layer, and dispensing the layup material onto a substrate while the lamination head moves along a first direction of travel.
Figure 38:
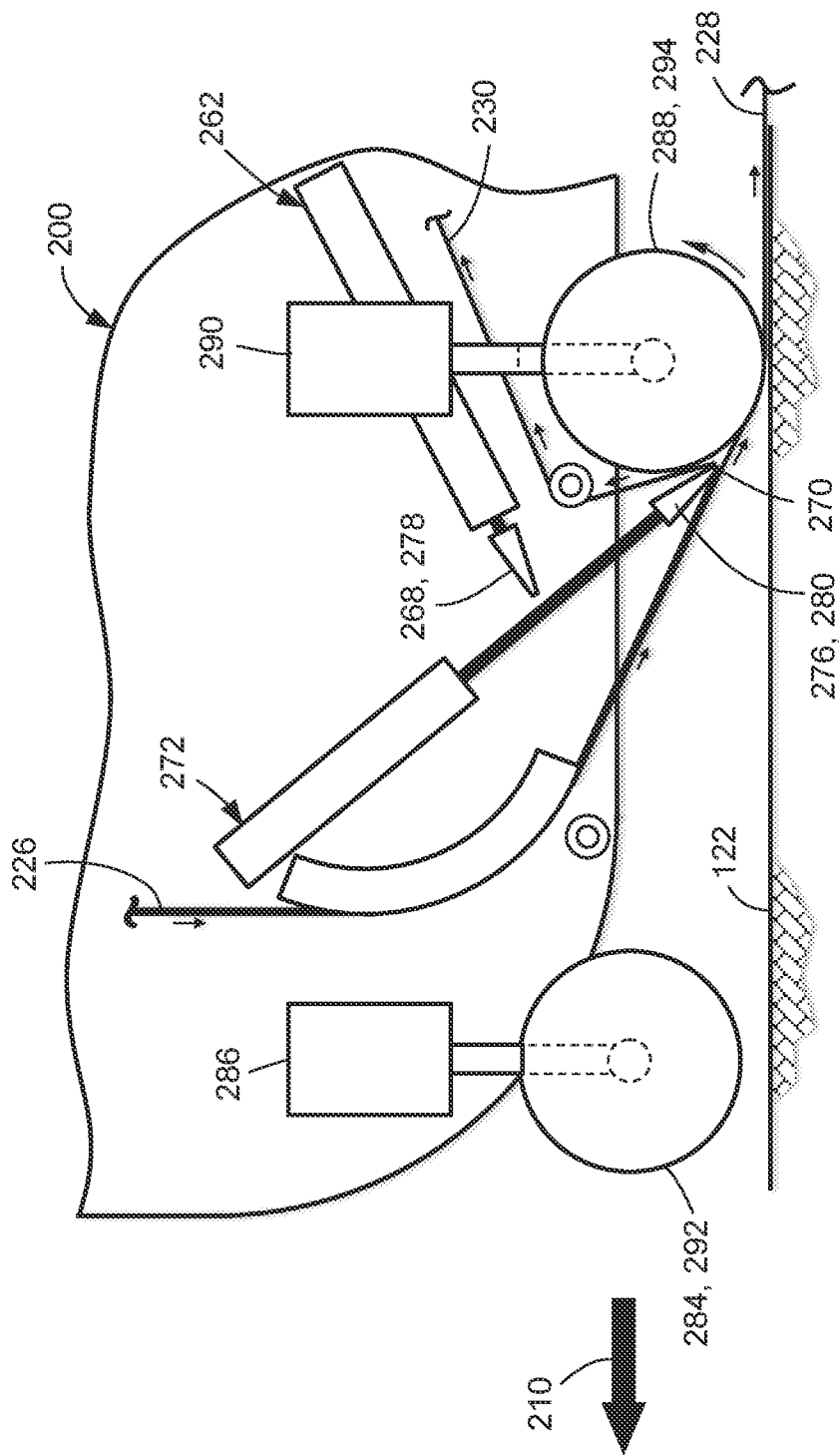
FIG. 38 shows the second separation device and a second compaction device, each in an extended position for separating the layup material from the backing layer, and dispensing layup material onto the substrate while the lamination head moves along a second direction of travel opposite the first direction of travel.

In FIG. 6, the lamination head 200 may include the first compaction device 284 and the second compaction device 288, which are configured to apply compaction pressure onto the layup material 228 against the substrate 122 (FIG. 37) as the layup material 228 is dispensed by the lamination head 200. For example, the first compaction device 284 is configured to apply compaction pressure onto the layup material 228 against the substrate 122 as the lamination head 200 moves along the first direction of travel 208 (FIG. 37). The second compaction device 288 is configured to apply compaction pressure onto the layup material 228 against the substrate 122 (FIG. 38) as the lamination head 200 is moving along the second direction of travel 210 (FIG. 38). The first compaction device 284 may include a first compaction device actuator 286 (e.g., a linear actuator) for moving the first compaction device 284 between a compaction device retracted position 292 (e.g., a raised position) in which the first compaction device 284 is in non-contact relation to the substrate 122, and a compaction device extended position 294 (e.g., a lowered position) in which the first compaction device 284 is in contact with the substrate 122. Similarly, the second compaction device 288 may include a second compaction device actuator 290 (e.g., a linear actuator) for moving the second compaction device 288 between a compaction device retracted position 292 and a compaction device extended position 294.

As described below, when the lamination head 200 is moving along the first direction of travel 208 (FIG. 37), the second compaction device 288 may be raised off of the substrate 122, and the first compaction device 284 may be lowered onto the substrate 122 for compacting the layup material 228 after separation from the backing layer 230 via the first horn 268. When the lamination head 200 is moving along the second direction of travel 210 (FIG. 38), the first compaction device 284 may be raised off of the substrate 122, and the second compaction device 288 may be lowered onto the substrate 122 for compacting the layup material 228 after separation from the backing layer 230 via the second horn 276. Although shown as compaction rollers, the first and second compaction devices 284, 288 may each be provided in alternative configurations, such as a compaction shoe (not shown), or as a resiliently-compressible compaction bladder (not shown) for glide forming the layup material 228 onto a contoured lamination mandrel (not shown) having an outer surface that has a non-planar cross-sectional shape.

Referring to FIGS. 6-7, shown is the material threading system 320 configured to thread at least the backing layer 230 through the lamination head 200 and into engagement with backing layer collection drum 300. The backing layer collection drum 300 may be rotatably driven by a collection drum motor 302, which is configured to pull at least the backing layer 230 through the lamination head 200 during application of the layup material 228 onto the substrate 122 (FIG. 5). In addition, the backing layer 230 is configured to wind at least the backing layer 230 onto the backing layer collection drum 300 as the lamination head 200 applies the layup material 228 onto the substrate 122.

The material threading system 320 includes one or more belt raceways 324 located on one side of the material path 322 (FIG. 5) through the lamination head 200. The belt raceway 324 includes a continuous-loop threading belt 326 supported on a plurality of belt rollers 328 driven by a belt drive motor 330. The belt raceway 324 may be located on an inner side of the material path 322 adjacent the mounting frame 202. In the example shown in the figures, the lamination head 200 includes a pair of belt raceways 324 respectively located on opposite sides of the material path 322 (FIG. 5) through the lamination head 200. For example, as shown in FIG. 5, one of the belt raceways 324 may be located on an inner side of the material path 322 adjacent the mounting frame 202, and the other belt raceway 324 may be located on an outer side of the material path 322. The one or more belt raceways 324 each comprise a continuous-loop threading belt 326 supported on a plurality of belt rollers 328. The belt rollers 328 may be driven by one or more belt drive motors 330. Each of the threading belts 326 may be configured as a fiber-reinforced rubber block-toothed belt supported on belt rollers 328, each of which may be configured as block-toothed pulleys for engaging the block-toothed threading belts 326. In alternative example, each of the threading belts 326 may be configured as a chain (not shown) comprised of a series of pivotably connected chain links supported on sprockets (not shown) having teeth configured to engage the chain links. Regardless of the specific configuration of the threading belts 326 and the guide rollers 204, at least one of the belt rollers 328 may be rotatably driven by a belt drive motor 330 which may be controlled by the controller 112. For example, the pair of threading belts 326 may be respectively driven by a pair of belt drive motors 330 (e.g., electric motors) controlled by the controller 112 (FIG. 1).

Referring still to FIGS. 6-7, the material threading system 320 also includes at least one belt-mounted layer engagement device 350 coupled to the threading belts 326. The belt-mounted layer engagement device 350 is configured to engage a backing layer leading edge portion 232 (FIG. 8) of the backing layer 230 prior to pulling at least the backing layer 230 through the lamination head 200. The one or more belt drive motors 330 are configured to drive the one or more threading belts 326 (e.g., a pair of threading belts 326), and thereby cause the belt-mounted layer engagement device 350 to draw at least the backing layer 230 from the material roll 224 and thread at least the backing layer 230 along the material path 322 (FIG. 5) through the lamination head 200 and position the backing layer leading edge portion 232 for engagement with the backing layer collection drum 300. For example, as described below, when the one or more belt drive motors 330 are activated by the controller 112, the belt-mounted layer engagement device 350 may pull the backing layer leading edge portion 232 over the upper guide surface 206, through a gap between the cutter module 252 and cutter platen 254 of the cutter assembly 250, over the lower guide surface 206, past the backing layer separation assembly 260, and into close proximity to the backing layer collection drum 300.

Referring to FIG. 8, shown is an example of the belt-mounted layer engagement device 350 configured as an electromagnetic member 355 coupled to at least one threading belt 326 and configured to magnetically couple to a magnetically-attractable element 234 that may be included with the backing layer leading edge portion 232, as described below. For example, the electromagnetic member 355 may be activatable (e.g., via an electromagnetic power supply—not shown) between an unpowered state and a powered state. In the powered state, the electromagnetic member 355 may magnetically couple to the magnetically-attractable element of the backing layer leading edge portion 232. In the example of FIG. 8, the lamination head 200 includes a pair of the threading belts 326, and the electromagnetic member 355 is configured as a generally rigid electromagnetic crossmember 356 extending between the pair of threading belts 326, and is configured to magnetically couple to a magnetically-attractable element 234 that may be included with the backing layer leading edge portion 232.

In an alternative arrangement, the belt-mounted layer engagement device 350 may be configured as a fastener member 355 (FIG. 8) coupled to at least one threading belt 326. The fastener member 355 may include a loop element strip or a hook element strip (e.g., Velcro™—not shown) configured to releasably engage to a fastener element 236 (FIG. 24) that may be included on the backing layer leading edge portion 232. The fastener element 236 may be a hook element strip or a loop element strip configured to respectively engage with the loop element strip or hook element strip of the fastener member 355. In the example shown, the fastener member 355 may be configured as a fastener crossmember 358 extending between the pair of threading belts 326, and configured to releasably engage to a fastener element 236 that may be included on the backing layer leading edge portion 232.

FIG. 9 shows an example of the belt-mounted layer engagement device 350 configured as at least one belt-mounted clip 352 mounted to at least one threading belt 326, and configured to clamp onto the backing layer leading edge portion 232. In the example shown, the belt-mounted layer engagement device 350 comprises a pair of belt-mounted clips 352 respectively mounted on the threading belts 326. Each belt-mounted clip 352 may include a pair of clip jaws 354 pivotably coupled to each other. The pair of clip jaws 354 of each belt-mounted clip 352 may be actuatable by a clamp actuator (not shown), such as an electromechanical actuator, for clamping onto the backing layer leading edge portion 232. The pair of belt-mounted clips 352 may be oriented in facing relation to each other to allow the belt-mounted clips 352 to clamp onto the opposing side edges of the backing layer leading edge portion 232.

For examples of the lamination head 200 having a single threading belt 326 (i.e., located adjacent the mounting frame 202), the backing layer 230, or at least the backing layer leading edge portion 232, may have a high enough stiffness to allow the belt-mounted layer engagement device 352 to thread the backing layer 230 through the lamination head 200 as described below. In this regard, when the backing layer leading edge portion 232 is engaged to the belt-mounted layer engagement device 350, the relatively higher bending stiffness of the backing layer leading edge portion 232 may prevent the non-supported or non-engaged side of the backing layer leading edge portion 232 from sagging, thereby allowing the belt-mounted layer engagement device 352 to thread the backing layer 230 through the lamination head 200 without the non-engaged side of the backing layer leading edge portion 232 getting caught on the lamination head components. In addition, by limiting the lamination head 200 to a single threading belt 326 supported by a plurality of belt rollers 328 mounted in close proximity to the mounting frame 202 on the inner side of the lamination head 200, the redirect roller 332 of the threading belt 326 may be fixedly mounted proximate the backing layer collection drum 300, as described below.

Referring now to FIGS. 10-12, shown is an example of a reloading cartridge 400 that may be included with the manufacturing system 100 for replacement of a depleted material roll 418 from one or more of the lamination heads 200. FIG. 10 is an end view of the lamination station 136 showing the reloading cartridge 400 positioned adjacent to a lamination head 200 for changeout of a depleted material roll 418 on the lamination head 200. FIG. 11 is a front view of the reloading cartridge 400 showing a plurality of reloading spindles 406, one of which is shown supporting a depleted material roll 418, two of which are empty, and three of which are shown supporting replacement material rolls 420. FIG. 12 is a top-down view of the reloading cartridge 400 showing the reloading spindles 406, including an empty reloading spindle 406, a reloading spindle 406 supporting a replacement material roll 420, and a reloading spindle 406 supporting a depleted material roll 418. Advantageously, the reloading cartridge 400 provides the ability to semi-autonomously and rapidly perform material roll changeouts with minimal impact on production flow, while avoiding the cost and complexity associated with changing out an entire lamination head 200 each time a material roll 224 is depleted.

As described above and shown in FIGS. 1 and 3, the reloading cartridge 400 may be positioned outside of the lamination station 136 during operation of the lamination heads 200. The manufacturing system 100 may include floor-mounted reloading cartridge tracks 402 extending generally parallel to the series of lamination heads 200. The reloading cartridge 400 may include a reloading cartridge drive motor (not shown) for moving the reloading cartridge 400 into and out of the lamination station 136 along the reloading cartridge tracks 402. During operation of the manufacturing system 100, the controller 112 may continuously receive input regarding the amount of layup material 228 remaining on the material roll 224 of each lamination head 200. Upon sensing that the material roll 224 of one or more of the lamination heads 200 is nearing depletion, the controller 112 may command the reloading cartridge 400 to move into the lamination station 136, and/or into proximity with one of the lamination heads 200 to facilitate replacement of a depleted material roll 418 (FIG. 11) with a replacement material roll 420 (FIG. 11). After replacement of the material roll 224 on one or more of the lamination heads 200, the reloading cartridge 400 may be moved back out of the lamination station 136. Although the reloading cartridge 400 is shown and described as being movable via the reloading cartridge tracks 402, the reloading cartridge 400 may be supported by any one of a variety of alternative mechanisms (not shown), such as an overhead gantry, a robotic device, or other mechanisms for moving the reloading cartridge 400 into and out of the lamination station 136 and/or into alignment with each of the lamination heads 200.

Referring to FIGS. 10-14, the reloading cartridge 400 may include a material holder 404 and a material transfer mechanism 430. The material holder 404 may include an array of reloading spindles 406. The reloading spindles 406 may be movable along a circulation path 412 of the material holder 404 via a reloading spindle circulation system 410. The reloading spindle circulation system 410 may include a circulation path motor (not shown) which may be controlled by the controller 112 (FIG. 1). Upon command of the controller 112, the circulation path motor may move the reloading spindles 406 along the circulation path 412 to any one of a plurality of storage positions 414. Each reloading spindle 406 may have an outer diameter that is sized complementary to the outer diameter of the material supply drum 220 on the lamination heads 200, to thereby allow a depleted material roll 418 to be slid (e.g., via the material transfer mechanism 430) off of the material supply drum 220 of a lamination head 200, and onto an empty reloading spindle 406, and also allow a replacement material roll 420 to be slid off of a reloading spindle 406 and onto an empty material supply drum 220 of the lamination head 200.

Figure 14:
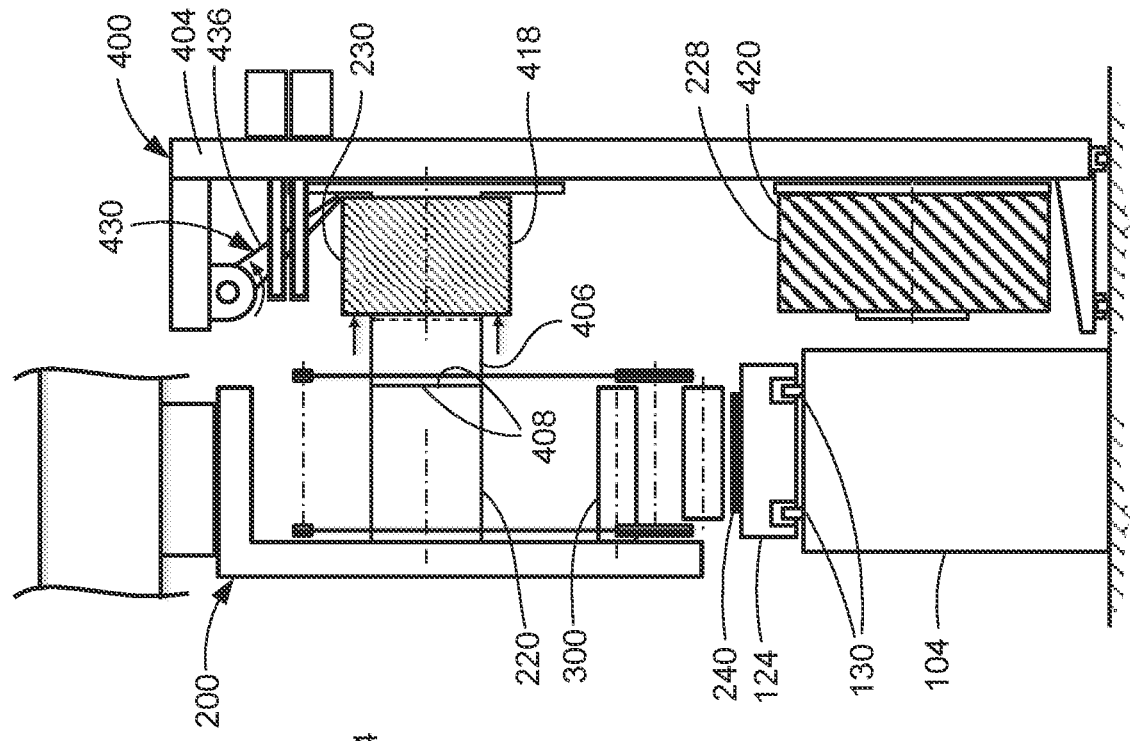
FIG. 14 shows the depleted material roll after transferring onto the reloading cartridge by the material transfer mechanism.
Figure 13:
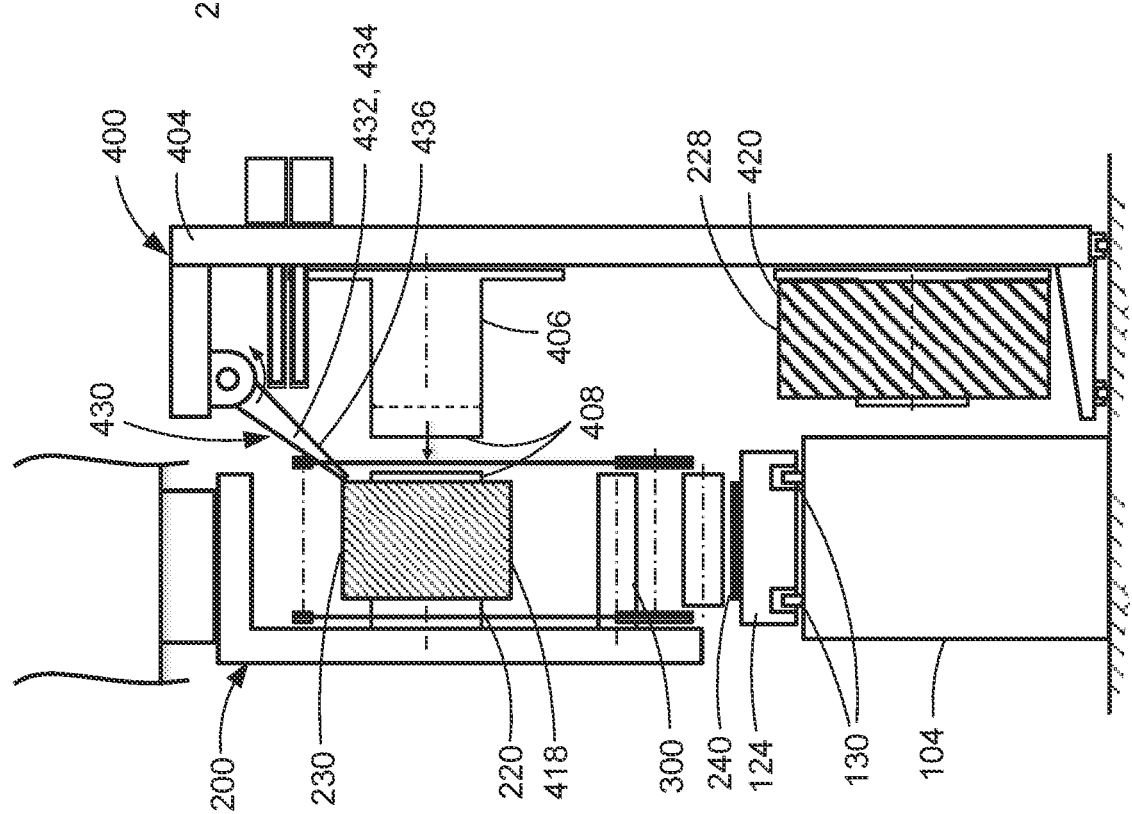
FIG. 13 is a side view of the reloading cartridge positioned adjacent a lamination head and illustrating a free end of one of the reloading spindles telescoping into locked engagement with the free end of the material supply drum on the lamination head, and further illustrating a material transfer mechanism preparing to transfer a depleted material roll from the lamination head onto a reloading spindle of the reloading cartridge.

As shown in FIGS. 13-14, each one of the reloading spindles 406 may be configured to be telescoping for extending into engagement with the material supply drum 220 of a lamination head 200, as described below. The free end of each of the reloading spindles 406 may include a drum-spindle alignment mechanism 408 (FIG. 11) for locked alignment with a corresponding drum-spindle alignment mechanism 408 (FIG. 7) that may be included on the free end of the material supply drum 220 of each lamination head 200. In the example shown, the drum-spindle alignment mechanism 408 on the end of each reloading spindle 406 may be a raised boss having a cross shape, and the drum-spindle alignment mechanism 408 on the end of each material supply drum 220 may be a correspondingly-sized cross-shaped recess for receiving the cross-shaped boss of the reloading spindle 406. However, the drum-spindle alignment mechanism 408 may be provided in any one of a variety of different sizes, shapes, and configurations, and is not limited to a cross-shaped boss and a cross-shaped recess.

Referring still to FIGS. 10-14, as mentioned above, each one of the reloading spindles 406 may be configured to support a material roll 224, such as a depleted material roll 418 or a replacement material roll 420. A depleted material roll 418 may be comprised primarily of backing layer 230 that may be wound onto the backing layer collection drum 300 (FIG. 7) of a lamination head 200 during the application of layup material 228 onto the substrate 122. After depletion of the layup material 228, the backing layer 230 on the backing layer collection drum 300 may be rewound onto the material roll 224 to form a depleted material roll 418, which may then be transferred (via the material transfer mechanism 430) onto an empty reloading spindle 406 of the reloading cartridge 400, as shown in FIGS. 13-14. A replacement material roll 420 may comprise layup material 228 backed by a backing layer 230. As mentioned above, the layup material 228 on a replacement material roll 420 may be composite material (e.g., carbon-fiber epoxy-resin prepreg tape), or the layup material 228 may be a non-composite material such as a processing material (e.g., release film, tackifier film, breather layer, etc.), as described above. Although not shown, replacement material rolls 420 may be manually or autonomously (e.g., via a robotic device) loaded onto the reloading spindles 406. Similarly, depleted material rolls 418 may be manually or autonomously removed from the reloading spindles 406.

In FIGS. 13-14, the material transfer mechanism 430 is shown transferring a depleted material roll 418 from a lamination head 200 to the material holder 404. As mentioned above, once the material roll 224 on a lamination head 200 is depleted of layup material 228, the backing layer 230 on the backing layer collection drum 300 may be rewound back onto the material supply drum 220. The reloading spindle circulation system 410 (FIG. 11) may circulate the reloading spindles 406 until an empty reloading spindle 406 is positioned at the center-top storage position 416 (e.g., FIG. 11) and in alignment with the depleted material roll 418 on the lamination head 200. As shown in FIGS. 13-14, the empty reloading spindle 406 may telescope into engagement with the material supply drum 220 of the lamination head 200. As mentioned above, the drum-spindle alignment mechanism 408 (FIG. 11) on the free end of the empty reloading spindle 406 may engage in locked alignment with a corresponding drum-spindle alignment mechanism 408 (FIG. 7) on the free end of the material supply drum 220.

The material transfer mechanism 430 may include a reloading actuator 432 configured to engage or grab the depleted material roll 418 on the lamination head 200, and transfer the depleted material roll 418 onto the empty reloading spindle 406. In the example shown, the reloading actuator 432 is configured as a reloader robotic device 434 having a reloader robotic arm 436. The reloader robotic arm 436 may have an end effector (not shown) such as a vacuum pad, a gripper mechanism, or other mechanism configured to engage or otherwise clamp onto a depleted material roll 418 on a lamination head 200. The reloader robotic arm 436 may be telescoping for extending into engagement with the depleted material roll 418 on the lamination head 200. After the depleted material roll 418 is transferred from the lamination head 200 onto the reloading cartridge 400, the drum-spindle alignment mechanism 408 on the end of the reloading spindle 406 may disengage from the drum-spindle alignment mechanism 408 on the end of the material supply drum 220, as shown in FIG. 15.

Referring to FIGS. 16-19, the reloading cartridge 400 includes the above-mentioned reloading spindle circulation system 410, which may circulate the reloading spindles 406 to move a reloading spindle 406 (supporting a replacement material roll 420) into the center-top storage position 416 (e.g., FIG. 16) for alignment with the empty material supply drum 220 on the lamination head 200. The reloading cartridge 400 may also include a pair of leading edge alignment rollers 438 mounted one above the other on the material holder 404 proximate the center-top storage position 416. The leading edge alignment rollers 438 may be vertically positioned relative to each other to define a roller interface 442 (FIG. 19) between the leading edge alignment rollers 438. The leading edge alignment rollers 438 may be independently movable toward and away from each other for adjusting the size of the gap at the roller interface 442 to accommodate backing layers 230 and/or backed material 226 of different thicknesses. For example, the gap at the roller interface 442 may be adjustable from a zero gap (0.00 inch) to a gap of 0.005 inch or greater, depending upon the thickness of the backing layer leading edge portion 232 to be captured or clamped between the leading edge alignment rollers 438 at the roller interface 442.

Figure 19:
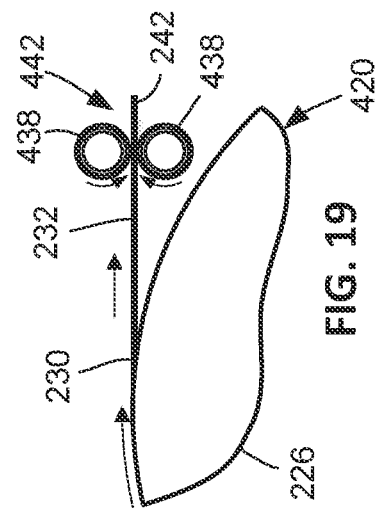
FIG. 19 is a magnified view of the portion of the reloading cartridge identified by reference numeral 19 of FIG. 18, and illustrating the forwardmost edge of the backing layer leading edge portion drawn in between the counter-rotating leading edge alignment rollers.

As shown in FIG. 19, in preparation for transferring a replacement material roll 420 from the reloading cartridge 400 onto an empty material supply drum 220 (FIG. 17) of a lamination head 200 (FIG. 17), the leading edge alignment rollers 438 may be driven by alignment roller motors 440 for counter-rotating the leading edge alignment rollers 438 for drawing the backing layer leading edge portion 232 into the roller interface 442. The forwardmost edge 242 of the backing layer leading edge portion 232 may be manually or autonomously pulled off of the replacement material roll 420 on the reloading spindle 406 at the center-top storage position 416, and positioned at the roller interface 442. The counter-rotating motion of the leading edge alignment rollers 438 may draw in the forwardmost edge 242 of the backing layer leading edge portion 232 until the backing layer leading edge portion 232 is clamped within the roller interface 442. As described below and shown in FIG. 20, the leading edge alignment rollers 438 may be telescopically extended for positioning the backing layer leading edge portion 232 (FIG. 20) for engagement with the material threading system 320 of the lamination head 200 (FIG. 20).

Figure 18:
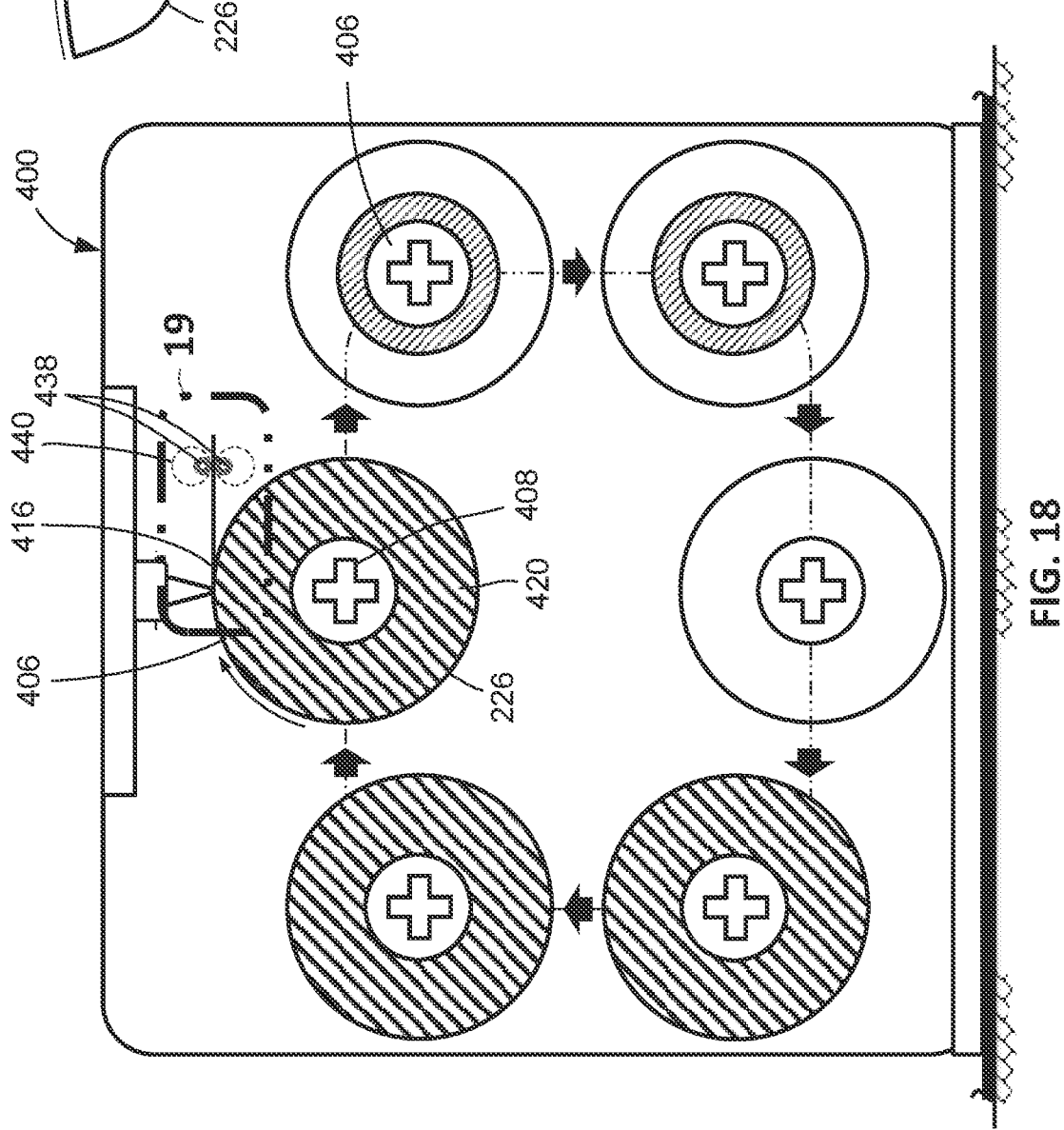
FIG. 18 is a side view of the reloading cartridge showing a forwardmost edge of the backing layer leading edge portion after manual insertion between the leading edge alignment rollers.

Referring to FIG. 18, in addition to the adjustability of the vertical position of the leading edge alignment rollers 438 relative to each other, the position of the leading edge alignment rollers 438 relative to the center-top storage position 416 may also be vertically adjustable to allow for positioning the roller interface 442 at a height that is compatible with the height of the uppermost side of the outer diameter of a replacement material roll 420 on the reloading spindle 406 at the center-top storage position 416. For example, the leading edge alignment rollers 438 may be vertically adjustable to position the roller interface 442 at approximately the same height as a horizontal tangent (not shown) to the uppermost side of the outer diameter of a replacement material roll 420. The vertical adjustability of the leading edge alignment rollers 438 may accommodate replacement material rolls 420 having different outer diameters. Differences in the outer diameter of replacement material rolls 420 may be due to different thicknesses of layup material 228 that are respectively wound onto different replacement material rolls 420, and/or due to differences in the total length of continuous backed material 226 respectively wound onto different replacement material rolls 420.

Referring to FIGS. 20-21, once the forwardmost edge 242 (FIG. 19) of the backing layer leading edge portion 232 has been inserted into the roller interface 442 (FIG. 19) between the leading edge alignment rollers 438, the horizontal position of the reloading cartridge 400 may be adjusted (e.g., via the reloading cartridge tracks 402—FIG. 3) to position the reloading spindle 406 (i.e., at the center-top storage position 416) into alignment with the empty material supply drum 220 of the lamination head 200. The reloading spindle 406 may be telescopically extended into engagement with the free end of the material supply drum 220. The drum-spindle alignment mechanism 408 (FIG. 18) on the free end of the reloading spindle 406 may engaged in locked alignment with the corresponding drum-spindle alignment mechanism 408 (FIG. 7) on the free end of the material supply drum 220. The material transfer mechanism 430 (e.g., the reloader robotic arm 436) may then transfer the replacement material roll 420 from the reloading spindle 406 onto the empty material supply drum 220 on the lamination head 200. Simultaneously, the leading edge alignment rollers 438 (which are clamping the backing layer leading edge portion 232—FIG. 19) may telescopically extend toward the lamination head 200 until the forwardmost edge 242 (FIG. 19) of the backing layer leading edge portion 232 is positioned into close proximity to the belt-mounted layer engagement device 350 (FIG. 21).

Referring to FIGS. 21-28, shown in FIG. 21 is the lamination head 200 after the transfer of the replacement material roll 420 from the reloading spindle 406 (FIG. 20) onto the material supply drum 220. Shown in FIG. 22 is the backing layer leading edge portion 232 captured between the telescopically-extended leading edge alignment rollers 438. Also shown is an example of the belt-mounted layer engagement device 350 supported on the threading belts 326. As shown in FIGS. 23-24, the alignment roller motors 440 may be activated for counter-rotating the leading edge alignment rollers 438 until a relatively short length of the backing layer leading edge portion 232 protrudes outwardly from the roller interface 442 along a direction toward the one or more threading belts 326 of the lamination head 200. The one or more belt drive motors 330 may be activated for driving the one or more threading belts 326 over the belt rollers 328, thereby causing the belt-mounted layer engagement device 350 to move (i.e., rotate) into engagement with the forwardmost edge 242 of the backing layer leading edge portion 232, thereby handing off the backing layer leading edge portion 232 from the leading edge alignment rollers 438 to the belt-mounted layer engagement device 350.

Figure 25:
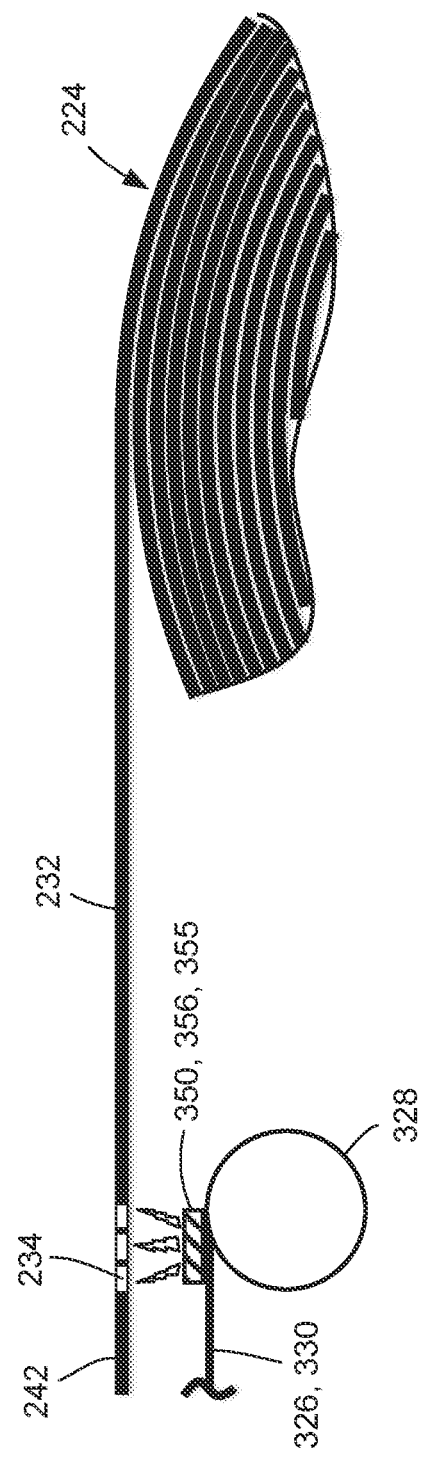
FIG. 25 is a magnified view of the portion of the lamination head identified by reference numeral 25 of FIG. 24, and illustrating an example of the belt-mounted layer engagement device configured as an electromagnetic crossmember configured to magnetically couple to a magnetically-attractable element included with the backing layer leading edge portion.

Referring to FIG. 25, shown is an example of the belt-mounted layer engagement device 350 configured as an electromagnetic member 355. As mentioned above, the electromagnetic member 355 may be an electromagnetic crossmember 356 that may extend between a pair of threading belts 326, and may be activatable (e.g., via an electromagnetic power supply—not shown) for magnetically coupling to a magnetically-attractable element 234 that may be included with the backing layer leading edge portion 232. The magnetically-attractable element 234 may comprise a relatively thin strip of metallic material or other magnetically attractable material that may be mounted on, adhesively bonded to, or otherwise included with the forwardmost edge 242 of the backing layer leading edge portion 232. The magnetically-attractable element 234 may be located a short distance (e.g., less than 1 inch) upstream of the forwardmost edge 242 of the backing layer leading edge portion 232, so that the forwardmost edge 242 protrudes in a downstream direction from the belt-mounted layer engagement device 350, and which may facilitate insertion of the forwardmost edge 242 of the backing layer leading edge portion 232 into the drum-mounted layer engagement device 306 (FIG. 31) as the drum-mounted layer engagement device 306 approaches the collection drum opening 304 (FIG. 31) of the backing layer collection drum 300 (FIG. 31), as described below.

As an alternative to an electromagnetic crossmember 356 coupling to a magnetically-attractable element 234, the belt-mounted layer engagement device 350 may be configured as one or more belt-mounted clips 352, such as the pair of electro-mechanically actuated belt-mounted clips 352 shown in FIG. 9 for clamping onto the backing layer leading edge portion 232. In a still further example, the belt-mounted layer engagement device 350 may be configured as a fastener member 357, such as the above-described fastener crossmember 358 (FIG. 8) having a loop element strip (not shown) or a hook element strip (not shown) configured to be releasably engaged respectively to a hook element strip or loop element strip that may be included on the backing layer leading edge portion 232. However, the belt-mounted layer engagement device 350 may be provided in any one of a variety of other arrangements for releasable coupling of the backing layer leading edge portion 232 to the belt-mounted layer engagement device 350.

Figure 26:
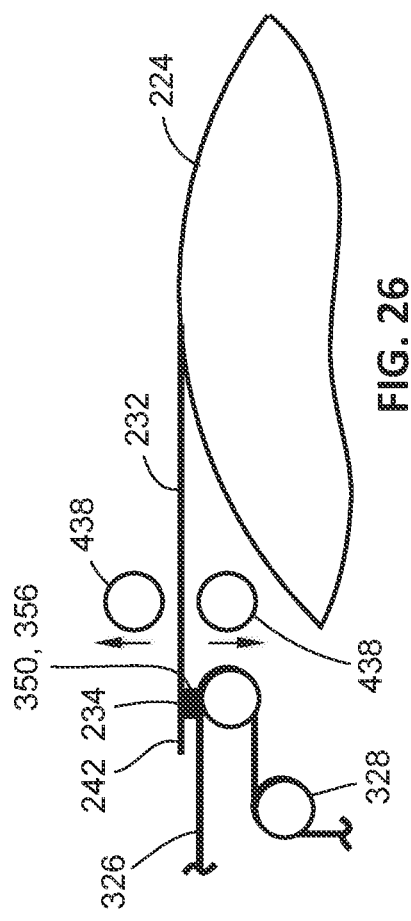
FIG. 26 shows the leading edge alignment rollers moving away from each other to unclamp the backing layer leading edge portion, which is engaged to the belt-mounted layer engagement device.
Figure 27:
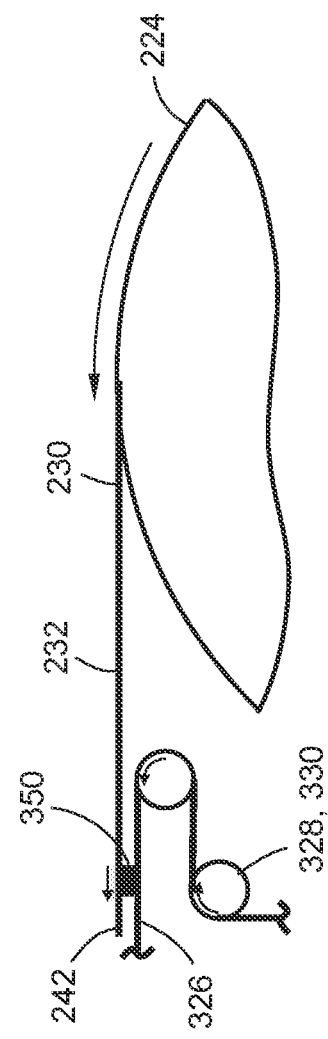
FIG. 27 shows the belt-mounted layer engagement device drawing the backing layer off of the material supply roll and threading the backing layer through the lamination head.
Figure 28:
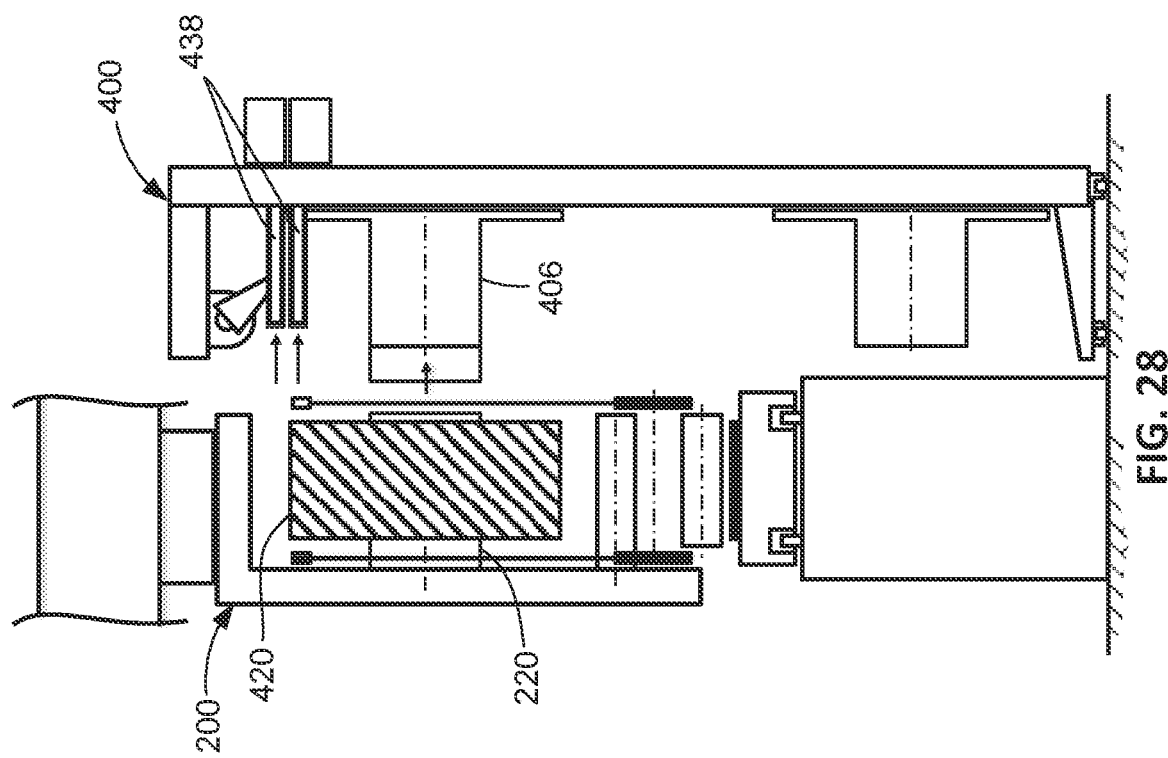
FIG. 28 is a side view of the reloading cartridge showing the retraction of the leading edge alignment rollers, and retraction of the reloading spindle.

Referring to FIGS. 26-28, once the backing layer leading edge portion 232 is engaged to the belt-mounted layer engagement device 350, the leading edge alignment rollers 438 may be independently moved away from each other for unclamping the backing layer leading edge portion 232, as shown in FIG. 26. As shown in FIG. 28, the leading edge alignment rollers 438 may be telescopically retracted back toward the reloading cartridge 400. In addition, the reloading spindle 406 may be telescopically retracted away from the material supply drum 220, and the reloading cartridge 400 may be moved out of the lamination station 136 (e.g. via the reloading cartridge tracks 402—FIG. 1). As shown in FIG. 27, the belt drive motor 330 may then be activated to drive the one or more threading belts 326 over the belt rollers 328, thereby pulling the belt-mounted layer engagement device 350 along the material path 322 (FIG. 7) for threading at least the backing layer 230 through the lamination head 200.

Figure 29:
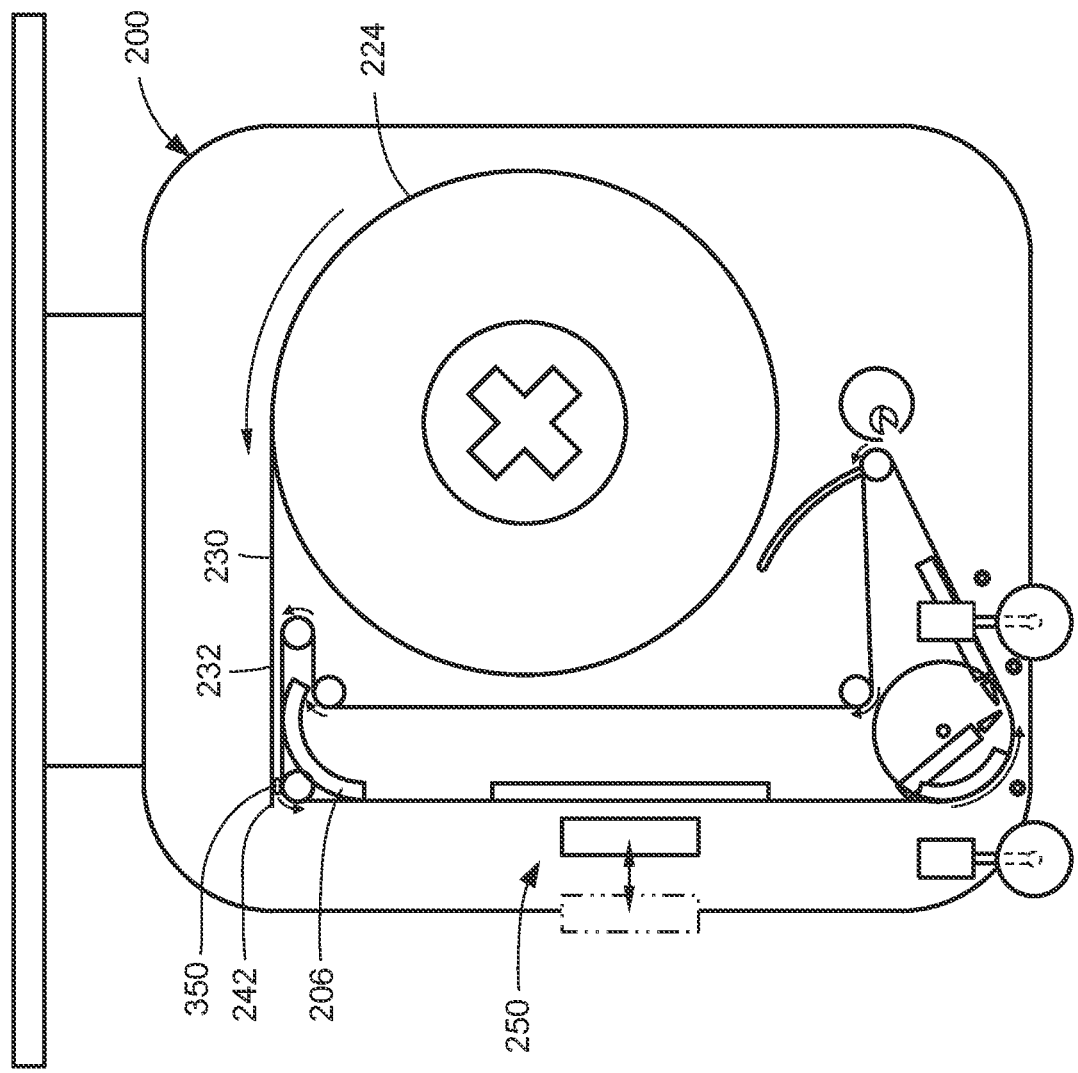
FIG. 29 is a side view of the lamination head showing the progression of the threading of the backing layer through the lamination head via the material threading system.
Figure 30:
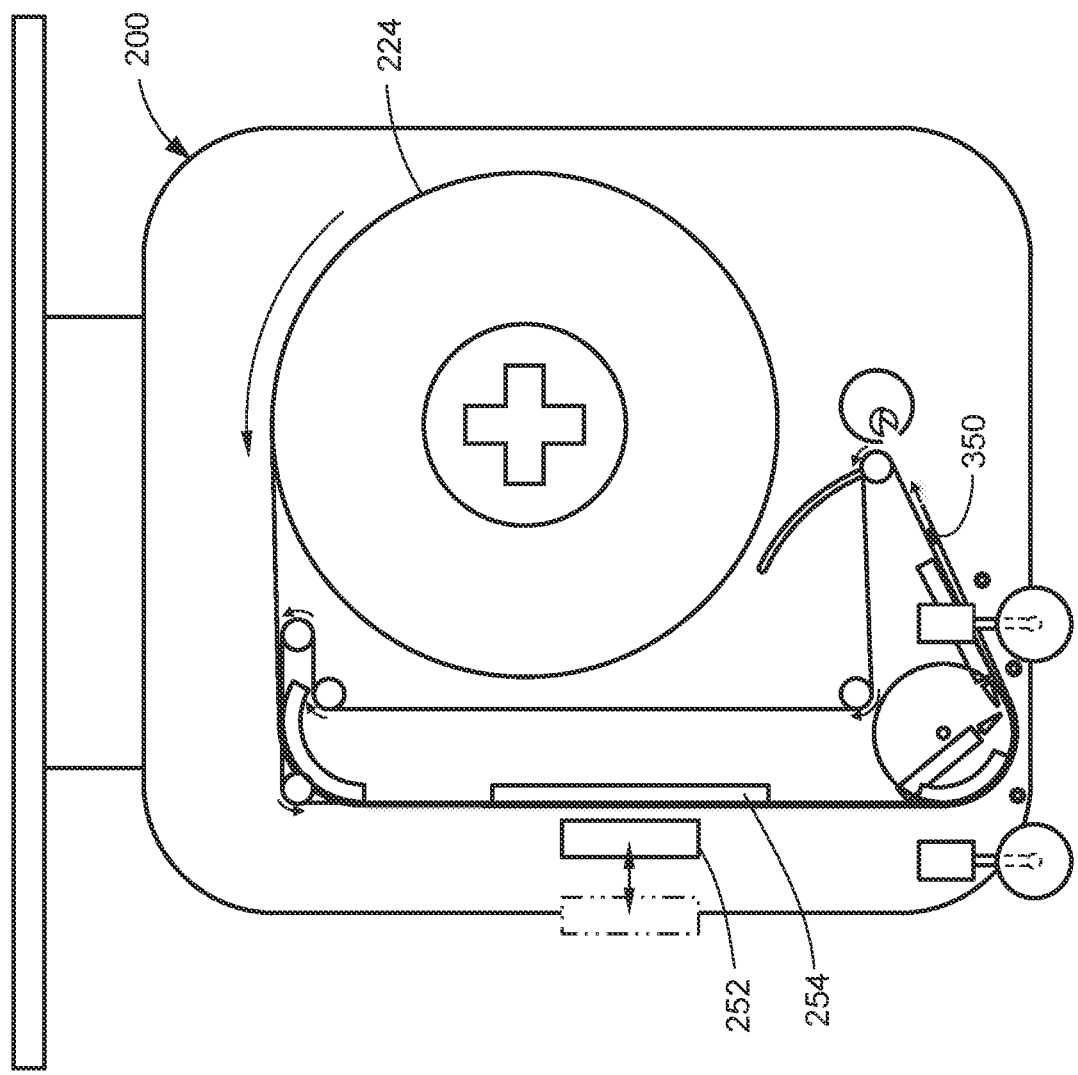
FIG. 30 shows the backing layer leading edge portion approaching the backing layer collection drum after the threading of the backing layer through the cutter assembly and the backing layer separation assembly of the lamination head.

Referring to FIGS. 29-31, shown is the progression of the threading of the backing layer 230 through the lamination head 200 via the belt-mounted layer engagement device 350. FIG. 29 shows the initial stage of the threading process wherein the belt-mounted layer engagement device 350 is shown drawing the forwardmost edge 242 of the backing layer leading edge portion 232 over the guide surface 206 above the cutter assembly 250. FIG. 30 shows the belt-mounted layer engagement device 350 after passing between the cutter module 252 and cutter platen 254, which may be temporarily separated to provide clearance for passage of the belt-mounted layer engagement device 350. FIG. 31 shows the belt-mounted layer engagement device 350 moving the forwardmost edge 242 of the backing layer leading edge portion 232 into the drum-mounted layer engagement device 306 included with the backing layer collection drum 300.

FIG. 31 also shows a redirect roller 332 that may be included with the plurality of belt rollers 328 supporting the one or more threading belts 326. As mentioned above, for examples of the lamination head 200 having a single threading belt 326, the redirect roller 332 may be fixedly mounted to the mounting frame 202 at the redirect roller engagement position 338. However, for examples of the lamination head 200 having a pair of threading belts 326 located on opposite sides of the material path 322, the belt rollers 328 supporting the pair of threading belts 326 may include a pair of redirect rollers 332. The pair of redirect rollers 332 may be configured to translate along a redirect roller path 334 between a redirect roller home position 336 and a redirect roller engagement position 338. The redirect rollers 332 in the redirect roller home position 336 may be located at a distance from the backing layer collection drum 300 that provides clearance for the backing layer 230 when fully wound onto the backing layer collection drum 300 after the layup material 228 has been depleted from the material roll 224. The redirect rollers 332 in the redirect roller engagement position 338 may be located in close proximity to the backing layer collection drum 300 as shown in FIG. 31, and may orient the belt-mounted layer engagement device 350 to cause the forwardmost edge 242 of the backing layer leading edge portion 232 to be aligned with the drum-mounted layer engagement device 306. The redirect roller path 334 may be an arcuate path such that the redirect rollers 332 maintain constant tension in the threading belts 326 when the redirect rollers 332 move between the redirect roller home position 336 and the redirect roller engagement position 338.

Referring to FIGS. 32-35, shown is an example of the drum-mounted layer engagement device 306 engaging with the backing layer leading edge portion 232. As shown in FIG. 32, the redirect roller 332 is in the redirect roller engagement position 338 for aligning the forwardmost edge 242 of the backing layer leading edge portion 232 with the collection drum opening 304 (e.g., a slot) in the backing layer collection drum 300. Prior to arrival of the backing layer leading edge portion 232 at the backing layer collection drum 300, the collection drum motor 302 may orient the collection drum opening 304 to face toward the oncoming direction of the forwardmost edge 242 of the backing layer leading edge portion 232. The movement of the threading belts 326 may be halted at the point in time when the forwardmost edge 242 of the backing layer leading edge portion 232 is positioned in close proximity to the drum-mounted layer engagement device 306 to facilitate engagement with the drum-mounted layer engagement device 306. As described below, the belt-mounted layer engagement device 350 is configured to release the backing layer leading edge portion 232 after the drum-mounted layer engagement device 306 is engaged to the backing layer leading edge portion 232, thereby handing off the backing layer 230 from the belt-mounted layer engagement device 350 to the backing layer collection drum 300.

In the example of FIGS. 32-35, the drum-mounted layer engagement device 306 may comprise at least one drum-mounted clamp mechanism 308 contained within the backing layer collection drum 300. The drum-mounted clamp mechanism 308 may include a pair of clamp jaws 310 pivotably coupled to each other and actuatable by one or more clamp actuators (not shown) for clamping onto the forwardmost edge 242 of the backing layer leading edge portion 232. As shown in FIG. 32, the clamp jaws 310 of the drum-mounted clamp mechanism 308 may be oriented to open in a direction facing the forwardmost edge 242 of the backing layer leading edge portion 232. The backing layer leading edge portion 232 may have a higher bending stiffness (e.g., in the axial direction) than the bending stiffness of upstream portions of the backing layer 230. The relatively higher bending stiffness of the backing layer leading edge portion 232 may prevent the backing layer leading edge portion 232 from bending side to side, and instead maintaining a relatively straight shape to facilitate insertion of the forwardmost edge 242 into the drum-mounted layer engagement device 306. In addition, the relatively higher bending stiffness of the backing layer leading edge portion 232 may facilitate engagement with the belt-mounted layer engagement device 350 described above and shown in FIGS. 22-24.

FIG. 33 shows the drum clamp jaws 310 of the drum-mounted clamp mechanism 308 clamping onto the forwardmost edge 242 of the backing layer leading edge portion 232. Once the backing layer leading edge portion 232 is engaged to the drum-mounted layer engagement device 306 (e.g., the drum-mounted clamp mechanism 308), the redirect roller 332 may be moved from the redirect roller engagement position 338 (FIG. 36) to the redirect roller home position 336 (FIG. 31) to provide clearance for the backing layer 230 to wind onto the backing layer collection drum 300. With the redirect roller 332 in the redirect roller home position 336, the material threading system 320 may be stationary during the application of layup material 228 (FIG. 5) onto the substrate 122 (FIG. 5). FIG. 34 shows the initial rotation of the backing layer collection drum 300 with the backing layer leading edge portion 232 engaged to the drum-mounted layer engagement device 306. FIG. 35 shows several wraps of the backing layer leading edge portion 232 wound onto the backing layer collection drum 300.

As an alternative to the drum-mounted clamp mechanism 308, the drum-mounted layer engagement device 306 may be configured as a drum-mounted electromagnetic engagement device (not shown) configured to magnetically couple to the magnetically-attractable element 234 (FIG. 25) that may be mounted to the backing layer leading edge portion 232. In another alternative to the drum-mounted clamp mechanism 308, the drum-mounted layer engagement device 306 may be configured as a drum-mounted vacuum engagement device (not shown) configured to vacuum couple to the backing layer leading edge portion 232. As may be appreciated, the drum-mounted layer engagement device 306 may be provided in any one of a variety of configurations for engaging with the backing layer leading edge portion 232, and is not limited to the drum-mounted clamp mechanism 308 shown in FIGS. 32-35.

Figure 36:
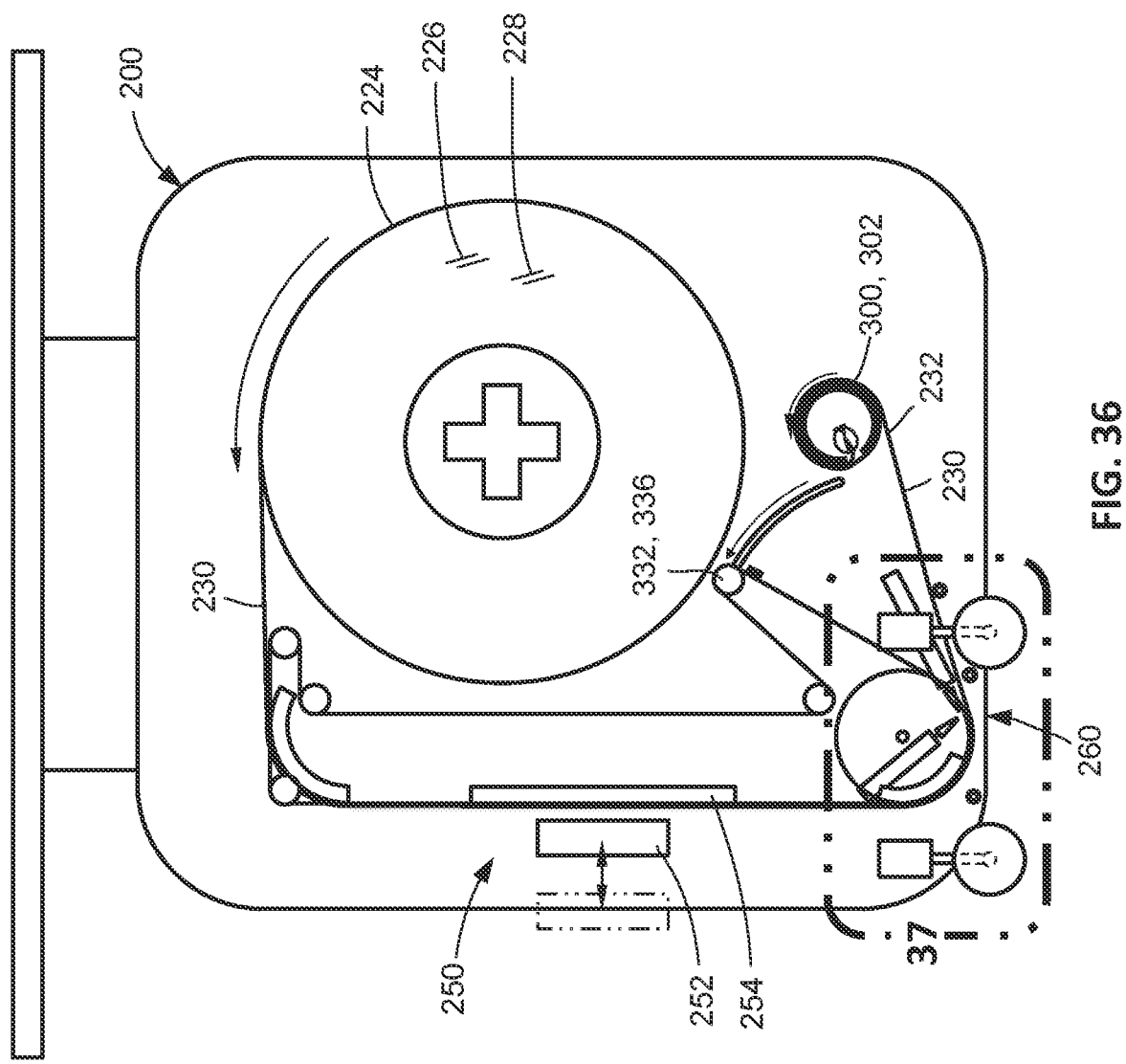
FIG. 36 is a side view of the lamination head showing a redirect roller of the material threading system after moving away from the backing layer collection drum to provide clearance for winding the backing layer onto the backing layer collection drum in preparation for the lamination head dispensing layup material onto the substrate.

FIG. 36 shows the redirect rollers 332 in the redirect roller home position 336. Also shown is the collection drum motor 302 rotating the backing layer collection drum 300 for pulling the backing layer 230 through the lamination head 200. The outermost wraps of the material roll 224 typically consist of only backing layer 230, without any layup material 228. For example, a material roll 224 may be provided with several feet (e.g., up to 15 feet) of only backing layer 230 at the beginning of the material roll 224. Once the backing layer leading edge portion 232 is engaged to the backing layer collection drum 300, the collection drum motor 302 may rotate the backing layer collection drum 300 to pull off enough of the backing layer 230 until backed material 226 (i.e., layup material 228 backed by the backing layer 230) starts moving off of the material roll 224, at which point the cutter assembly 250 and backing layer separation assembly 260 may be activated to start the process of applying layup material 228 (FIG. 37-38) onto the substrate 122 (FIG. 5). For example, as mentioned above, the cutter module 252 and cutter platen 254 may cooperate to cut the layup material 228 as the lamination head 200 approaches the start of a course 238 (FIG. 5) of layup material 228 to be applied onto the substrate 122. The cut in the layup material 228 creates a layup material leading edge (not shown) and a layup material trailing edge (not shown) abutting the layup material leading edge.

Referring to FIGS. 37-38, shown is an example of a lamination head 200 applying layup material 228 onto a substrate 122. As mentioned above, the lamination head 200 includes a backing layer separation assembly 260. In addition, the lamination head 200 may include at least one compaction device. The backing layer separation assembly 260 may include at least one separation device configured to separate the layup material leading edge from the backing layer 230, and direct the layup material 228 toward the substrate 122 and underneath the compaction device for compaction onto the substrate 122 as the lamination head 200 moves along a direction of travel.

FIGS. 37-38 shows the lower portion of a lamination head 200 which has bi-directional layup capability for applying layup material 228 to the substrate 122 along a first direction of travel 208 (FIG. 37), and along a second direction of travel 210 (FIG. 38) opposite the first section of travel 208 (FIG. 37). The backing layer separation assembly 260 may include a first separation device 262 and a second separation device 272 respectively having a first horn 268 and a second horn 276 each movable between a separation device retracted position 278 and a separation device extended position 280. In addition, the lamination head 200 may include a first compaction device 284 and a second compaction device 288 configured to apply compaction pressure onto the layup material 228 against the substrate 122. The first compaction device 284 may include a first compaction device actuator 286 configured as a linear actuator to alternately move the first compaction device 284 between its compaction device retracted position 292 (e.g., a raised position) and its compaction device extended position 294 (i.e., a lowered position). Similarly, the second compaction device 288 may include a second compaction device actuator 290 configured as a linear actuator to alternately move the second compaction device 288 between its compaction device retracted position 292 and its compaction device extended position 294.

Referring to FIG. 37, when the first separation device 262 is in its separation device extended position 280, the first horn 268 is in close proximity to the first compaction device 284. In addition, the first compaction device 284 is lowered onto the substrate 122, and the second horn 276 and the second compaction device 288 are each retracted. The first horn 268 in its separation device extended position 280 is configured to cause the layup material 228 to separate from the backing layer 230, and direct the layup material 228 toward the substrate 122 and underneath the first compaction device 284 as the lamination head 200 moves along the first direction of travel 208.

Referring to FIG. 38, when the second separation device 272 is in its separation device extended position 280, the second horn 276 is in close proximity to the second compaction device 288. In addition, the second compaction device 288 is lowered onto the substrate 122, and the first horn 268 and the first compaction device 284 are both retracted The second horn 276 is configured to cause the layup material 228 to separate from the backing layer 230, and direct the layup material 228 toward the substrate 122 and underneath the second compaction device 288 as the lamination head 200 moves along the second direction of travel 210. The first horn 268 and the second horn 276 each have a horn distal end 270 having a small radius of curvature which causes separation of the layup material leading edge from the backing layer 230 as the backing layer 230 moves around the horn distal end 270 toward the backing layer collection drum 300 and FIG. 36).

Referring still to FIGS. 37-38, the first separation device 262 may have a first separation device actuator 264 configured as a linear actuator to alternately move the first horn 268 between its separation device retracted position 278 and its separation device extended position 280. Similarly, the second separation device 272 may have a second separation device actuator 274 also configured as a linear actuator to move the second horn 276 between its separation device retracted position 278 and its separation device extended position 280. Advantageously, the actuator axes (not shown) of the first separation device 262 and second separation device 272 may be oriented in crossing relation to each other, which may allow for positioning the first horn 268 in close proximity to the first compaction device 284, and allow the second horn 276 to be positioned in close proximity to the second compaction device 288. The ability to position the first horn 268 and the second horn 276 in close proximity respectively to the first compaction device 284 and second compaction device 288 results in a reduction in tensioning and stretching of the unsupported section of layup material (i.e., no backing layer) between the horn distal end 270 of each horn 268, 276 and the substrate 122. The reduction or elimination of stretching in the unsupported section of layup material may reduce or eliminate warpage otherwise occurring in composite laminate 240 in which the layup material is stretched when laid up.

Figure 39:
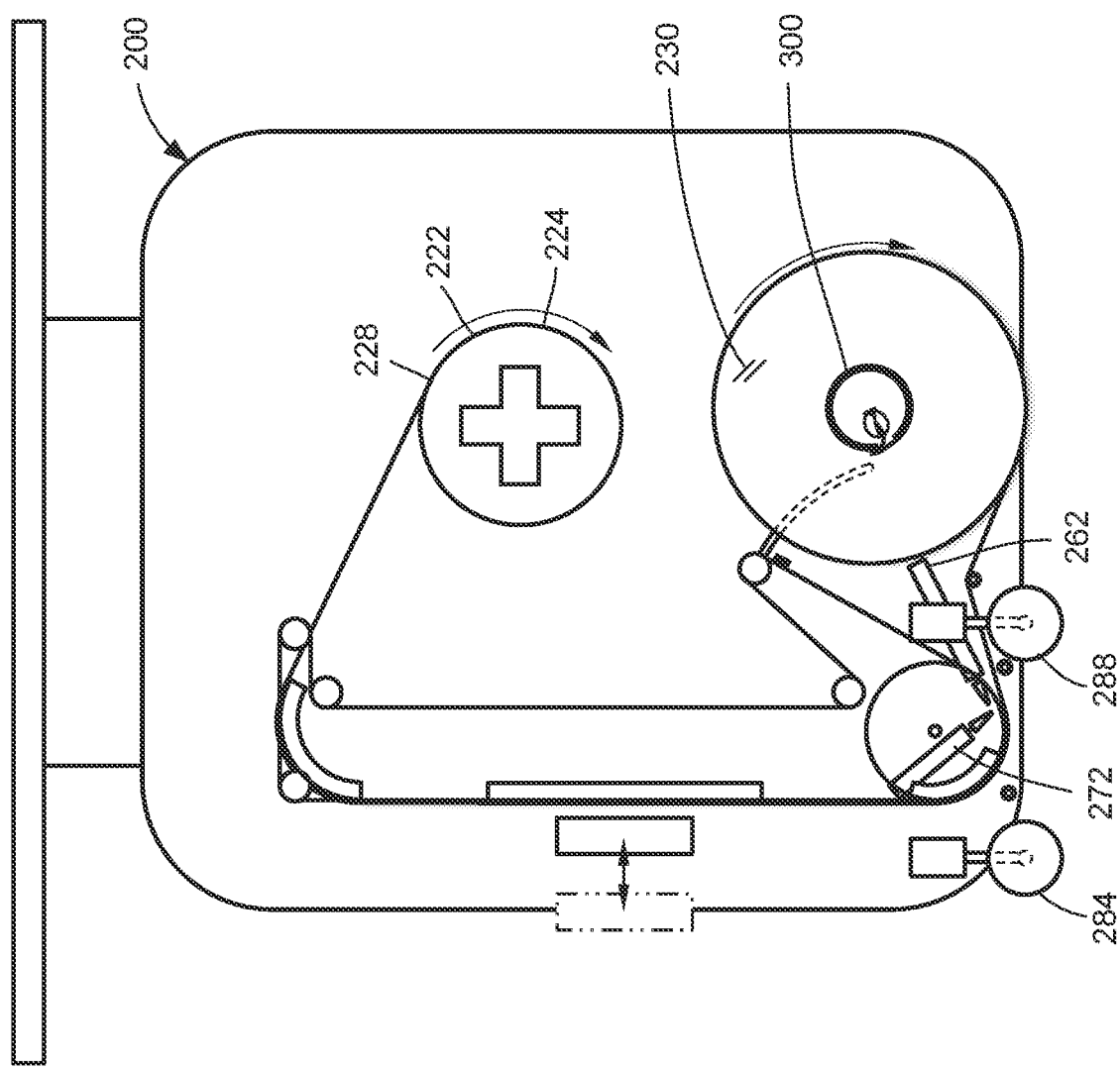
FIG. 39 is a side view of the lamination head showing the depleted material supply drum, and the backing layer collection drum filled with the backing layer.

Referring to FIG. 39, shown is the lamination head 200 with the material roll 224 depleted of layup material 228, and also showing the backing layer 230 wound onto the backing layer collection drum 300. In preparation for rewinding the backing layer 230 onto the material roll 224, the first separation device 262 and second separation device 272 are in their respective retracted positions, as are the first compaction device 284 and second compaction device 288. The supply drum motor 222 may be commanded to rotate the material supply drum 220 in reverse direction for unwinding the backing layer 230 off of the backing layer collection drum 300, and rewinding the backing layer 230 onto the material supply drum 220 to result in a depleted material roll 418 (FIG. 40), comprising primarily backing layer 230.

Figure 40:
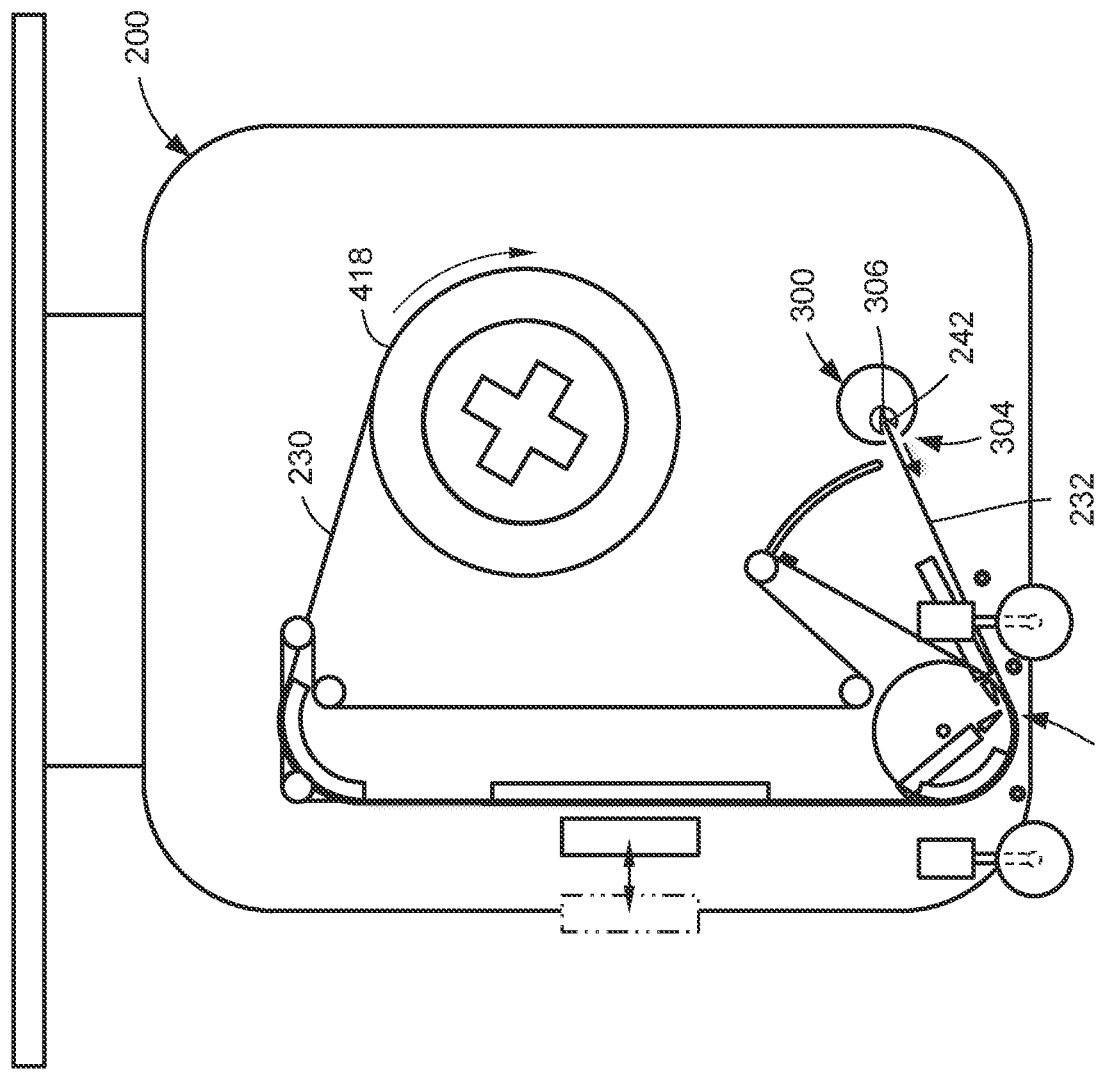
FIG. 40 shows the backing layer leading edge portion during release from the drum-mounted layer engagement device of the backing layer collection drum.
Figure 41:
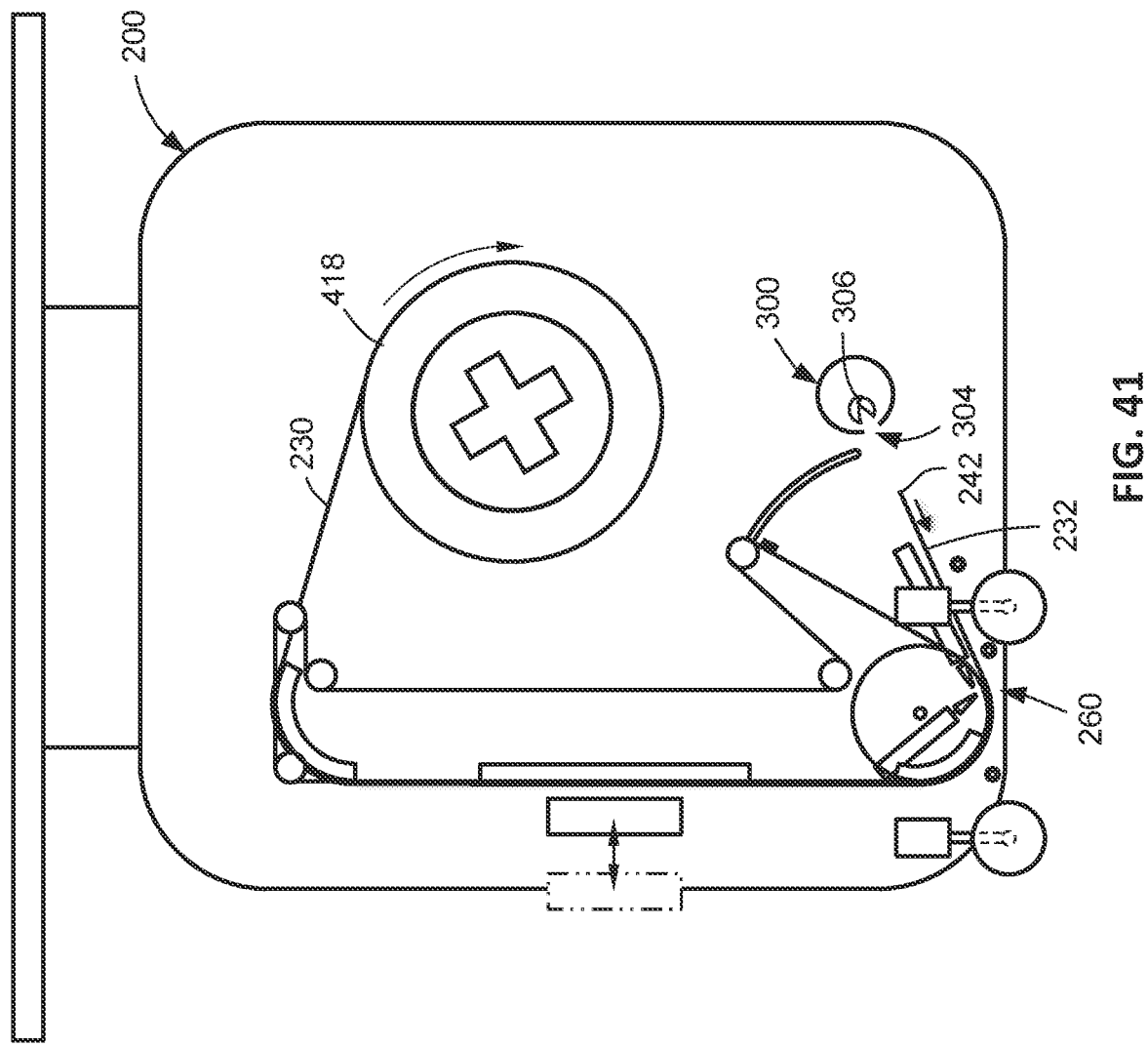
FIG. 41 shows the rotation of the material supply drum pulling the backing layer back through the lamination head.
Figure 42:
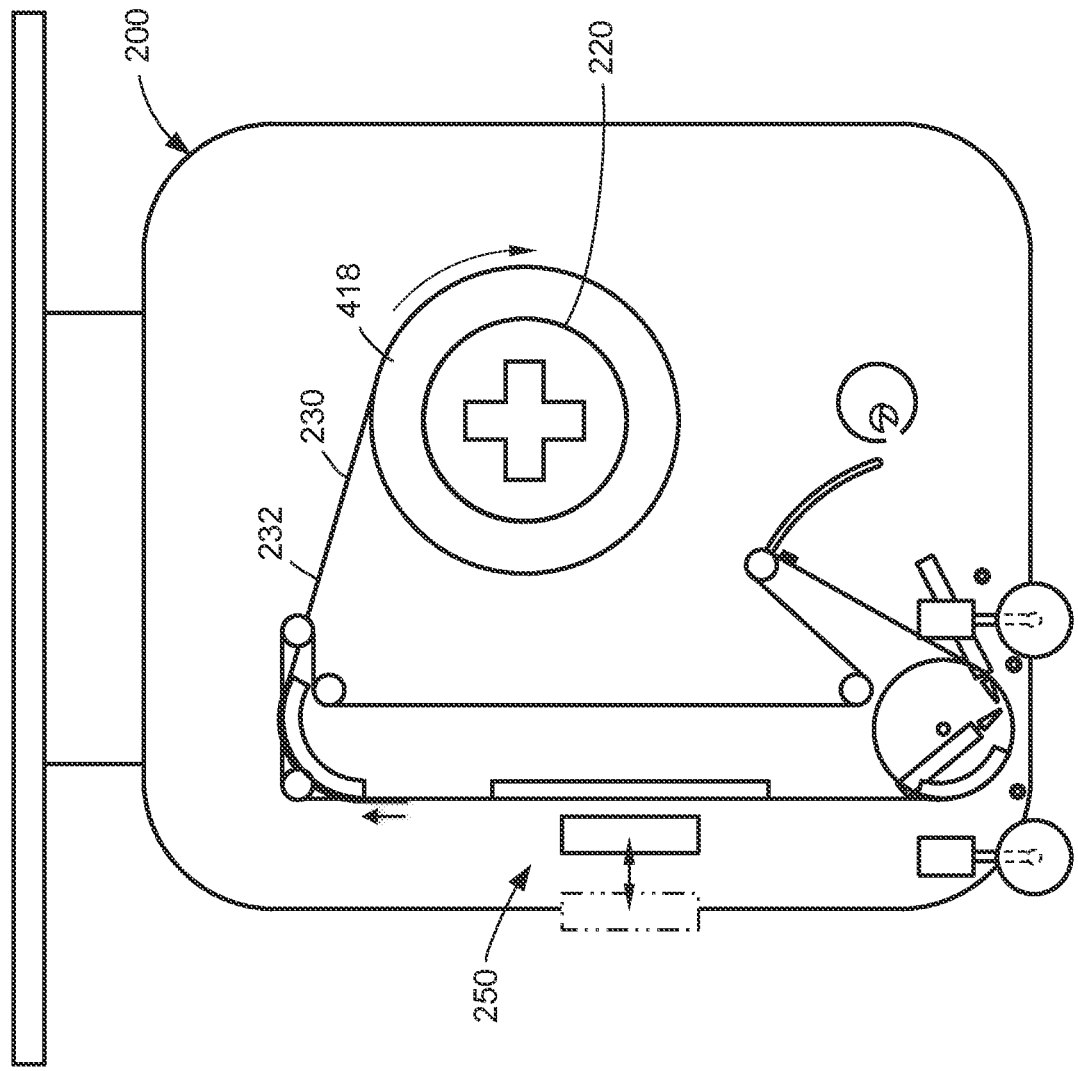
FIG. 42 shows the backing layer leading edge portion approaching the material supply drum.
Figure 43:
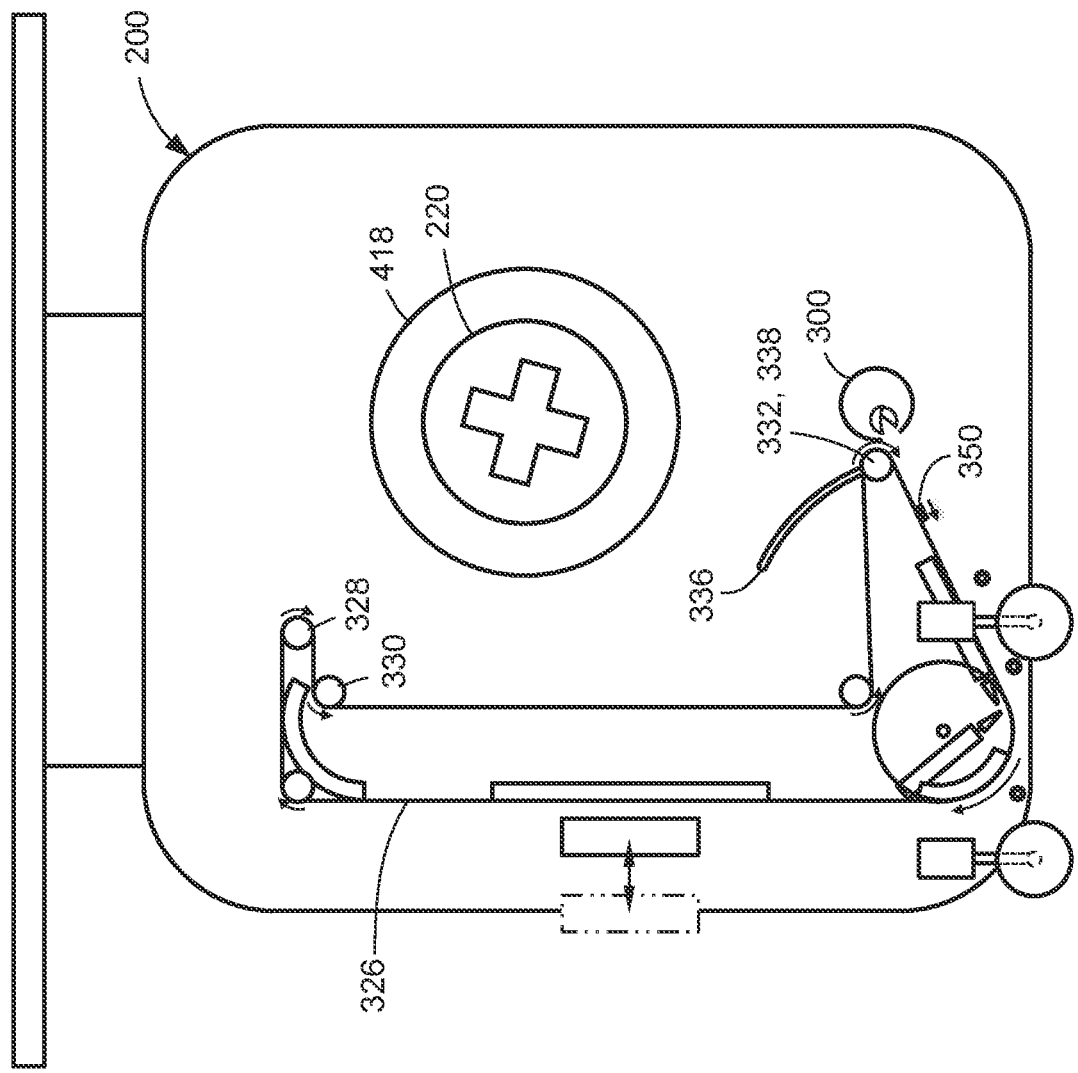
FIG. 43 shows the backing layer rewound onto the material supply drum, and further shows the activation of the material threading system for moving the belt-mounted layer engagement device from the backing layer collection drum to the material supply drum.

Referring to FIGS. 40-43, shown in FIG. 40 is the depleted material roll 418 containing primarily backing layer 230 during the final stage of rewinding the backing layer 230 through the lamination head 200. During the rewinding of the final length of the backing layer 230, the rotation of the backing layer collection drum 300 may be stopped such that the collection drum opening 304 is oriented along a direction facing the backing layer separation assembly 260. The drum-mounted layer engagement device 306 may release the backing layer leading edge portion 232, thereby allowing the forwardmost edge 242 of the backing layer leading edge portion 232 to separate from the drum-mounted layer engagement device 306, and allow the forwardmost edge 242 of the backing layer leading edge portion 232 to exit the collection drum opening 304, as shown in FIGS. 40-41. FIG. 42 shows the backing layer leading edge portion 232 after being pulled by the rotation of the material supply drum 220 past the cutter assembly 250. In FIG. 43, the redirect rollers 332 may be moved from the redirect roller home position 336 to the redirect roller engagement position 338 in preparation for threading the backing layer 230 of a new or replacement material roll 420 (FIG. 28) through the lamination head 200. In addition, the belt drive motor 330 may be activated for moving the threading belts 326 in reverse direction to thereby move the belt-mounted layer engagement device 350 from the backing layer collection drum 300 back to its original position proximate the material supply drum 220 as shown in FIG. 6. As mentioned above, for examples of the lamination head 200 having a single redirect roller 332 supporting a single threading belt 326, the redirect roller 332 may be fixedly mounted in the redirect roller engagement position 338, and in close proximity to the mounting frame 202 to prevent interference of the redirect roller 332 with the winding of the backing layer 230 onto the backing layer collection drum 300. The above-described process of replacing a depleted material roll 418 on the lamination head 200 with a replacement material roll 420 from the reloading cartridge 400 (FIG. 3) may be repeated any number of times during the laying up of a composite laminate 240 (FIG. 5).

Referring now to FIGS. 44-62, shown is an example of a lamination head 200 which is substantially similar to the above-described lamination head 200 shown in FIGS. 6-7. However, the lamination head of FIGS. 44-62 additionally includes a leading edge coupling device 360 to facilitate threading of the backing layer 230 through the lamination head 200. Prior to the initial threading of the backing layer 230 of a new or replacement material roll 420 through the lamination head 200, the leading edge coupling device 360 is configured to couple the backing layer leading edge portion 232 to the belt-mounted layer engagement device 350 when located proximate the material supply drum 220. As mentioned above, the lamination head 200 may be provided with a single threading belt 326 supporting a belt-mounted layer engagement device 350, or the lamination head 200 may be provided with a pair of threading belts 326 collectively supporting a belt-mounted layer engagement device 350. The belt drive motor 330 of the one or more threading belts 326 may be activated for threading the backing layer leading edge portion 232 through the lamination head 200 and toward the backing layer collection drum 300. Upon arriving at the backing layer collection drum 300, the leading edge coupling device 360 is configured to release from the belt-mounted layer engagement device 350, and couple to the drum-mounted layer engagement device 306 (FIG. 51), thereby handing off the backing layer leading edge portion 232 from the threading belts 326 to the backing layer collection drum 300, as described in greater detail below.

After a majority of the layup material 228 has been applied to the substrate 122 (FIG. 5) and the backing layer 230 on the backing layer collection drum 300 has been rewound onto the material supply drum 220, the leading edge coupling device 360 provides a means for securing the forwardmost edge 242 of the backing layer leading edge portion 232 to the threading belts 326 while threading the forwardmost edge 242 back through the lamination head 200. In this regard, the leading edge coupling device 360 is configured to release from the drum-mounted layer engagement device 306, and re-engage with the belt-mounted layer engagement device 350. The belt drive motor 330 may then be activated for driving the threading belts 326 in reverse direction for moving the leading edge coupling device 360 (e.g., while engaged to the belt-mounted layer engagement device 350 and the forwardmost edge 242) through the lamination head 200 and back to its original position proximate the material supply drum 220. The forwardmost edge 242 may then be released from the leading edge coupling device 360 to allow the forwardmost edge 242 of backing layer leading edge portion 232 to be wound onto the depleted material roll 418 (FIGS. 58-61), which may then be replaced with a replacement material roll 420 (FIG. 25), as described below.

Figure 44:
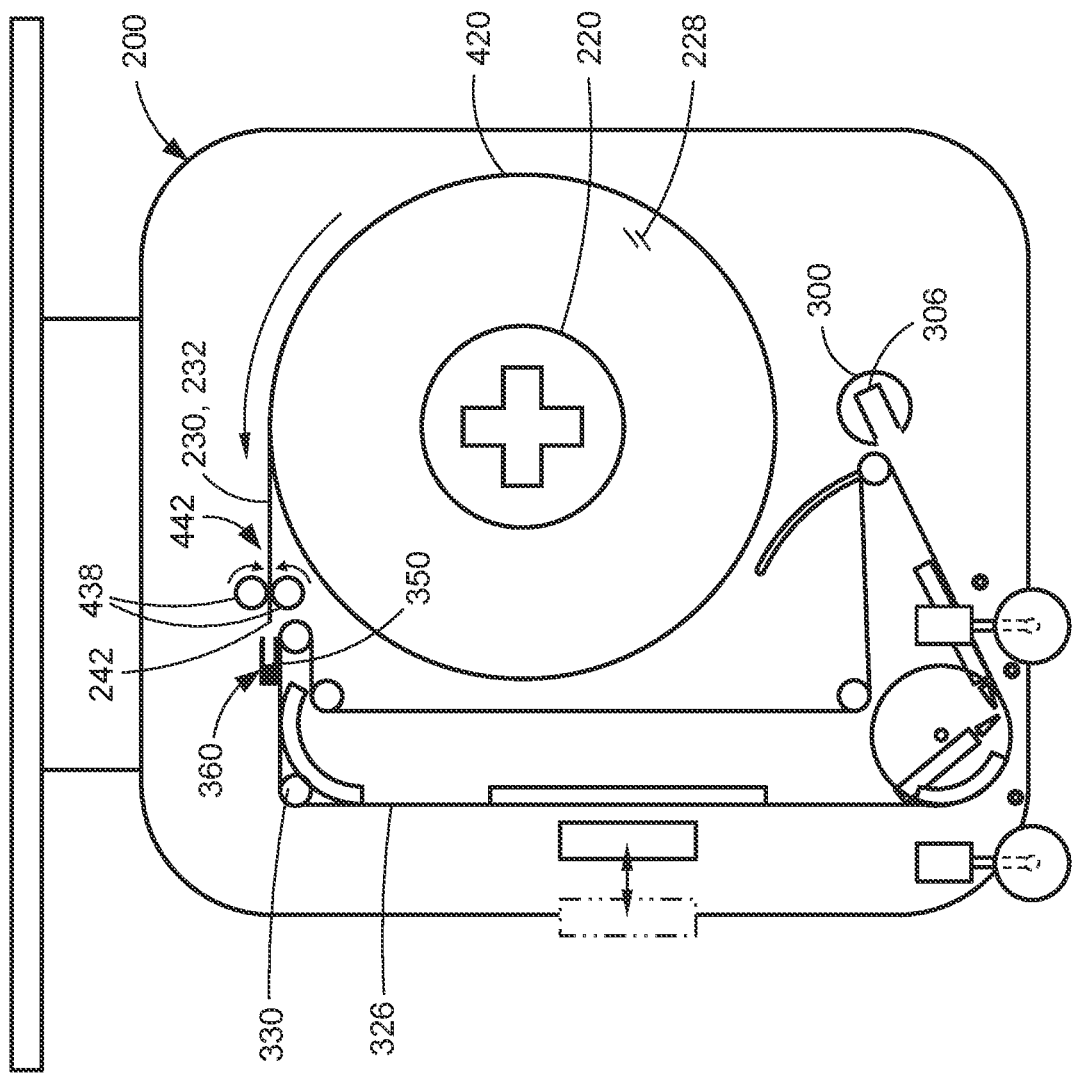
FIG. 44 is a side view of a further example of the lamination head in which the material threading system includes a leading edge coupling device for coupling the backing layer leading edge portion to the belt-mounted layer engagement device.

Referring to FIGS. 44 and 46, shown is the process for engaging the backing layer leading edge portion 232 to the leading edge coupling device 360, which may be engaged to the belt-mounted layer engagement device 350. Prior to engaging the backing layer leading edge portion 232 of the leading edge coupling device 360, the forwardmost edge 242 of the backing layer leading edge portion 232 of a replacement material roll 420 may initially be inserted (e.g., manually) into the roller interface 442 (FIG. 46) between the leading edge alignment rollers 438 when the replacement material roll 420 is on the reloading cartridge 400 in a process similar to the above-described process shown in FIGS. 18-19. Similar to the process shown in FIGS. 20-22, the leading edge alignment rollers 438 in FIG. 44 are shown telescopically extended toward the lamination head 200 after the replacement material roll 420 has been transferred from the reloading cartridge 400 onto the material supply drum 220.

In FIGS. 44 and 46, the leading edge alignment rollers 438 may be counter-rotated to extend the forwardmost edge 242 of the backing layer leading edge portion 232 into engagement with the leading edge coupling device 360, similar to the above-described process shown in FIGS. 23-24. FIG. 46 shows an example of the leading edge coupling device 360 configured as an electromagnetic device 364. The belt-mounted layer engagement device 350 is shown configured as a magnetically-attractable element 234. Similarly, the backing layer leading edge portion 232 may include at least one magnetically-attractable element 234, as described above. The electromagnetic device 364 may be activated (e.g., via an electromagnetic power supply—not shown) to magnetically couple to the magnetically-attractable element 234 (i.e., the belt-mounted layer engagement device 350) on the threading belts 326. With the electromagnetic device 364 coupled to the threading belts 326, the electromagnetic device 364 may be activated to couple with the magnetically-attractable element 234 of the backing layer leading edge portion 232 when the counter-rotating leading edge alignment rollers 438 extend the forwardmost edge 242 of the backing layer leading edge portion 232 into close proximity to the electromagnetic device 364. In the example shown, the electromagnetic device 364 (e.g., the leading edge coupling device 360) may include a device slot 362 that is sized and configured to receive and magnetically couple to the forwardmost edge 242 of the backing layer leading edge portion 232.

FIGS. 45 and 47 show the leading edge alignment rollers 438 independently moved away from each other for unclamping the backing layer leading edge portion 232. Similar to the above-described arrangement shown in FIG. 28, the leading edge alignment rollers 438 (e.g., in FIGS. 45 and 47) and the reloading spindle 406 (FIG. 28) may be telescopically retracted back toward the reloading cartridge 400. As shown in FIG. 48, the belt drive motor 330 may be activated to drive the one or more threading belts 326 over the belt rollers 328, thereby causing the leading edge coupling device 360 to start drawing the backing layer 230 off of the material roll 224 and thread the backing layer 230 through the lamination head 200.

Although FIGS. 44-47 show the leading edge coupling device 360 as an electromagnetic device 364, the leading edge coupling device 360 may be provided in any one of a variety of alternative configurations. For example, the leading edge coupling device 360 may be configured as one or more electro-mechanically actuated clips (not shown) similar to the above-described belt-mounted clips 352 (FIG. 9) configured to clamp onto the onto the backing layer leading edge portion 232, and also releasably engage with the threading belts 326. In a further alternative example, the leading edge coupling device 360 may be configured as one or more fastener elements 236 (FIG. 8) such as hook element strips and/or loop element strips (e.g., Velcro™—not shown) configured to releasably fasten respectively to hook element strips or loop element strips mounted on the backing layer leading edge portion 232, on the threading belts 326, and on the backing layer collection drum 300.

FIGS. 48-50 show the progression of the leading edge coupling device 360 (e.g., the electromagnetic device 364) threading the backing layer leading edge portion 232 through the lamination head 200. FIG. 48 shows the leading edge coupling device 360 pulling the forwardmost edge 242 of the backing layer leading edge portion 232 over the guide surface 206 located above the cutter assembly 250. FIG. 49 shows the leading edge coupling device 360 after passing between the cutter module 252 and cutter platen 254. FIG. 50 shows the leading edge coupling device 360 after moving past the backing layer separation assembly 260, and arriving at the backing layer collection drum 300.

Referring to FIGS. 51-54, shown is the electromagnetic device 364 (i.e., the leading edge coupling device 360) at the backing layer collection drum 300. The redirect rollers 332 are shown in the redirect roller engagement position 338. As mentioned above, for examples of the lamination head 200 having a belt-mounted layer engagement device 350 mounted to a single threading belt 326, a redirect roller 332 may be fixedly mounted in the redirect roller engagement position 338. In FIG. 51, the movement of the one or more threading belts 326 has been stopped so as to position the electromagnetic device 364 in alignment with the collection drum opening 304 of the backing layer collection drum 300. The leading edge coupling device 360 may be configured to protrude at least partially into the collection drum opening 304 when the movement of the threading belts 326 has been stopped. The collection drum opening 304 may include a magnetically-attractable element 234. Power to the electromagnetic device 364 may be manipulated in a manner to release the magnetic coupling between the electromagnetic device 364 (i.e., the leading edge coupling device 360) and the magnetically-attractable element 234 (e.g., the belt-mounted layer engagement device 350) on the threading belts 326, and magnetically couple the electromagnetic device 364 to the magnetically-attractable element 234 of the backing layer collection drum 300 to thereby draw the electromagnetic device 364 into the collection drum opening 304, as shown in FIG. 52. FIG. 53 shows the initial rotation of the backing layer collection drum 300 with the leading edge coupling device 360 engaged to the backing layer collection drum 300. FIG. 54 shows several wraps of the backing layer leading edge portion 232 wound onto the backing layer collection drum 300.

FIG. 55 shows the redirect rollers 332 moved to the redirect roller home position 336 to provide clearance for the backing layer 230 to fully wind onto the backing layer collection drum 300 after the layup material 228 has been depleted from the material roll 224. The process of applying layup material 228 to the substrate 122 (FIG. 5) may be similar to the above-described bi-directional layup process shown in FIGS. 37-38. However, as mentioned above, the leading edge coupling device 360 may be implemented on a lamination head 200 (not shown) limited to applying layup material 228 along a single direction of travel.

Figure 56:
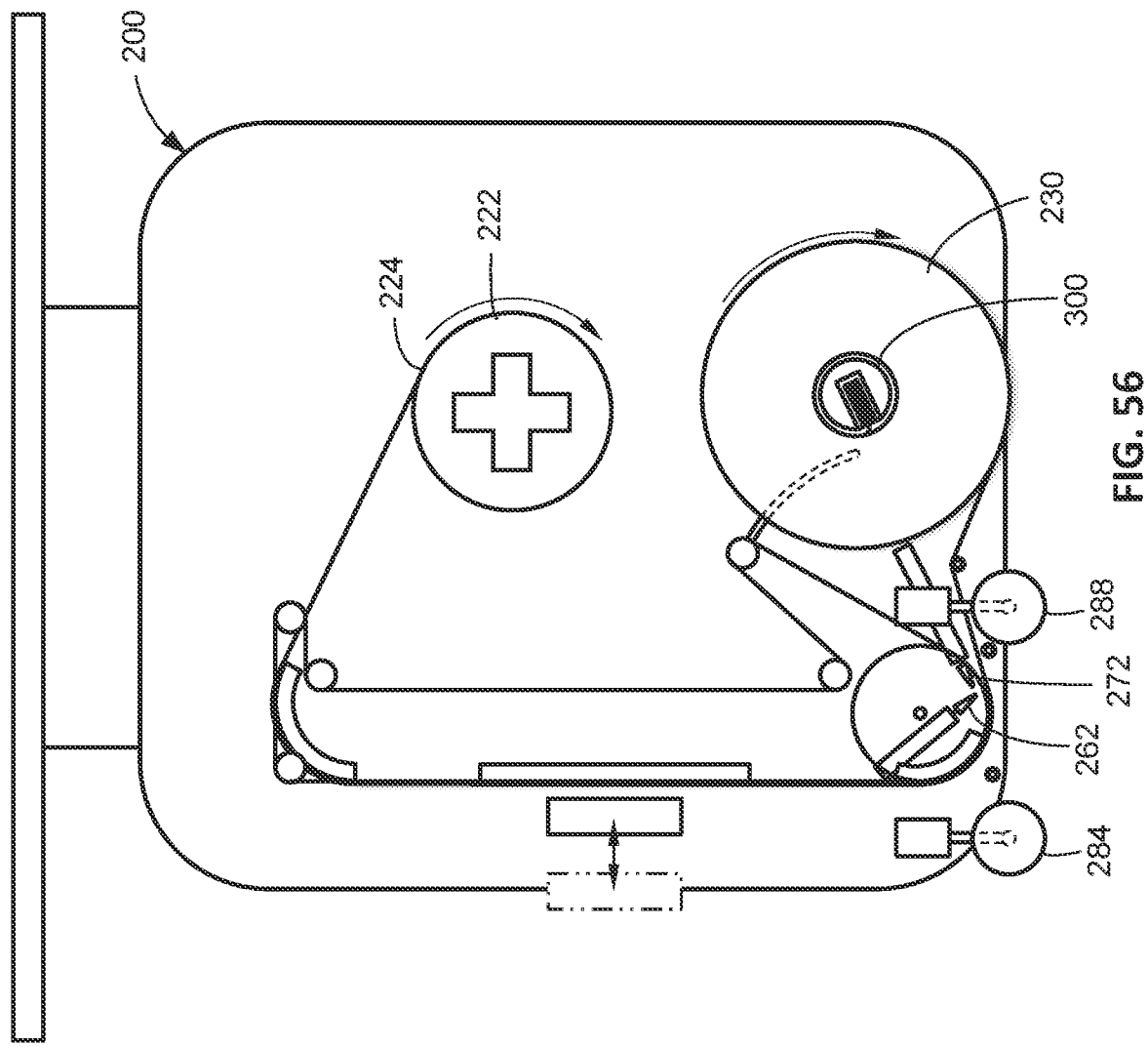
FIG. 56 shows the depleted material supply drum, and the backing layer collection drum filled with the backing layer.

Referring to FIGS. 56-62, shown in FIG. 56 is the lamination head 200 with the material roll 224 depleted of layup material 228 (FIG. 55), and the backing layer 230 wound onto the backing layer collection drum 300. The first separation device 262, the second separation device 272, the first compaction device 284, and the second compaction device 288 are in their respective retracted positions. The supply drum motor 222 may be rotated in reverse direction for unwinding the backing layer 230 off of the backing layer collection drum 300, and rewinding the backing layer 230 onto the material roll 224.

Figure 57:
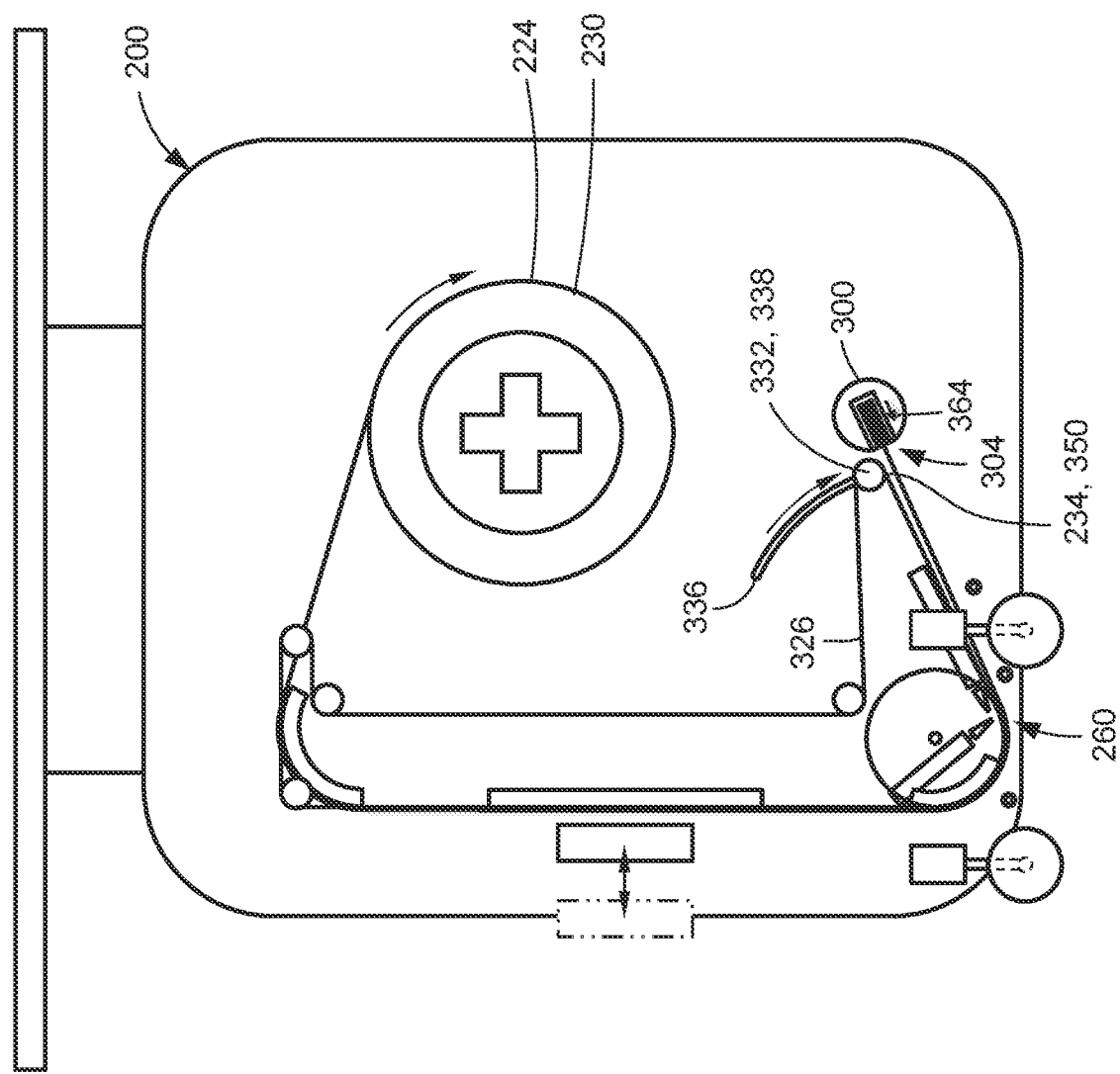
FIG. 57 shows the backing layer rewound onto the material supply drum, and further showing the redirect roller moved back toward the backing layer collection drum in preparation for release of the leading edge coupling device from the drum-mounted layer engagement device.
Figure 58:
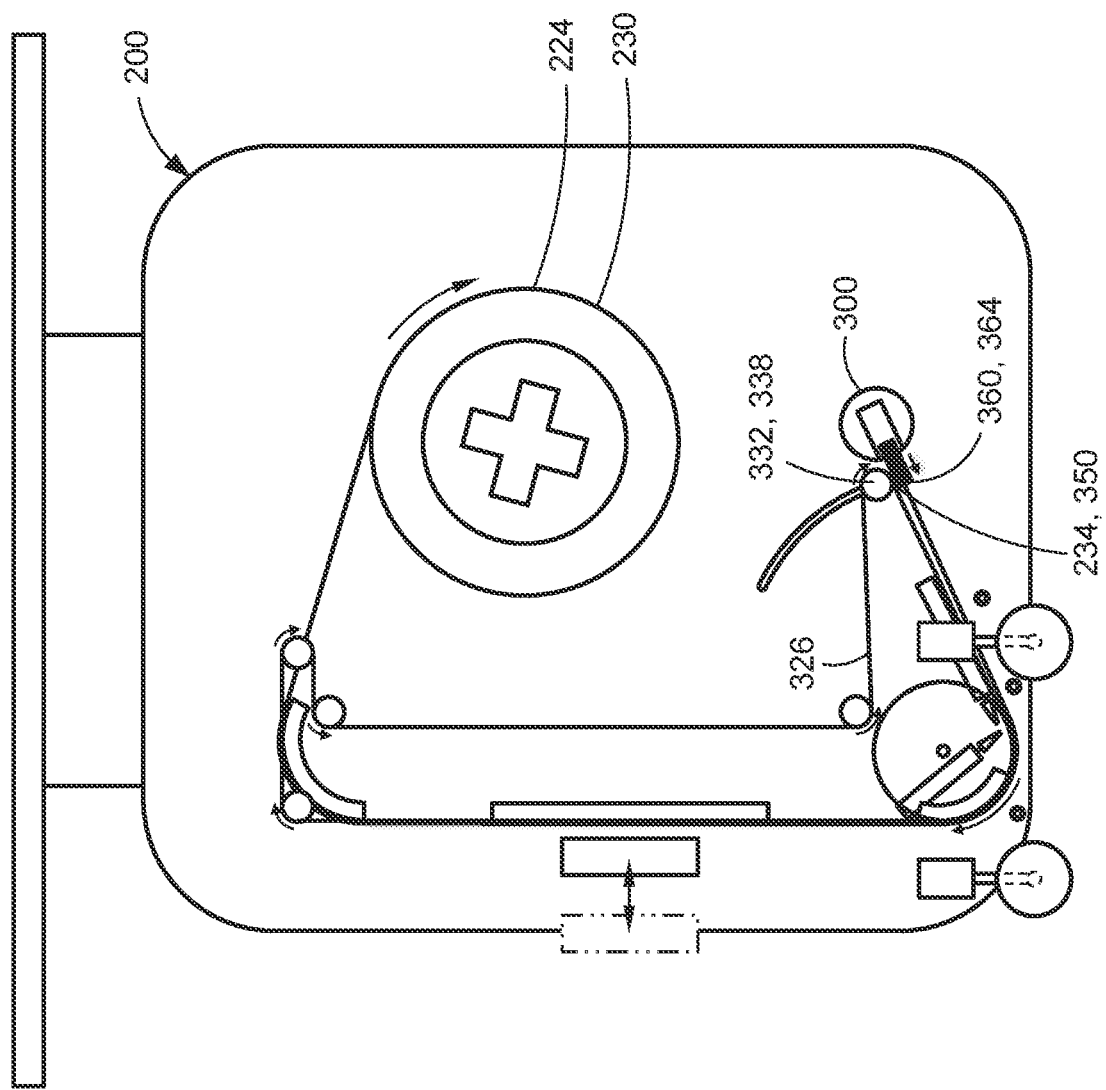
FIG. 58 shows the leading edge coupling device released from the drum-mounted layer engagement device, and engaged to the belt-mounted layer engagement device.

FIG. 57 shows the final stage of rewinding the backing layer 230 onto the material roll 224. Similar to the above-described process shown in FIGS. 40-43, the backing layer collection drum 300 in FIG. 57 may be rotated until the collection drum opening 304 is oriented along a direction facing the backing layer separation assembly 260. The redirect rollers 332 may be moved from the redirect roller home position 336 to the redirect roller engagement position 338 proximate the backing layer collection drum 300. Power to the electromagnetic device 364 (i.e., the leading edge coupling device 360) may be manipulated to release the electromagnetic device 364 from the backing layer collection drum 300, while simultaneously magnetically coupling the electromagnetic device 364 to the belt-mounted layer engagement device 350 (i.e., magnetically-attractable element 234) on the threading belts 326, as shown in FIG. 58.

Figure 59:
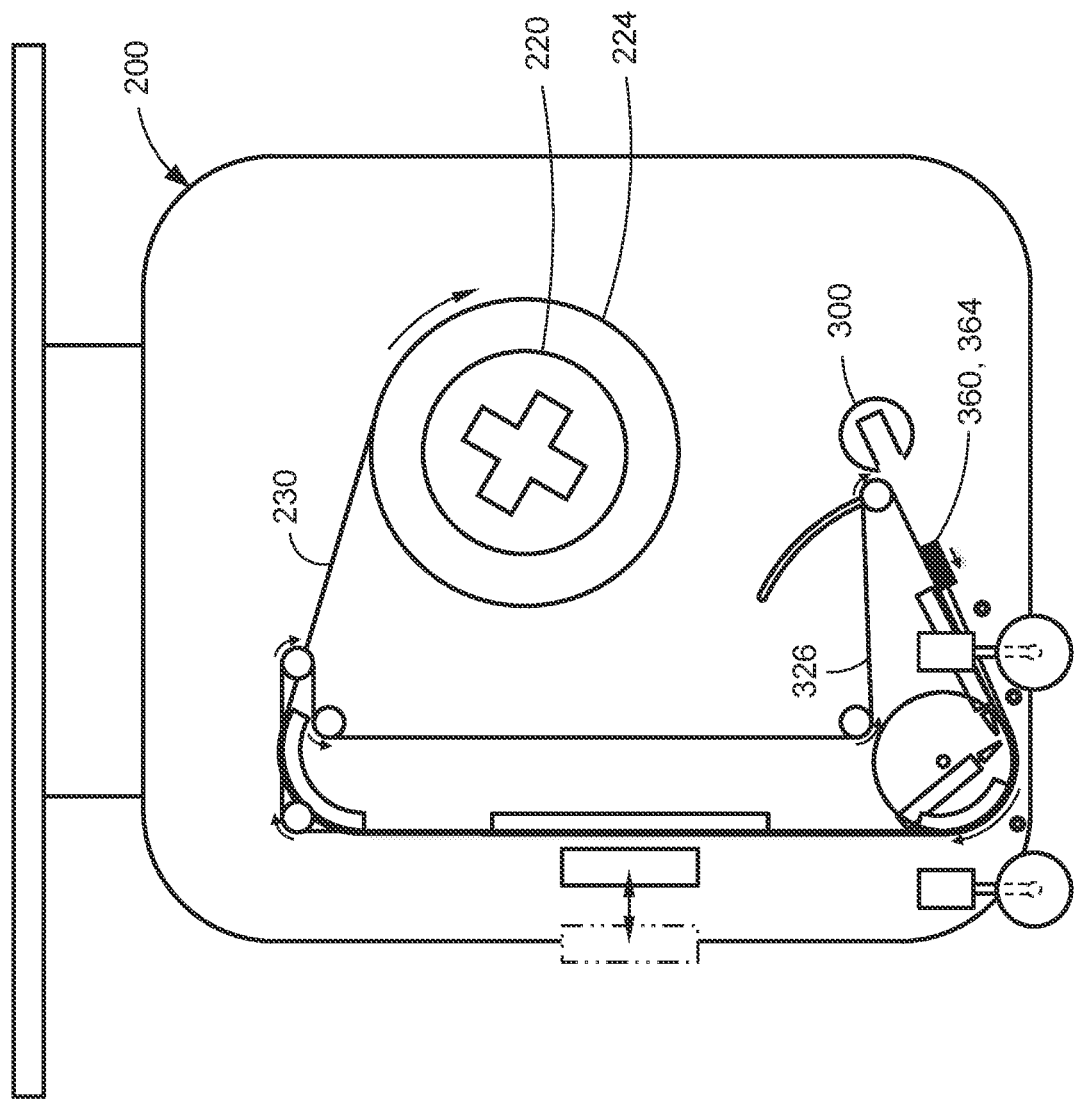
FIG. 59 shows the activation of the material threading system for rewinding the backing layer through the lamination head.
Figure 60:
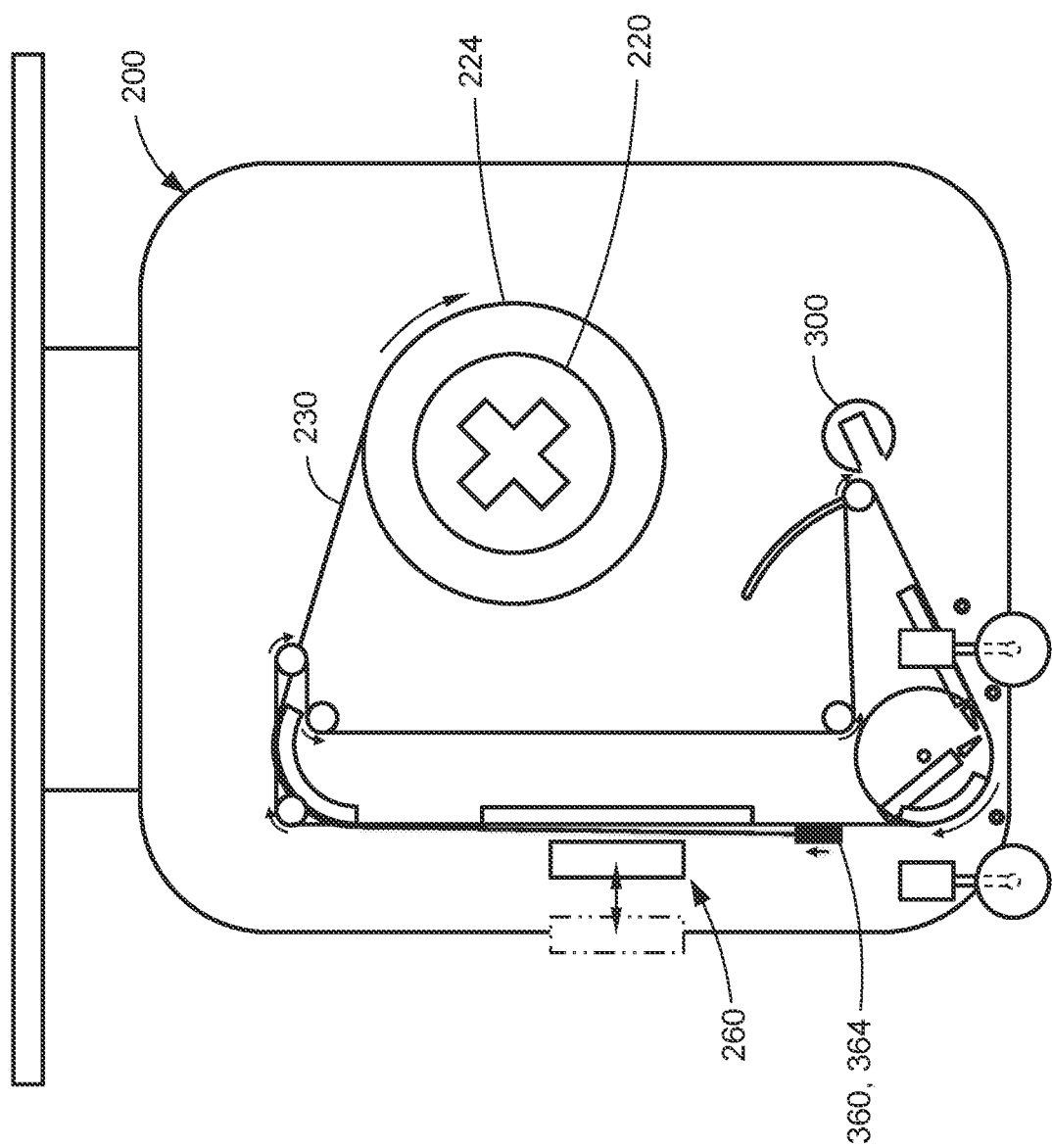
FIG. 60 shows further progression of the rewinding of the backing layer through the lamination head.
Figure 61:
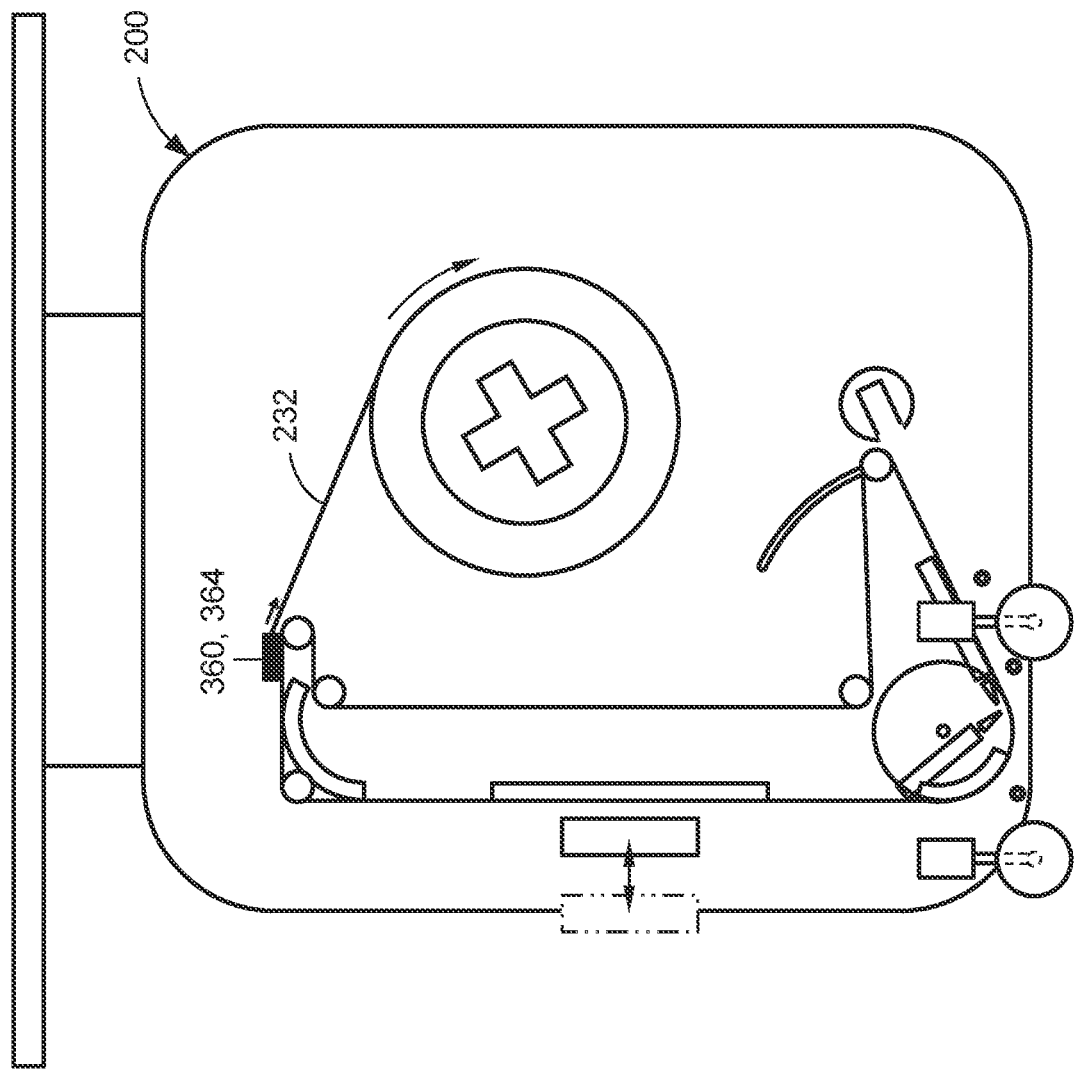
FIG. 61 shows the leading edge coupling device at its starting position proximate the material supply drum.
Figure 62:
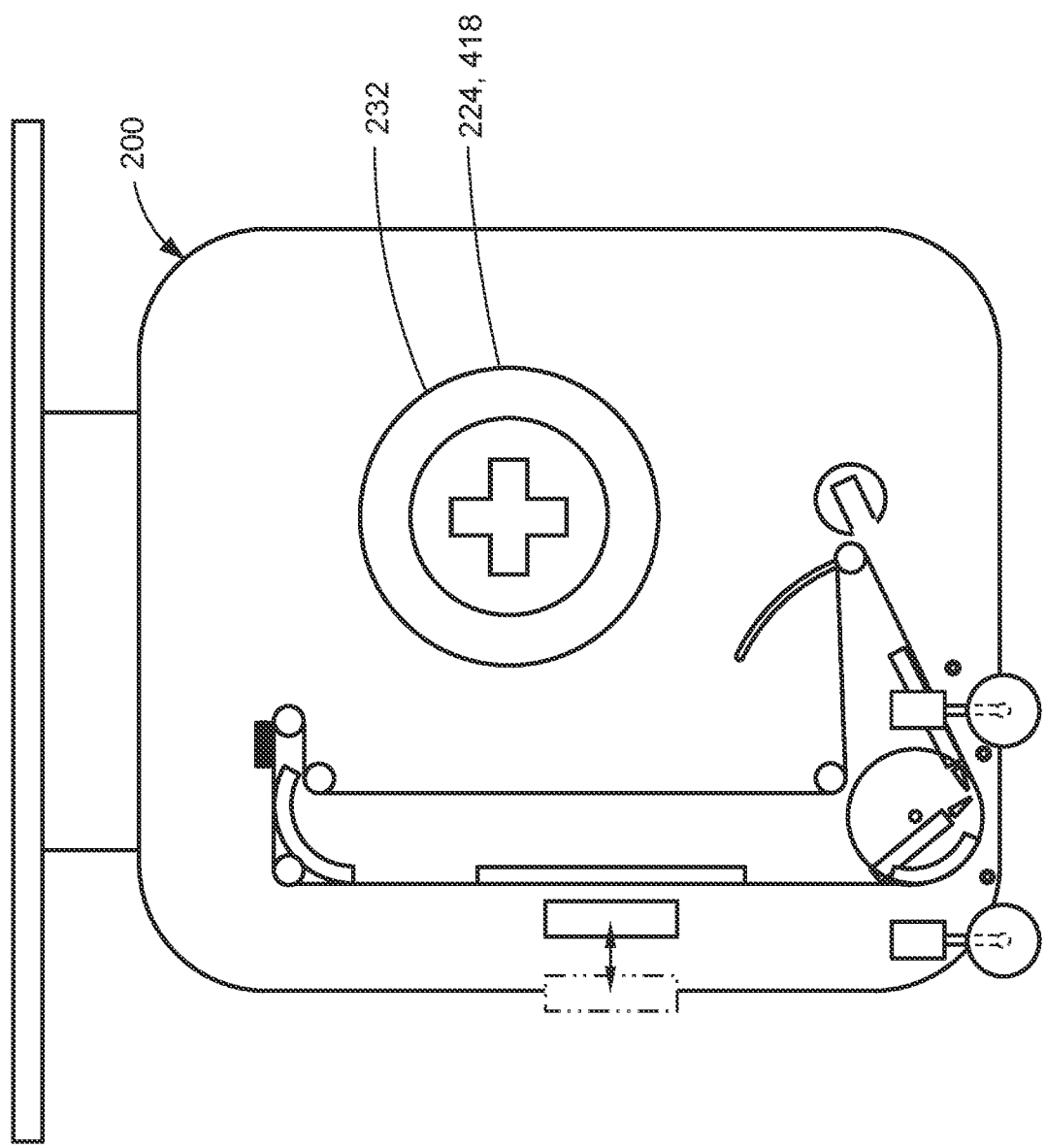
FIG. 62 shows the backing layer leading edge portion wound onto the material supply drum after release from the leading edge coupling device

FIG. 59 shows the movement of the one or more threading belts 326 to move the electromagnetic device 364 (i.e., the leading edge coupling device 360) away from the backing layer collection drum 300 while the material supply drum 220 is rotated for winding the backing layer 230 back onto the material roll 224. FIG. 60 shows the electromagnetic device 364 moving toward the cutter assembly 250 as the backing layer 230 continues to be wound onto the material roll 224. FIG. 61 shows the electromagnetic device 364 back at its original position proximate the material supply drum 220, and still coupled to the backing layer leading edge portion 232. FIG. 62 shows the remaining portion of the backing layer leading edge portion 232 wound onto the material roll 224, thereby forming a depleted material roll 418.

Figure 63:
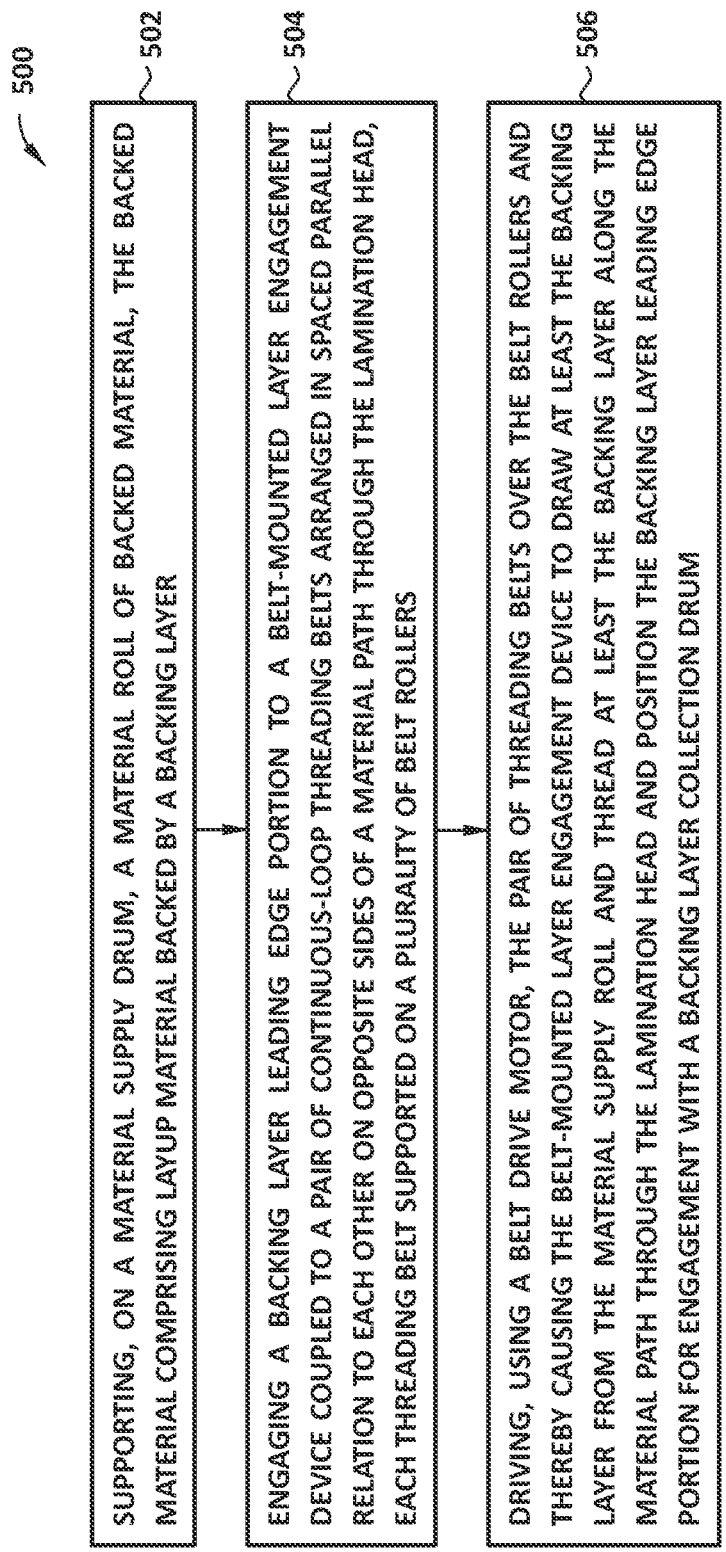
FIG. 63 is a flowchart of the method of threading layup material through a lamination head.

Referring now to FIG. 63, shown is a method 500 of threading layup material 228 through a lamination head 200. Step 502 of the method 500 includes supporting, on a material supply drum 220, a material roll 224 of backed material 226. As described above, the backed material 226 comprises layup material 228 backed by a backing layer 230. As mentioned above, the layup material 228 may be a composite material, such as a continuous strip of fiber-reinforced polymer matrix material (e.g., prepreg tape), or the layup material 228 may be a non-composite material such as metallic foil, metallic mesh, a release film, a tackifier film, a breather layer, a bleeder layer, peel ply, or any one of a variety of other types of non-composite materials that may be dispensed by the lamination head 200 prior to, during, or after the dispensing of composite material by the lamination head 200.

Step 504 of the method 500 includes engaging a backing layer leading edge portion 232 of the backing layer 230 to a belt-mounted layer engagement device 350 coupled to a continuous-loop threading belt 326 located on one side of the material path 322 through the lamination head 200. As mentioned above, the threading belt 326 may be supported on a plurality of belt rollers 328. For examples of the lamination head 200 having a pair of belt raceways 324, step 504 includes engaging the backing layer leading edge portion 232 to a belt-mounted layer engagement device 350 coupled to a pair of threading belts 326 arranged in spaced parallel relation to each other on opposite sides of the material path 322 through the lamination head 200. In some examples, step 504 of engaging the backing layer leading edge portion 232 to the belt-mounted layer engagement device 350 may comprise clamping onto the backing layer leading edge portion 232 using at least one belt-mounted clip 352 mounted on a threading belt 326. In the example shown, the method may comprise clamping onto the backing layer leading edge portion 232 using a pair of belt-mounted clips 352 (FIG. 9) respectively mounted on a pair of threading belts 326, as shown in FIG. 8. As described above, the clip jaws 354 of the belt-mounted clips 352 may be oriented to open in facing relation to each other to allow the clip jaws 354 to clamp onto the backing layer leading edge portion 232.

In another example, step 504 of engaging the backing layer leading edge portion 232 to the belt-mounted layer engagement device 350 may comprise magnetically coupling a magnetically-attractable element 234 of the backing layer leading edge portion 232 using an electromagnetic member 355 coupled to a threading belt 326. For examples of the lamination head 200 having a pair of threading belts 326 (FIG. 8), step 504 may include magnetically coupling a magnetically-attractable element 234 of the backing layer leading edge portion 232 to an electromagnetic crossmember 356 (i.e., the belt-mounted layer engagement device 350) extending between the pair of threading belts 326. As shown in FIG. 25 and described above, the electromagnetic crossmember 356 may be activated by an electromagnetic power supply (not shown) to cause the electromagnetic crossmember 356 to magnetically couple to a magnetically-attractable element 234 included with the backing layer leading edge portion 232. As mentioned above, the magnetically-attractable element 234 may be configured as one or more strips of relatively thin metallic material coupled to the backing layer leading edge portion 232.

In a still further example, step 504 of engaging the backing layer leading edge portion 232 to the belt-mounted layer engagement device 350 may comprise fastening one of a hook element strip or a loop element strip of the backing layer leading edge portion 232 respectively to one of a loop element strip or a hook element strip of a fastener member 355 coupled to one or more of the threading belts 326. For example, step 504 may include engaging a fastener crossmember 358 (i.e., the belt-mounted layer engagement device 350) to a fastener element 236 included with the backing layer leading edge portion 232. As described above, the fastener crossmember 358 may be relatively rigid material extending between a pair of threading belts 326, and which may have a loop element strip or a hook element strip coupled to the fastener crossmember 358. The fastener element 236 on the backing layer leading edge portion 232 may be a hook element strip or a loop element strip for engagement respectively with a loop element strip or hook element strip of the fastener crossmember 358.

In yet a further example, step 504 of engaging the backing layer leading edge portion 232 to the belt-mounted layer engagement device 350 may comprise coupling a leading edge coupling device 360 to the belt-mounted layer engagement device 350, and coupling the backing layer leading edge portion 232 to the leading edge coupling device 360. In the example shown in the above-described FIGS. 46-47, the leading edge coupling device 360 may include an electromagnetic device 364 that is activatable to magnetically couple to a magnetic ally-attractable element 234 that may be included with the backing layer leading edge portion 232. The leading edge coupling device 360 may optionally including a device slot 362 sized and configured to receive the forwardmost edge 242 of the backing layer leading edge portion 232, as shown in FIGS. 46-47. In addition to magnetically coupling to the magnetically-attractable element 234 on the backing layer leading edge portion 232, the electromagnetic device 364 may be activatable to magnetically couple to a magnetically-attractable element 234 mounted to the threading belts 326.

With the backing layer leading edge portion 232 engaged to the belt-mounted layer engagement device 350, the method may include step 506 of driving, using a belt drive motor 330, the threading belts 326 over the belt rollers 328, and thereby causing the belt-mounted layer engagement device 350 to draw at least the backing layer 230 from the material supply roll and thread at least the backing layer 230 along the material path 322 through the lamination head 200 and into a position proximate the backing layer collection drum 300, as shown in the above-described FIGS. 29-30 and 48-49. As described below, the backing layer collection drum 300 is configured to wind at least the backing layer 230 onto the backing layer collection drum 300 as the lamination head 200 applies the layup material 228 onto a substrate 122.

Prior to the backing layer leading edge portion 232 arriving at the backing layer collection drum 300, the method may include positioning the redirect rollers 332 at a redirect roller engagement position 338 in close proximity to the backing layer collection drum 300, as shown in above-described FIGS. 31 and 50. However, as mentioned above for a lamination head 200 having a single threading belt 326 located proximate the 202, the redirect roller 332 may be fixedly mounted to the mounting frame 202 at the redirect roller engagement position 338. For examples of the lamination head 200 having a pair of threading belts 326, the corresponding redirect rollers 332 may initially be in the redirect roller home position 336, and may be moved to the redirect roller engagement position 338 prior to, or at approximately the same time that the drum-mounted layer engagement device 306 (i.e., and backing layer leading edge portion 232) arrives at the backing layer collection drum 300. As described above, the redirect rollers 332 are part of the guide rollers 204 that support the threading belts 326. As shown in FIGS. 32 and 51, when the redirect rollers 332 are in the redirect roller engagement position 338, the belt-mounted layer engagement device 350 may orient the backing layer leading edge portion 232 for engagement with the backing layer collection drum 300. In addition to moving the redirect rollers 332 into the redirect roller engagement position 338 prior to arrival of the backing layer leading edge portion 232 at the backing layer collection drum 300, the collection drum motor 302 may rotate the backing layer collection drum 300 to orient the collection drum opening 304 to face toward the oncoming direction of the forwardmost edge 242 of the backing layer leading edge portion 232.

When the leading edge coupling device 360 arrives at the backing layer collection drum 300, the method may comprise engaging the backing layer leading edge portion 232 to a drum-mounted layer engagement device 306 of the backing layer collection drum 300. The step of engaging the backing layer leading edge portion 232 to the drum-mounted layer engagement device 306 may comprise receiving, from the belt-mounted layer engagement device 350, a forwardmost edge 242 of the backing layer leading edge portion 232 in the collection drum opening 304 formed in the backing layer collection drum 300, as shown in FIGS. 32-33. The method may additionally include disengaging the backing layer leading edge portion 232 from the belt-mounted layer engagement device 350 after the backing layer leading edge portion 232 is engaged to the drum-mounted to layer engagement device. Disengagement of the backing layer leading edge portion 232 from the belt-mounted layer engagement device 350 may comprise magnetically decoupling the electromagnetic crossmember 356 (FIG. 8) from the magnetically-attractable element 234 of the backing layer leading edge portion 232 by deactivating a electromagnetic power supply (not shown) that may power the electromagnetic crossmember 356. In another example, disengagement of the backing layer leading edge portion 232 from the belt-mounted layer engagement device 350 may comprise disengaging a loop element strip or a hook element strip (e.g., Velcro™) mounted on the backing layer leading edge portion 232, from a fastener crossmember 358 (FIG. 8) having a corresponding hook element strip or loop element strip. In a still further example, disengagement of the backing layer leading edge portion 232 from the belt-mounted layer engagement device 350 may comprise unclamping a pair of belt-mounted clips 352 (FIG. 9) from the backing layer leading edge portion 232.

The step of engaging the forwardmost edge 242 of the backing layer leading edge portion 232 to the drum-mounted layer engagement device 306 may comprise clamping onto the forwardmost edge 242 of the backing layer leading edge portion 232 using a drum-mounted clamp mechanism 308. As mentioned above, the drum-mounted clamp mechanism 308 may include a pair of clamp jaws 310 pivotably coupled to each other and actuatable by one or more clamp actuators (not shown). In the example shown, the drum-mounted clamp mechanism 308 may be contained within the backing layer collection drum 300.

As an alternative to a drum-mounted clamp mechanism 308, the drum-mounted layer engagement device 306 may be a drum-mounted electromagnetic engagement device (not shown) configured to magnetically couple to a magnetically-attractable element 234 (e.g., a thin metallic strip) mounted on the backing layer leading edge portion 232. In a still further alternative to the drum-mounted clamp mechanism 308, the drum-mounted layer engagement device 306 may be a drum-mounted vacuum engagement device (not shown) configured to vacuum couple to the backing layer leading edge portion 232.

Referring to the example shown in FIGS. 51-52, as an alternative to engaging the backing layer leading edge portion 232 to a drum-mounted clamp mechanism 308, the step of engaging the backing layer leading edge portion 232 to the drum-mounted layer engagement device 306 may comprise receiving, from the belt-mounted layer engagement device 350, a leading edge coupling device 360, which may be coupled to the backing layer leading edge portion 232. As mentioned above, in one example, the leading edge coupling device 360 may be an electromagnetic device 364 for magnetically coupling to the drum-mounted layer engagement device 306, which may be a magnetically-attractable element 234. For example, the magnetically-attractable element 234 may comprise a metallic element located inside the backing layer collection drum 300 opposite the collection drum opening 304. Simultaneous with magnetically coupling of the electromagnetic device 364 (e.g., the leading edge coupling device 360) to the magnetically-attractable element 234 in the backing layer collection drum 300, the electromagnetic device 364 may decouple from the magnetically-attractable element 234 (i.e., the belt-mounted layer engagement device 350) mounted to the one or more threading belts 326, as described above, thereby handing off the backing layer leading edge portion 232 from the threading belts 326 to the backing layer collection drum 300.

Once the backing layer leading edge portion 232 is engaged to the backing layer collection drum 300, the method may include translating the redirect rollers 332 along the redirect roller path 334 from the redirect roller engagement position 338 to the redirect roller home position 336 as shown in FIGS. 36 and 55. Moving the redirect rollers 332 to the redirect roller home position 336 may provide clearance for the backing layer 230 to wind onto the backing layer collection drum 300 as the layup material 228 is dispensed onto the substrate 122, as shown in FIGS. 39 and 56. Toward this end, the method may include rotating the backing layer collection drum 300 to pull the backed material 226 through the lamination head 200 to start the process of applying layup material 228 onto the substrate 122.

As part of the process of applying layup material 228, the method may include cutting, as the lamination head 200 approaches the start or end of a course 238 of layup material 228 on the substrate 122, the layup material 228 using a cutter assembly 250. Cutting of the layup material 228 may be performed using a cutter module 252 and a cutter platen 254, which may be operated to cut the layup material 228 while leaving the backing layer 230 intact. The cutting of the layup material 228 may create a layup material leading edge and a layup material trailing edge abutting the layup material leading edge.

Referring to FIGS. 37-38, the method may include separating, using at least one separation device of a backing layer separation assembly 260, the layup material 228 from the backing layer 230, and directing the layup material 228 toward the substrate 122. For examples of the lamination head 200 having a compaction device, the method may include directing the layup material 228 toward the substrate 122 and underneath the compaction device as the lamination head 200 moves along a direction of travel. The method may additionally include feeding the backed material 226 to the backing layer separation assembly 260. In the presently-disclosed example, the lamination head 200 has bi-directional layup capability, and the backing layer separation assembly 260 has a first separation device 262 having a first horn 268, and a second separation device 272 having a second horn 276. In addition, the example of the lamination head 200 in FIGS. 37-38 has a first compaction device 284 and a second compaction device 288.

Referring to FIG. 37, the method may include moving, via the first separation device actuator 264, the first horn 268 from its separation device retracted position 278 to its separation device extended position 280 wherein the first horn 268 is in close proximity to the first compaction device 284. Prior to moving the first horn 268 into close proximity to the first compaction device 284, the second horn 276 may be moved, via the second separation device actuator 274, into its separation device retracted position 278 to provide clearance for movement of the first horn 268. In addition, prior to, during, or immediately after moving the moving the first horn 268 into close proximity to the first compaction device 284, the first compaction device 284 may be moved from its compaction device retracted position 292 to its compaction device extended position 294 in which the first compaction device 284 may be in contact with the substrate 122. However, as indicated above, the first and second compaction devices 284, 288 are optionally included with the lamination head 200.

As described above, the first separation device actuator 264 and the second separation device actuator 274 may each be configured as a linear actuator having a rod that is extendable from a cylinder. The first horn 268 and the second horn 276 may be mounted on the end of the rod of their respective linear actuators. Similarly, the first compaction device 284 and the second compaction device 288 may respectively include a first compaction device actuator 286 and a second compaction device actuator 290, each of which may be configured as a linear actuator having a rod extendable from a cylinder. In this regard, movement of the first and second horn 276 may be effectuated by extending and retracting the rod from the cylinder respectively of the first and second separation device actuator 264, 274. Likewise, movement of the first and second compaction device 284, 288 may be effectuated by extending and retracting the rod from the cylinder respectively of the first and second compaction device actuator 286, 290.

With the first horn 268 located proximate the first compaction device 284, the method may include separating, using the first horn 268, the layup material 228 from the backing layer 230, and directing the layup material 228 toward the substrate 122 while the lamination head 200 moves along the first direction of travel 208. Separation of the layup material 228 from the backing layer 230 may be performed by pulling the backing layer 230 over a generally small radius of curvature of the horn distal end 270 of the first horn 268, thereby causing the layup material leading edge to separate from the backing layer 230 as the backing layer 230 moves around the horn distal end 270. The relatively small radius of curvature of the horn distal end 270 may be such that the bending stiffness of the layup material 228 results in a peel force that exceeds the strength of the adhesive bond between the layup material 228 and the backing layer 230, and thereby results in the separation of the layup material 228 from the backing layer 230. The method may optionally include compacting, using the first compaction device 284, the layup material 228 against the substrate 122 as the layup material 228 is dispensed from the lamination head 200 while moving along the first direction of travel 208. The first compaction device 284 may be configured as a compaction roller, a compaction shoe, a compaction bladder, or other compaction device configuration.

When the lamination head 200, moving along the first direction of travel 208, arrives at the end of the course 238 of layup material 228 being applied to the substrate 122, the method may include retracting the first horn 268 away from the first compaction device 284. The relative movement of the lamination head 200 along the first direction of travel 208 may be halted once the layup material trailing edge is compacted onto the substrate 122 by the first compaction device 284. The first compaction device 284 may be retracted away from the substrate 122, and the second compaction device 288 may be extended into contact with the substrate 122

Referring to FIG. 38, the method may include moving the second horn 276 from its separation device retracted position 278 to its separation device extended position 280 for positioning the second horn 276 in close proximity to the second compaction device 288. The second horn 276 may be moved into close proximity to the second compaction device 288 at approximately the same time or immediately after the first horn 268 is retracted away from the first compaction device 284. The method may include separating, using the second horn 276, the layup material 228 from the backing layer 230, and directing the layup material 228 toward the substrate 122 and the second compaction device 288 while moving the lamination head 200 along the second direction of travel 210. Separation of the layup material 228 from the backing layer 230 may comprise pulling the backing layer 230 around the relatively small radius of curvature of the horn distal end 270 of the second horn 276 to cause the layup material leading edge separate the backing layer 230, similar to the above-described process of separating the layup material 228 from the backing layer 230 moving around the first horn 268. The method may optionally include compacting, using the second compaction device 288, the layup material 228 against the substrate 122 as the layup material 228 is dispensed from the lamination head 200 during relative movement along the second direction of travel 210. The second compaction device 288 may be configured as a compaction roller, a compaction shoe, a compaction bladder, or other compaction device configuration.

As the lamination head 200 moves relative to the lamination surface 120, the method may include pulling, via rotation of the backing layer collection drum 300, the backed material 226 through the lamination head 200 while the layup material 228 is dispensed onto the substrate 122 and the backing layer 230 is wound onto the backing layer collection drum 300. The method may include controlling the rotational speed of the backing layer collection drum 300 in coordination with the speed of movement of the lamination head 200 relative to the lamination surface 120. As mentioned above, the manufacturing system 100 may be provided in an example wherein the lamination head 200 is stationary, and the lamination surface 120 (e.g., lamination mandrel 124) moves underneath the lamination head 200 as the layup material 228 is dispensed onto the lamination surface 120. Alternatively, the manufacturing system 100 may be provided in an example wherein the lamination surface 120 is stationary, and the lamination head 200 is moved over the lamination surface 120 while dispensing layup material 228. Although the above-described process of dispensing layup material 228 is described in the context of a lamination head 200 having bi-directional layup capability, the process of dispensing layup material 228 may also be performed using a lamination having layup capability along a single direction.

The dispensing of layup material 228 from the lamination head 200 may continue until the material roll 224 is depleted of layup material 228, at which point, the backing layer collection drum 300 may be filled with backing layer 230, as shown in FIGS. 39 and 56. The method may include reversing the rotational direction of the material supply drum 220 for winding the backing layer 230 off of the backing layer collection drum 300 and onto the depleted material roll 418 on the material supply drum 220. The rewinding of the backing layer 230 may be performed by rotating the material supply drum 220 in a direction reverse to the rotational direction for dispensing layup material 228 from the lamination head 200, as shown in FIGS. 39-40 and 56-57.

After a majority of the backing layer 230 is rewound onto the depleted material roll 418, the method may include releasing the backing layer leading edge portion 232 from the drum-mounted layer engagement device 306. The process of releasing the backing layer leading edge portion 232 may include rotating the material supply drum 220 and the backing layer collection drum 300 in reverse direction until the collection drum opening 304 generally faces the threading belts 326 as shown in FIG. 40. The drum-mounted layer engagement device 306 may then release the backing layer leading edge portion 232 while the material supply drum 220 is rotated to pull the backing layer leading edge portion 232 away from the backing layer collection drum 300, through the lamination head 200, and onto the depleted material roll 418, as shown in FIGS. 41-43. As shown in FIG. 43, the belt drive motor 330 of the material threading system 320 may be activated to drive the one or more threading belts 326 in reverse direction to move the belt-mounted layer engagement device 350 back to its original position (FIG. 21) proximate the material supply drum 220. In addition, the redirect roller 332 may be moved from the redirect roller home position 336 to the redirect roller engagement position 338 (FIG. 43) in preparation for threading the backing layer 230 of a replacement material roll 420 through the lamination head 200.

For the example lamination head 200 having a leading edge coupling device 360 as shown in FIGS. 44-62, the process of releasing the backing layer leading edge portion 232 from the drum-mounted layer engagement device 306 may additionally include coupling the leading edge coupling device 360 to the belt-mounted layer engagement device 350. The process of releasing the leading edge coupling device 360 from the drum-mounted layer engagement device 306 may be performed in reverse order to the above-described process of engaging the leading edge coupling device 360 to the drum-mounted layer engagement device 306 as shown in FIGS. 51-54. For example, the backing layer collection drum 300 may be rotated such that the collection drum opening 304 faces toward the one or more threading belts 326, in reverse order to the above-described process shown in FIGS. 53-54. The leading edge coupling device 360 (e.g., electromagnetic device 364) may be released from the magnetically-attractable element 234 (i.e., the drum-mounted layer engagement device 306) of the backing layer collection drum 300, and the leading edge coupling device 360 may engage with the belt-mounted layer engagement device 350 in reverse order to the above-described process shown in FIGS. 51-52.

Once the leading edge coupling device 360 is engaged to the belt-mounted layer engagement device 350, the method may include driving, using the belt drive motor 330, the one or more threading belts 326 in reverse direction over the belt rollers 328 to thereby thread the leading edge coupling device 360 and backing layer leading edge portion 232 back through the lamination head 200 as shown in FIGS. 59-60. Movement of the one or more threading belts 326 may be stopped when the belt-mounted layer engagement device 350 arrives at its original position proximate the material supply drum 220 as shown in FIG. 61. The method may then include releasing the backing layer leading edge portion 232 from the leading edge coupling device 360, and winding the backing layer leading edge portion 232 onto the material supply drum 220, thereby resulting in a depleted material roll 418 which may be replaced with a replacement role using the reloading cartridge 400, as shown in FIG. 62.

After rewinding the backing layer 230 onto the depleted material roll 418 as shown in FIGS. 43 and 62, the method may comprise transferring the depleted material roll 418 from the material supply drum 220 to an empty reloading spindle 406 on a reloading cartridge 400 positioned proximate the lamination head 200 as shown in FIGS. 13-15, and transferring a replacement material roll 420 from the reloading cartridge 400 to an empty material supply drum 220 on the lamination head 200 as shown in FIGS. 16-20. Prior to transferring the depleted material roll 418 from the material supply drum 220 to an empty reloading spindle 406, the method may include off-loading (e.g., manually) any depleted material rolls 418 recently transferred onto the reloading spindles 406 in a previous material roll 224 replacement operation so that there is at least one empty reloading spindle 406 on the reloading cartridge 400, and at least one reloading spindle 406 containing a replacement material roll 420. The replacement material roll 420 may be loaded on a reloading spindle 406 prior to positioning the reloading cartridge 400 in position proximate the lamination head 200. For example, the reloading cartridge 400 may initially be positioned outside of the lamination station 136 to allow access to the reloading spindles 406 to off-load depleted material rolls 418, and install replacement material rolls 420.

The reloading cartridge 400 may then be moved into the lamination station 136 (e.g., along the reloading cartridge tracks 402), and positioned proximate the lamination head 200 for which the depleted material roll 418 is to be replaced. The method may then include positioning an empty reloading spindle 406 at a storage position 414 configured to align with the material supply drum 220 supporting the depleted material roll 418 to be replaced. For example, the empty reloading spindle 406 may be positioned at the center-top storage position 416 shown in FIG. 11. The method may further include telescopically extending a free end of the empty reloading spindle 406 into engagement with the free end of the material supply drum 220 as shown in FIG. 13. In addition, the method may include engaging the drum-spindle alignment mechanism 408 (FIG. 11) on a free end of the empty reloading spindle 406 into locked alignment with a corresponding drum-spindle alignment mechanism 408 (FIG. 7) on the free end of the material supply drum 220. As mentioned above, the alignment of the empty reloading spindle 406 with the material supply drum 220 may facilitate the sliding transfer of the depleted material roll 418 from the material supply drum 220 onto the empty reloading spindle 406. With the empty reloading spindle 406 aligned with the material supply drum 220, the method may include manipulating the reloader actuator 432 (e.g., the reloader robotic arm 436) to engage with or clamp onto the depleted material roll 418, and slide the depleted material roll 418 off the material supply drum 220 and onto the empty reloading spindle 406 of the reloading cartridge 400 as shown in FIG. 14.

Figure 16:
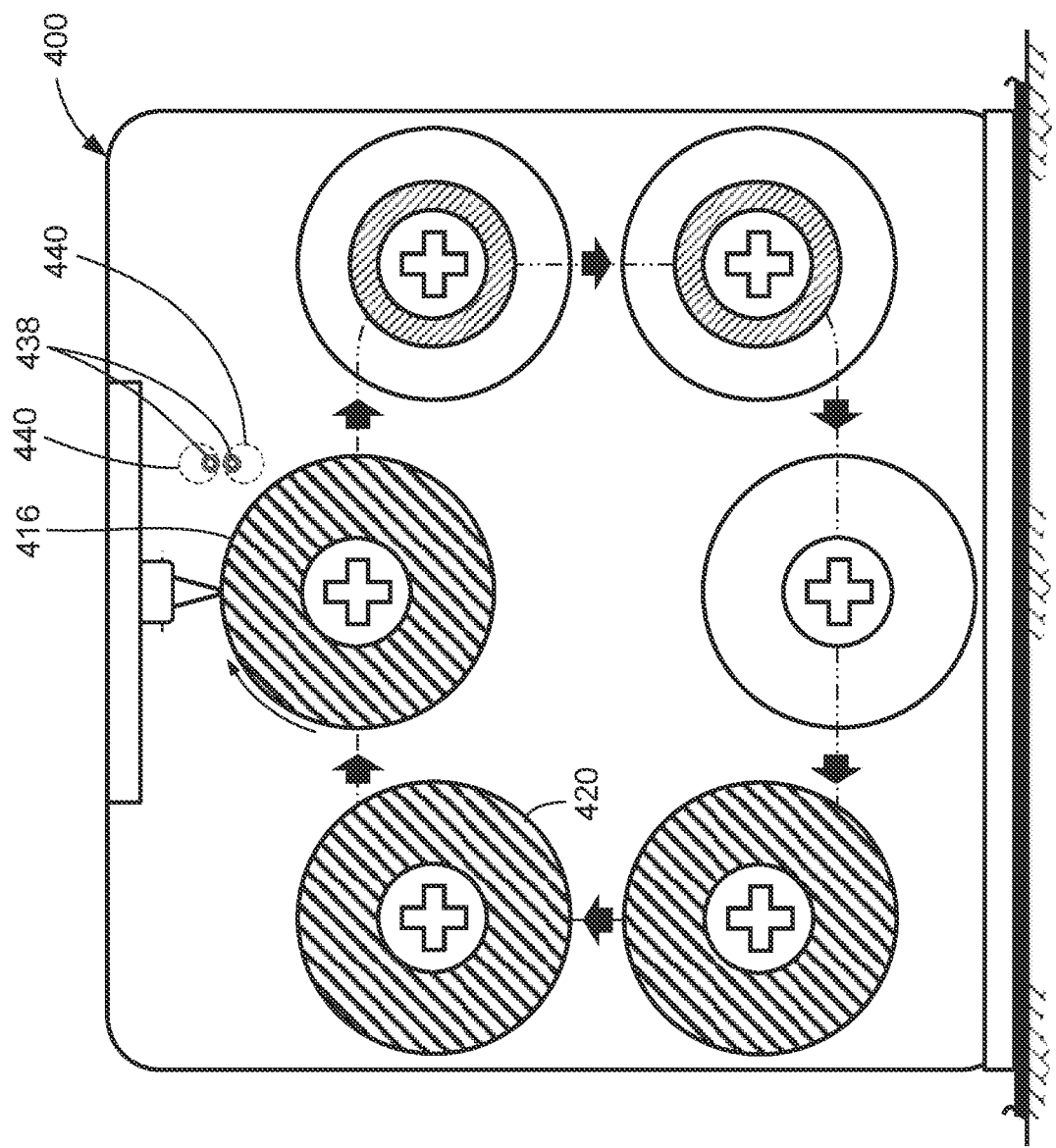
FIG. 16 is a side view of the reloading cartridge showing the reloading spindles after circulation to move a replacement material roll into alignment with the material supply drum of the lamination head.

The transferring of the replacement material roll 420 from the reloading cartridge 400 to the material supply drum 220 may comprise telescopically retracting the reloading spindle 406 away from the free end of the material supply drum 220 as shown in FIG. 15. As shown in FIG. 16, the method may further include circulating the reloading spindles 406 along the circulation path 412 of the reloading cartridge 400 until a reloading spindle 406 supporting a replacement material roll 420 is positioned at a storage position 414 (e.g., the center-top storage position 416) configured to align with the material supply drum 220 from which the depleted material was removed. The reloading cartridge 400 may temporarily moved out of the lamination station 136 to provide access to the reloading cartridge 400 for preparing the replacement material roll 420 for transfer onto the lamination head 200, as described below.

As shown in FIGS. 18-19 the method may include inserting (e.g., manually) the forwardmost edge 242 of the backing layer leading edge portion 232 of the replace material roll 224 (i.e., at the center-top storage position 416) into the roller interface 442 between the pair of leading edge alignment rollers 438 mounted on the reloading cartridge 400. As shown in FIG. 19, the method may include counter rotating the leading edge alignment rollers 438 to draw in and clamp the forwardmost edge 242 of the backing layer leading edge portion 232 in the roller interface 442. With the forwardmost edge 242 clamped in the roller interface 442, the reloading cartridge 400 may be moved back into the lamination station 136 proximate the lamination head 200 to be reloaded. The method may then include telescopically extending the reloading spindle 406 into engagement with the free end of the material supply drum 220 simultaneous with the telescopic extension of the leading edge alignment rollers 438 toward the lamination head 200, as shown in FIG. 20. The leading edge alignment rollers 438 may be telescopically extended until the forwardmost edge 242 of the backing layer leading edge portion 232 is positioned in close proximity to the belt-mounted layer engagement device 350, as shown in FIGS. 21-22. As mentioned above, the method may include engaging the drum-spindle alignment mechanism 408 on the free end of the reloading spindle 406 with the drum-spindle alignment mechanism 408 on the free end of the material supply drum 220 to facilitate sliding transfer of the replacement material rolls 420 from the reloading spindle 406 to the material supply drum 220. The transfer of the replacement material roll 420 from the reloading spindle 406 to the material supply drum 220 may be performed by the reloader actuator 432 (e.g., the reloader robotic arm 436) which may engage with the replacement material roll 420, and slide the replacement material roll 420 off the reloading spindle 406 and onto the material supply drum 220 as shown in FIG. 20.

The method may include counter-rotating the leading edge alignment rollers 438 to further extend the forwardmost edge 242 of the backing layer leading edge portion 232 away from the roller interface 442 and into engagement with the belt-mounted layer engagement device 350 (FIGS. 23-24), or into engagement with the leading edge coupling device 360 (FIGS. 46-47). The method may then include moving the leading edge alignment rollers 438 away from each other to unclamp the backing layer leading edge portion 232 from between the leading edge alignment rollers 438 as shown in FIGS. 26 and 47. The method may include telescopically retracting the leading edge alignment rollers 438 away from lamination head 200 and back toward the reloading cartridge 400 as shown in FIG. 28, and simultaneously telescopically retracting the reloading spindle 406 away from the free end of the material supply drum 220. With the replacement material roll 420 mounted on the lamination head 200 and the backing layer leading edge portion 232 engaged to the drum-mounted layer engagement device 306, the reloading cartridge 400 may be moved away from the lamination head 200 and out of the lamination station 136.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A lamination head having self-threading capability, comprising:
a material supply drum configured to support a material roll of backed material, the backed material comprising layup material backed by a backing layer;
a material threading system, including:
at least one belt raceway located on one side of a material path through the lamination head, and having a continuous-loop threading belt supported on a plurality of belt rollers driven by a belt drive motor;
at least one belt-mounted layer engagement device coupled to the threading belt and configured to engage a backing layer leading edge portion when the belt-mounted layer engagement device is positioned at the material supply drum;
a backing layer collection drum configured to wind at least the backing layer onto the backing layer collection drum as the lamination head applies the layup material onto a substrate; and
the belt drive motor configured to drive the threading belt over the belt rollers and thereby cause the belt-mounted layer engagement device to move with the threading belt and thereby draw at least the backing layer from the material supply roll, and thread at least the backing layer along the material path through the lamination head, and position the backing layer leading edge portion proximate the backing layer collection drum for engagement with the backing layer collection drum.

2. The lamination head of claim 1, wherein the belt-mounted layer engagement device comprises one of the following:
- at least one belt-mounted clip mounted on the threading belt and configured to clamp onto the backing layer leading edge portion;
- an electromagnetic member coupled to the threading belt and configured to magnetically couple to a magnetically-attractable element included with the backing layer leading edge portion;
- a fastener member coupled to the threading belt and having one of a loop element strip or a hook element strip configured to be releasably engaged respectively to one of a hook element strip or a loop element strip included with the backing layer leading edge portion.

3. The lamination head of claim 1, wherein:
the backing layer collection drum includes a drum-mounted layer engagement device configured to engage the backing layer leading edge portion; and
the belt-mounted layer engagement device configured to release the backing layer leading edge portion after the backing layer leading edge portion is engaged to the drum-mounted layer engagement device.

4. The lamination head of claim 3, wherein:
the drum-mounted layer engagement device comprises at least one drum-mounted clamp mechanism having a pair of clamp jaws pivotably coupled to each other for clamping onto a forwardmost edge of the backing layer leading edge portion.

5. The lamination head of claim 3, further comprising:
a leading edge coupling device configured to releasably couple to the backing layer leading edge portion, releasably couple to the belt-mounted layer engagement device, and releasably couple to the drum-mounted layer engagement device;
wherein:
when the leading edge coupling device is located proximate the material supply drum, the leading edge coupling device is configured to couple to the backing layer leading edge portion and couple to the belt-mounted layer engagement device for threading at least the backing layer through the lamination head;
when the leading edge coupling device is located proximate the backing layer collection drum, the leading edge coupling device is configured to release from the belt-mounted layer engagement device and couple to the drum-mounted layer engagement device for winding at least the backing layer onto the backing layer collection drum as the lamination head applies the layup material onto the substrate, the leading edge coupling device is configured to release from the drum-mounted layer engagement device and couple to the belt-mounted layer engagement device for threading the backing layer leading edge portion back through the lamination head for rewinding onto the material supply drum; and
when the leading edge coupling device returns to the material supply drum after threading the backing layer leading edge portion back through the lamination head, the leading edge coupling device is configured to release the backing layer leading edge portion for rewinding onto the material supply drum.

6. The lamination head of claim 1, wherein the plurality of belt rollers supporting the threading belt includes:
a redirect roller located proximate the backing layer collection drum and configured to translate along a redirect roller path between a redirect roller home position and a redirect roller engagement position;
the redirect roller in the redirect roller home position located at a distance from the backing layer collection drum to provide clearance for the backing layer when winding onto the backing layer collection drum; and
the redirect roller in the redirect roller engagement position located in close proximity to the backing layer collection drum and configured to orient the threading belt to facilitate engagement of the backing layer leading edge portion with the backing layer collection drum.

7. The lamination head of claim 6, wherein:
the redirect roller path is configured to such that constant tension is maintained in the backing layer when the redirect roller moves between the redirect roller home position and the redirect roller engagement position.

8. The lamination head of claim 1, wherein:
the material supply drum is configured to reverse rotational direction and draw the backing layer off of the backing layer collection drum and rewind the backing layer onto the material supply drum after at least partial depletion of the layup material on the material roll.

9. The lamination head of claim 1, further comprising a backing layer separation assembly including:
at least one separation device configured to separate the layup material from the backing layer and direct the layup material toward the substrate as the lamination head moves along a direction of travel.

10. A manufacturing system, comprising:
a. a series of lamination heads each having self-threading capability and each including:
  i. a material supply drum configured to support a material roll of backed material, the backed material comprising layup material backed by a backing layer;
  ii. a material threading system, including:
    (1) at least one belt raceway located on one side of a material path through the lamination head, and having a continuous-loop threading belt supported on a plurality of belt rollers driven by a belt drive motor;
    (2) at least one belt-mounted layer engagement device coupled to the threading belt and configured to engage a backing layer leading edge portion;
  iii. a backing layer collection drum configured to wind at least the backing layer onto the backing layer collection drum as the lamination head applies the layup material onto a substrate;
  iv. the belt drive motor configured to drive the threading belt over the belt rollers and thereby cause the belt-mounted layer engagement device to draw at least the backing layer from the material supply roll and thread at least the backing layer along the material path through the lamination head and position the backing layer leading edge portion into close proximity to the backing layer collection drum;
b. a reloading cartridge having an array of reloading spindles movable along a circulation path into one of a plurality of storage positions, and each configured to store a material roll including a depleted material roll or a replacement material roll; and c. the reloading cartridge configured to position an empty reloading spindle for alignment with a material supply drum of one of the lamination heads, transfer the depleted material roll from the lamination head onto the empty reloading spindle, circulate the reloading spindles until a reloading spindle supporting a replacement material roll is aligned with the material supply drum, and transfer the replacement material roll from the reloading spindle to the material supply drum.

11. The manufacturing system of claim 10, wherein the reloading cartridge further comprises:
   a pair of leading edge alignment rollers mounted one above the other on the reloading cartridge proximate one of the storage positions along the circulation path;
   the leading edge alignment rollers being counter-rotatable for drawing in and clamping a forwardmost edge of the backing layer leading edge portion; and
   the leading edge alignment rollers being telescoping for positioning the forwardmost edge of the backing layer leading edge portion into close proximity to the belt-mounted layer engagement device during transferring of the replacement material roll from the reloading spindle to the material supply drum of the lamination head.

12. The manufacturing system of claim 10, wherein:
   each reloading spindle configured to be telescoping for engaging with a free end of the material supply drum to facilitate transfer of material rolls between the material supply drum and a reloading spindle of the reloading cartridge.

13. A method of threading layup material through a lamination head, comprising:
   supporting, on a material supply drum, a material roll of backed material, the backed material comprising layup material backed by a backing layer;
   engaging a backing layer leading edge portion to a belt-mounted layer engagement device when positioned at the material supply drum, the belt-mounted layer engagement device coupled to a continuous-loop threading belt located on one side of a material path through the lamination head, the threading belt supported on a plurality of belt rollers; and
   driving, using a belt drive motor, the threading belt over the belt rollers and thereby causing the belt-mounted layer engagement device to move with the threading belt and thereby thread at least the backing layer along the material path through the lamination head, and position the backing layer leading edge portion proximate a backing layer collection drum.

14. The method of claim 13, wherein engaging the backing layer leading edge portion to the belt-mounted layer engagement device comprises one of the following:
   clamping onto the backing layer leading edge portion using a belt-mounted clip mounted on the threading belt;
   magnetically coupling a magnetically-attractable element of the backing layer leading edge portion using an electromagnetic member coupled to the threading belt;
   fastening one of a hook element strip or a loop element strip of the backing layer leading edge portion respectively to one of a loop element strip or a hook element strip of a fastener member coupled to the threading belt.

15. The method of claim 13, further comprising:
   engaging a forwardmost edge of the backing layer leading edge portion to a drum-mounted layer engagement device of the backing layer collection drum when the belt-mounted layer engagement device positions the backing layer leading edge portion proximate the backing layer collection drum; and
   releasing the backing layer leading edge portion from the belt-mounted layer engagement device after the backing layer leading edge portion is engaged to the drum-mounted layer engagement device.

16. The method of claim 15, wherein engaging the forwardmost edge of the backing layer leading edge portion to the drum-mounted layer engagement device comprises:
   clamping onto the forwardmost edge of the backing layer leading edge portion using at least one drum-mounted clamp mechanism having a pair of clamp jaws pivotably coupled to each other.

17. The method of claim 13, wherein the plurality of belt rollers include a redirect roller, the method further comprising:
   positioning the redirect roller at a redirect roller engagement position in close proximity to the backing layer collection drum prior to threading, via the belt-mounted layer engagement device, at least the backing layer through the lamination head.

18. The method of claim 17, further comprising:
   translating the redirect roller along a redirect roller path from the redirect roller engagement position to a redirect roller home position after the backing layer leading edge portion engages with the backing layer collection drum to thereby provide clearance for the backing layer to wind onto the backing layer collection drum.

19. The method of claim 13, further comprising:
   separating, using at least one separation device, the layup material from the backing layer, and directing the layup material toward a substrate as the lamination head moves along a direction of travel.

20. The method of claim 13, further comprising:
   reversing rotational direction of the material supply drum and the backing layer collection drum for drawing the backing layer off of the backing layer collection drum and rewinding the backing layer onto the material supply drum after the material roll is at least partially depleted of layup material.

* * * * *